US011989039B2

(12) United States Patent
Tazume

(10) Patent No.: US 11,989,039 B2
(45) Date of Patent: May 21, 2024

(54) CONTROL SYSTEM, AIRCRAFT, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 357 days.

(21) Appl. No.: 17/544,253

(22) Filed: Dec. 7, 2021

(65) Prior Publication Data

US 2022/0206514 A1 Jun. 30, 2022

(30) Foreign Application Priority Data

Dec. 28, 2020 (JP) .................................. 2020-219576

(51) Int. Cl.
*G05D 1/10* (2006.01)
*B64C 39/02* (2023.01)
(Continued)

(52) U.S. Cl.
CPC ........... *G05D 1/106* (2019.05); *B64C 39/024* (2013.01); *G01S 17/933* (2013.01); *G06T 7/20* (2013.01);
(Continued)

(58) Field of Classification Search
CPC ...... G05D 1/0212; G05D 1/0214; G05D 1/10; G05D 1/024; G05D 1/04; G05D 1/042; G05D 1/0808; G05D 1/0268; G05D 1/0246; G05D 1/0257; G05D 1/0236; G05D 1/0234; G05D 1/0231; G05D 1/0223; G05D 1/1062; B64C 39/024; B64C 27/08; Y10S 430/146; G06V 20/56; G06V 20/00; G06V 20/17; G06V 20/38; G06V 20/39; G06V 20/70; G06V 20/80; G06V 2201/07; G06V 2201/12; G06V 10/10; G06V 10/70;
(Continued)

(56) References Cited

U.S. PATENT DOCUMENTS 9,070,285 B1 * 6/2015 Ramu .................. G01C 23/005
10,109,209 B1 * 10/2018 Buchmueller ......... G08G 5/045
(Continued)

FOREIGN PATENT DOCUMENTS

JP 2017-501484 A 1/2017
JP 2017-526566 A 9/2017
(Continued)

*Primary Examiner* — Thomas Ingram
*Assistant Examiner* — Faris Asim Shaikh
(74) *Attorney, Agent, or Firm* — Sughrue Mion, PLLC

(57) ABSTRACT

A control system includes at least one memory storing program code and at least one processor. The program code is configured to cause the at least one processor to estimate size of a short visibility airspace, based on a location of a first point at which an aircraft detects the short visibility airspace, a location of a second point at which the aircraft determines that the aircraft has entered the short visibility airspace, and sensing information acquired at the first point. The program code also causes the at least one processor to perform control to cause the aircraft to move to a safe airspace that is set based on the estimated size of the short visibility airspace when it is determined that flight continuation along a route passing through the short visibility airspace is impracticable.

20 Claims, 30 Drawing Sheets

(51) Int. Cl.
    *G01S 17/933*     (2020.01)
    *G05D 1/00*     (2006.01)
    *G06T 7/20*     (2017.01)
    *G06T 7/50*     (2017.01)
    *G06T 7/60*     (2017.01)
    *G06T 7/70*     (2017.01)
    *G06V 20/10*     (2022.01)
    *G06V 20/17*     (2022.01)
    *G06V 40/10*     (2022.01)

(52) U.S. Cl.
CPC ............... *G06T 7/50* (2017.01); *G06T 7/60* (2013.01); *G06T 7/70* (2017.01); *G06V 20/17* (2022.01); *G06V 20/176* (2022.01); *G06V 40/103* (2022.01); *B64U 2201/10* (2023.01); *G06T 2207/10032* (2013.01); *G06T 2207/30181* (2013.01); *G06T 2207/30196* (2013.01)

(58) Field of Classification Search
CPC ...... G06V 20/176; G06V 40/103; B60R 1/06; G01B 11/24; G01B 11/22; G01B 11/28; G01B 11/08; G01B 11/002; G01B 11/10; G01B 11/105; G01B 11/285; G01B 15/04; G01B 21/10; G01B 21/16; G01B 21/18; G01B 21/20; G01B 21/12; G01W 1/10; G01S 17/95; G01S 17/88; G01S 3/02; G01S 3/78; G01S 13/93; G01S 13/933; G01S 13/953; G01S 13/935; G01S 13/872; G01S 13/865; G01S 13/867; G01S 13/04; G01S 13/08; G01S 13/42; G01S 11/02; G01S 11/00; G01S 5/02; G01S 5/16; G01S 5/0249; G01S 5/0257; G01S 5/0268; G01S 5/0263; G01S 5/0258; G01S 5/0264; G01S 5/02585; G01S 17/42; G01S 17/87; G01S 17/933; B64D 47/08; B64D 1/12; G08G 5/0078; G08G 5/045; G08G 5/0008; G08G 5/0021; G06T 2207/30252; G06T 2207/10032; G06T 2207/30181; G06T 2207/30196; G06T 7/20; G06T 7/62; G06T 7/75; G06T 7/70; H04N 23/11; A61M 2205/3306; B64U 2201/10; B64U 2101/30; B64U 2101/60
See application file for complete search history.

(56) References Cited

U.S. PATENT DOCUMENTS

| | | | |
|---|---|---|---|
| 11,747,807 B2* | 9/2023 | Tazume | B64D 1/22 |
| | | | 701/3 |
| 2008/0165031 A1* | 7/2008 | Estrada | G01S 17/95 |
| | | | 340/963 |
| 2016/0070265 A1 | 3/2016 | Liu et al. | |
| 2016/0196755 A1 | 7/2016 | Navot et al. | |
| 2016/0232796 A1* | 8/2016 | Oldach | G08G 5/0091 |
| 2017/0176641 A1* | 6/2017 | Zhu | G05D 1/0088 |
| 2019/0002103 A1* | 1/2019 | Gomez Gutierrez | A63F 13/20 |
| 2019/0012924 A1* | 1/2019 | Beaurepaire | G08G 5/0039 |
| 2019/0030475 A1* | 1/2019 | Witchey | G06V 20/13 |
| 2019/0113921 A1* | 4/2019 | Ohki | G01S 3/784 |
| 2019/0122567 A1* | 4/2019 | Evans | G08G 5/0013 |
| 2019/0147751 A1* | 5/2019 | Sasao | G08G 5/0021 |
| | | | 701/3 |
| 2020/0106958 A1* | 4/2020 | Yang | H04N 23/80 |
| 2020/0231280 A1* | 7/2020 | Srivastava | G05D 1/1062 |
| 2021/0216085 A1* | 7/2021 | Wake | G05D 1/106 |
| 2022/0139192 A1* | 5/2022 | Stenneth | G08B 27/006 |
| | | | 340/905 |
| 2022/0206514 A1* | 6/2022 | Tazume | B64C 39/024 |
| 2023/0121187 A1* | 4/2023 | Tazume | G05D 1/104 |
| | | | 701/3 |

FOREIGN PATENT DOCUMENTS

| | | |
|---|---|---|
| JP | 2020-67880 A | 4/2020 |
| WO | 2018/008388 A1 | 1/2018 |

* cited by examiner

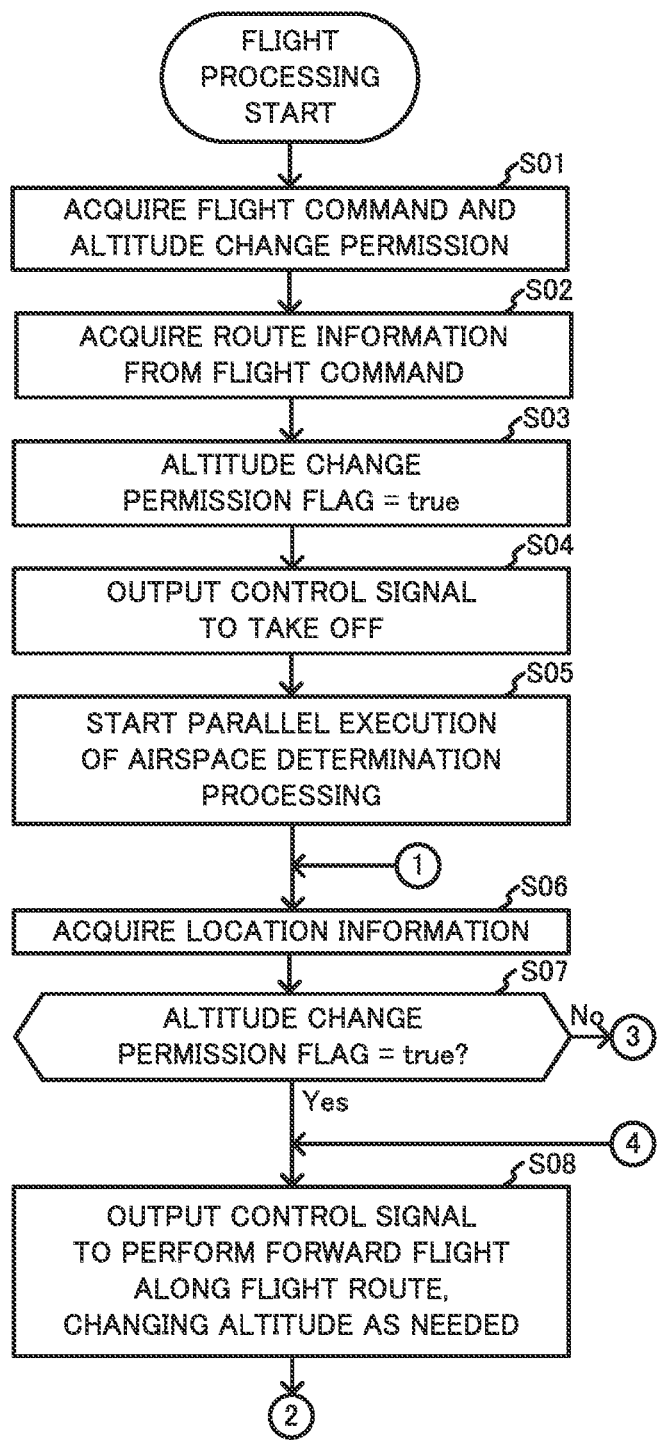

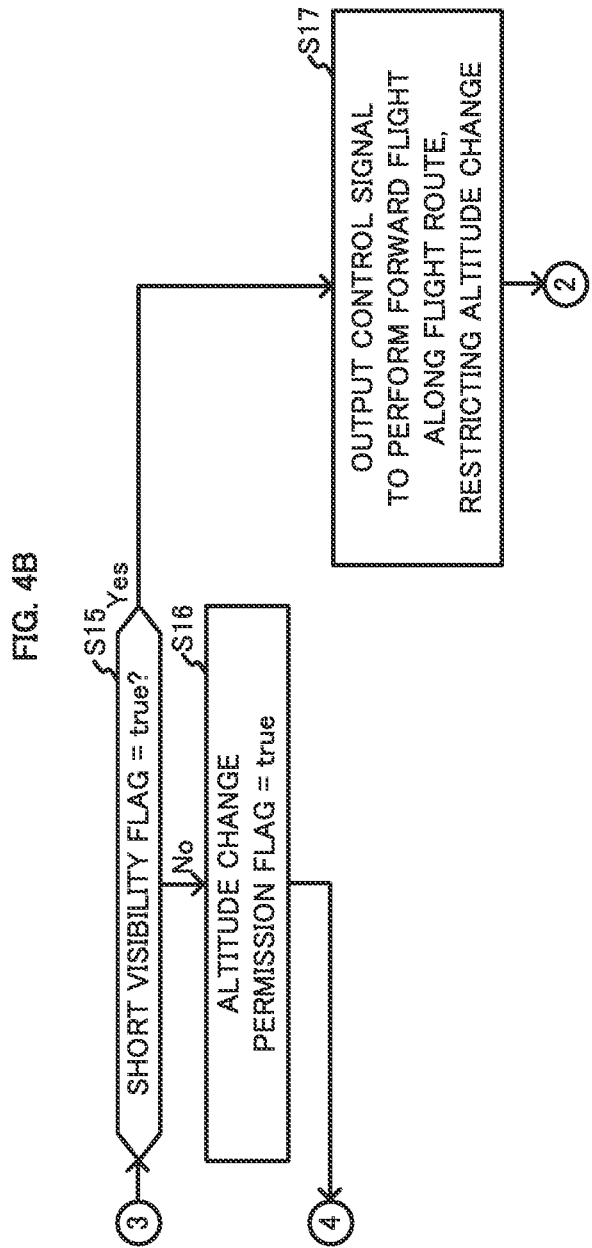

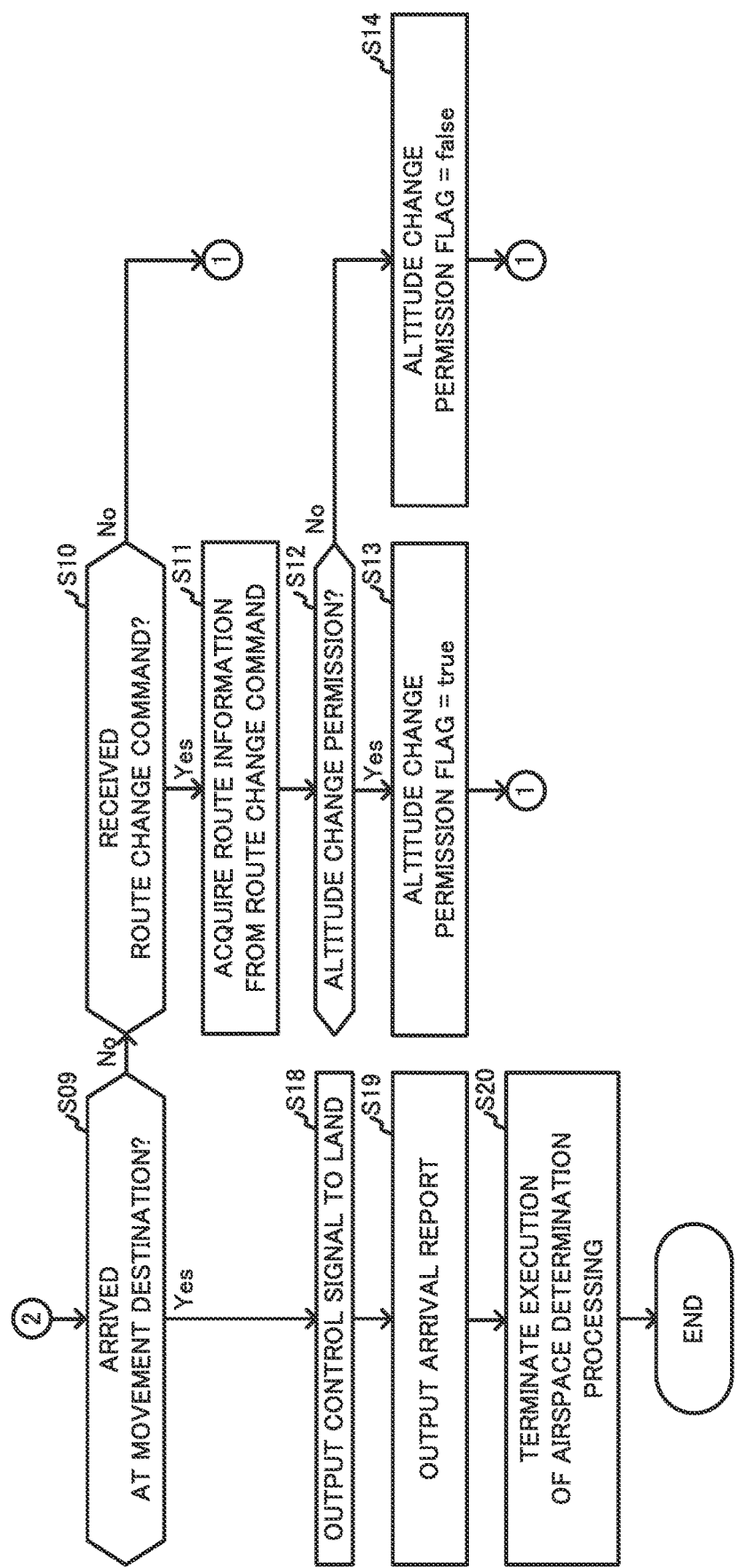

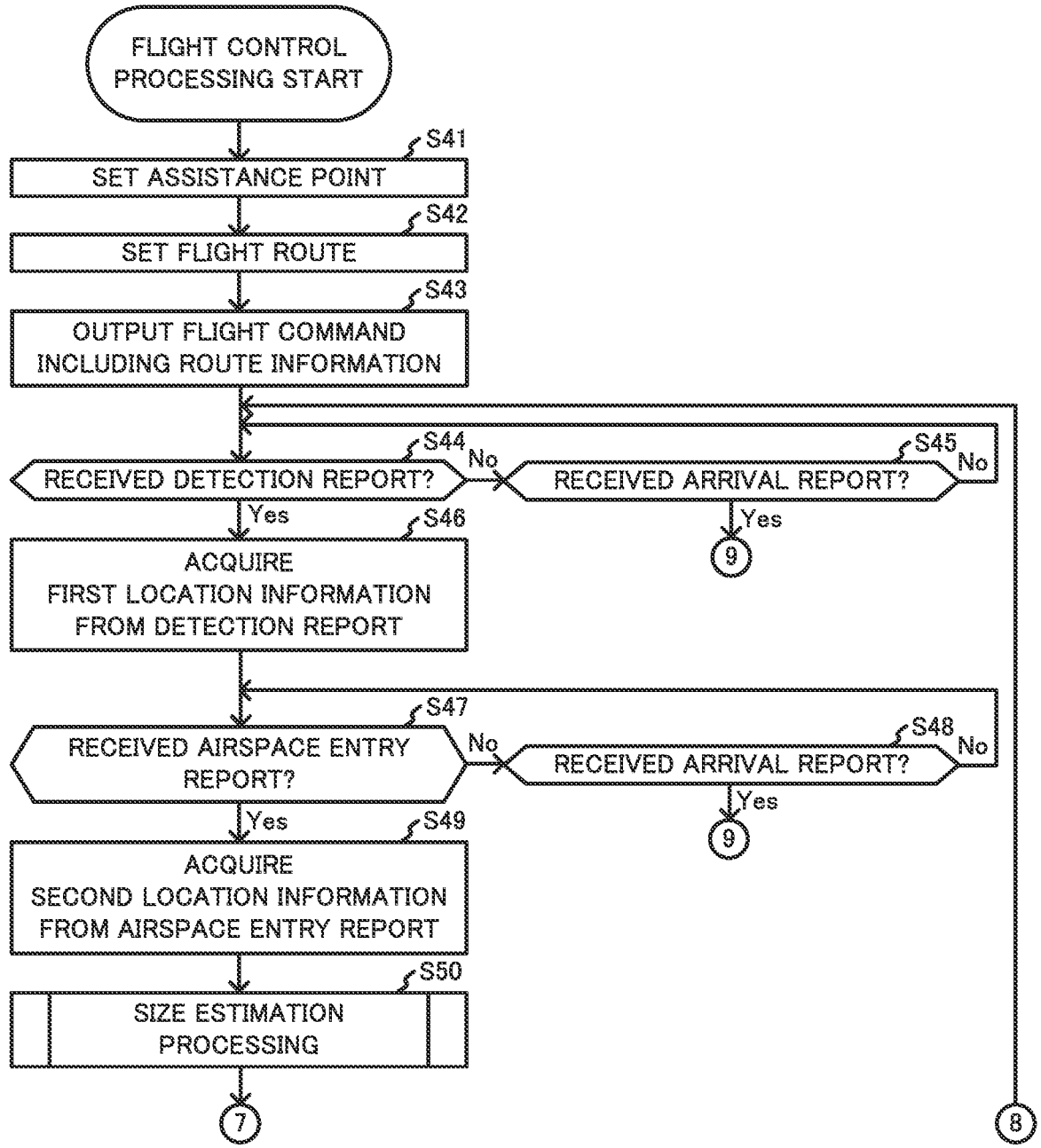

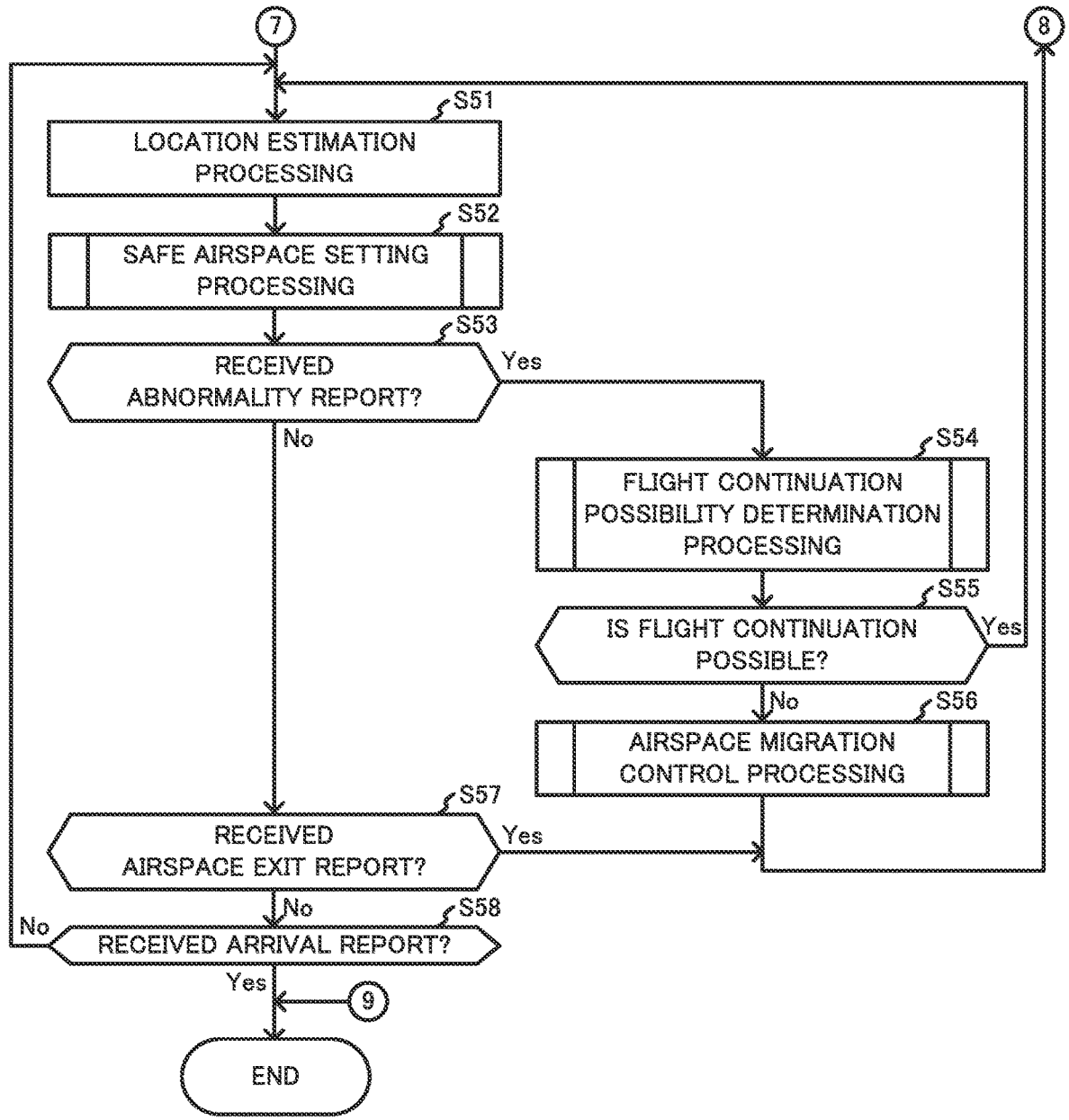

FIG. 11

SAFE AIRSPACE TABLE

| PRIORITY | LOCATION | | | | | |
|---|---|---|---|---|---|---|
| | LATITUDE | | LONGITUDE | | ALTITUDE | |
| | MINIMUM VALUE | MAXIMUM VALUE | MINIMUM VALUE | MAXIMUM VALUE | MINIMUM VALUE | MAXIMUM VALUE |
| 1 | ... | ... | ... | ... | ... | ... |
| 2 | ... | ... | ... | ... | ... | ... |
| 3 | ... | ... | ... | ... | ... | ... |
| ... | ... | ... | ... | ... | ... | ... |

FIG. 12

CONFIRMATION RESULT TABLE

| LOCATION | | | | | | CONFIRMATION RESULT |
|---|---|---|---|---|---|---|
| LATITUDE | | LONGITUDE | | ALTITUDE | | |
| MINIMUM VALUE | MAXIMUM VALUE | MINIMUM VALUE | MAXIMUM VALUE | MINIMUM VALUE | MAXIMUM VALUE | |
| ... | ... | ... | ... | ... | ... | EXISTENCE CONFIRMATION |
| ... | ... | ... | ... | ... | ... | NONEXISTENCE CONFIRMATION |
| ... | ... | ... | ... | ... | ... | NON-CONFIRMATION |
| ... | ... | ... | ... | ... | ... | ... |

FIG. 13

FLIGHT LOCATION-RELATED TABLE

| | | FLIGHT LOCATION-RELATED INFORMATION | | | | | | | | |
|---|---|---|---|---|---|---|---|---|---|---|
| VEHICLE ID | TIME | LOCATION | | | SENSING INFORMATION | | | | | |
| | | | | | GROUND-RELATIVE WIND DIRECTION/VELOCITY | | | | | |
| | | LATITUDE | LONGITUDE | GPS ALTITUDE | Xw DIRECTION | Yw DIRECTION | Zw DIRECTION | IMAGE | SENSING DIRECTION INFORMATION |
| 100 | 00:00:00 | ... | ... | ... | ... | ... | ... | ./000000.jpg | ... |
| 100 | 00:01:00 | ... | ... | ... | ... | ... | ... | ./000100.jpg | ... |
| 100 | 00:02:00 | ... | ... | ... | ... | ... | ... | ./000200.jpg | ... |
| ... | ... | ... | ... | ... | ... | ... | ... | ... | ... |

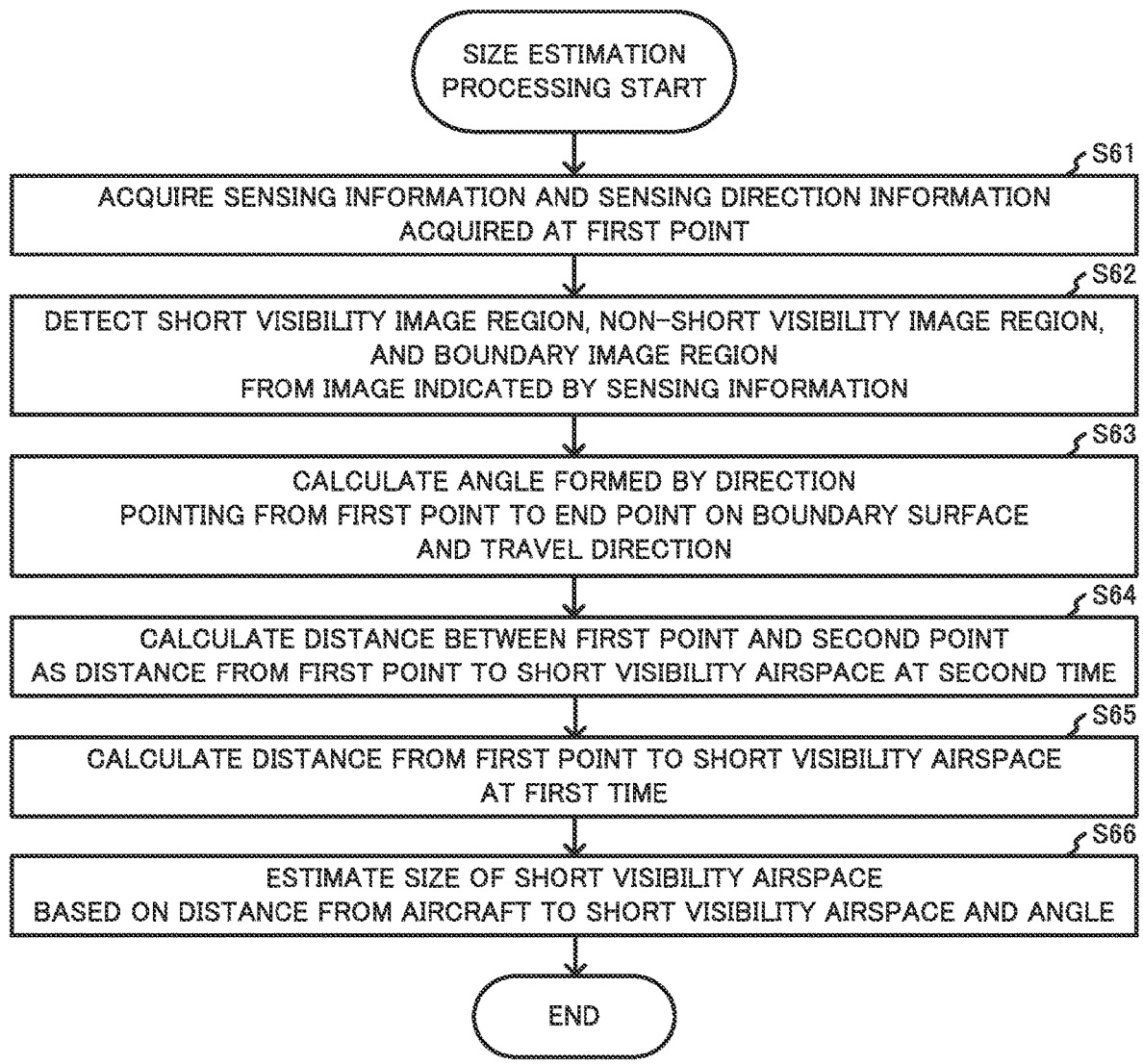

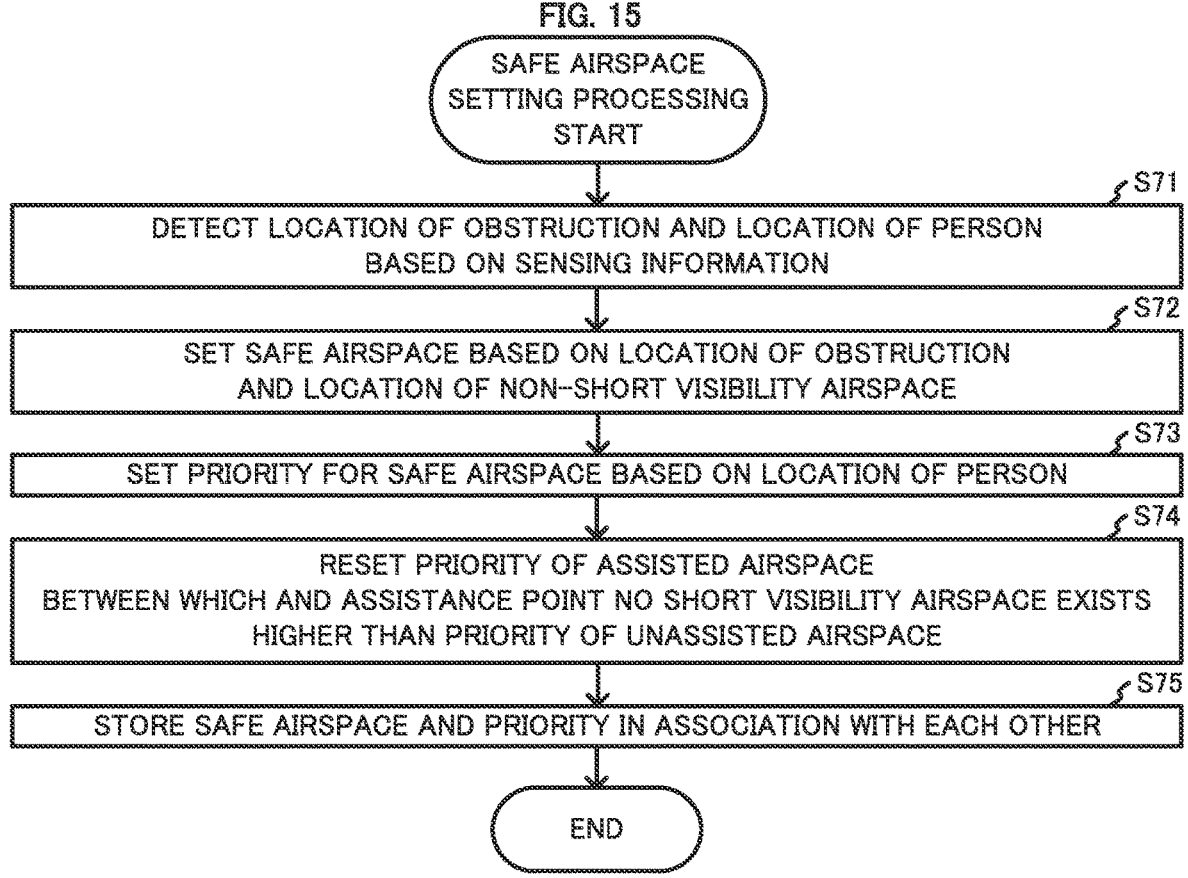

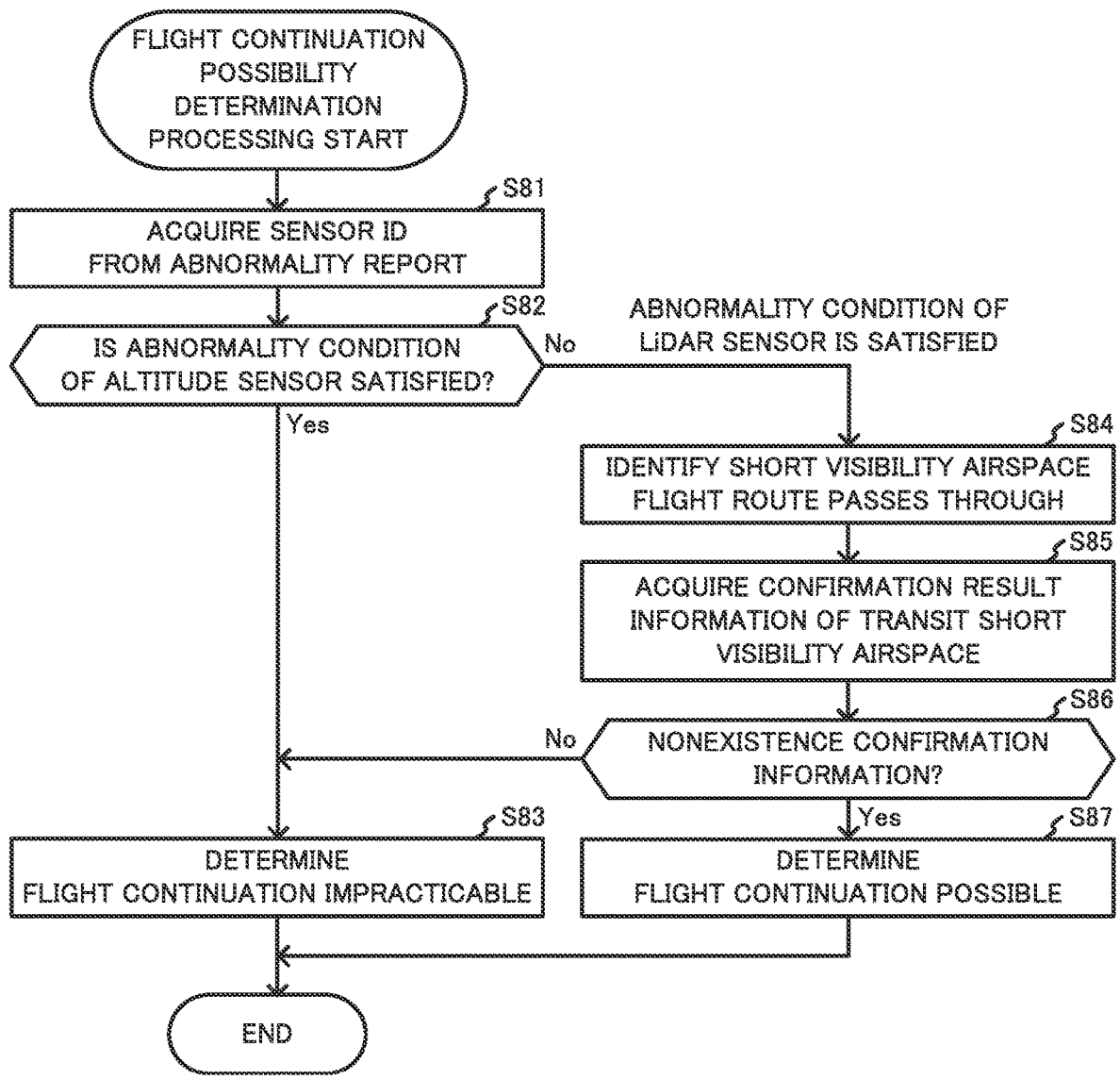

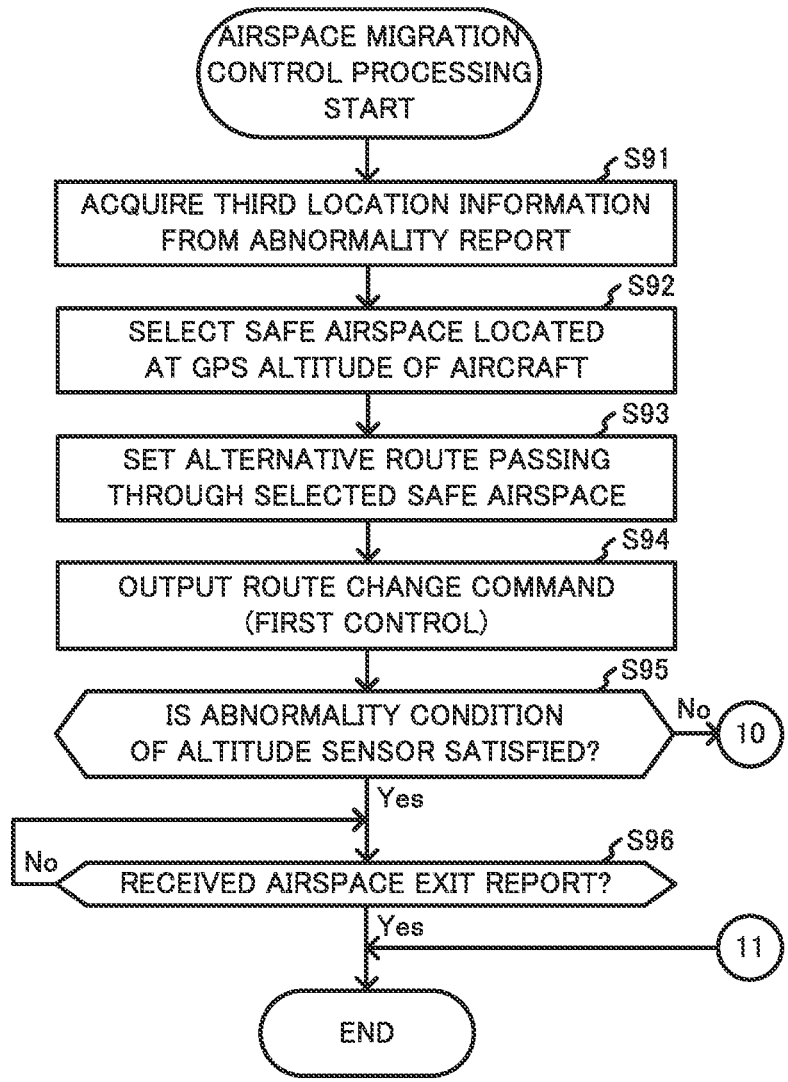

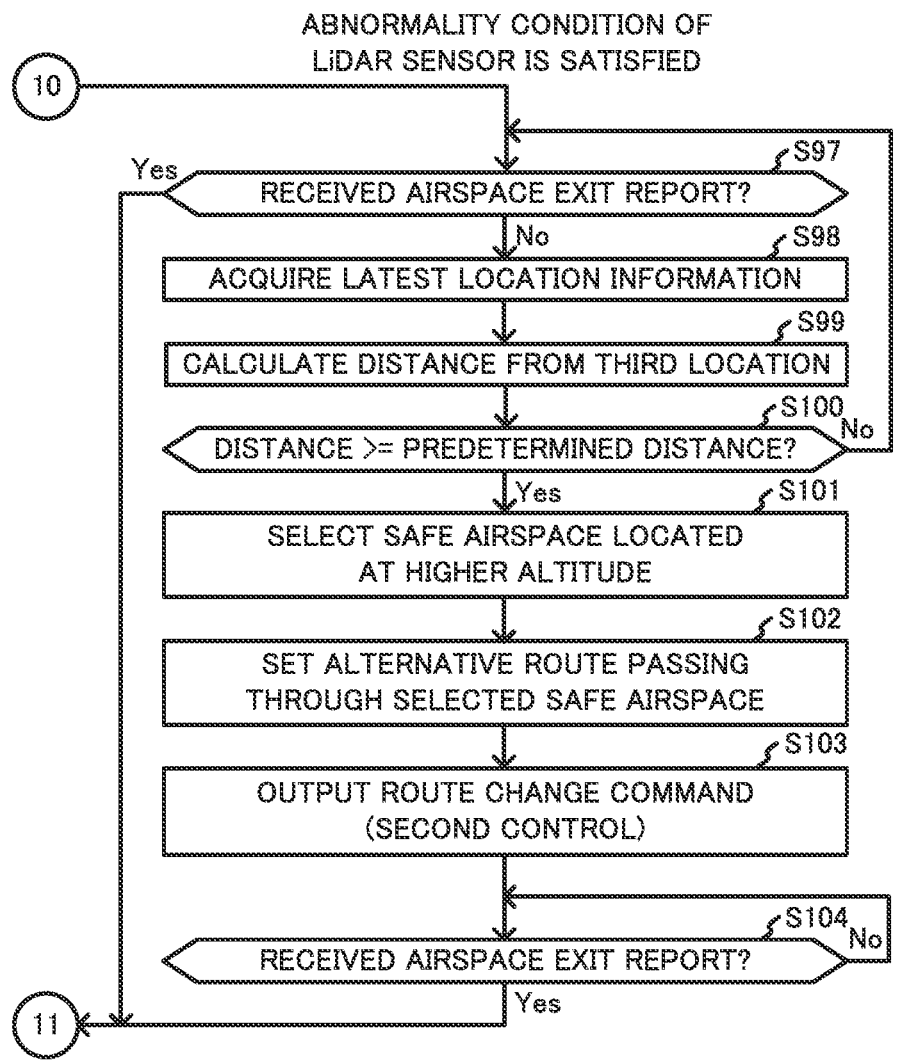

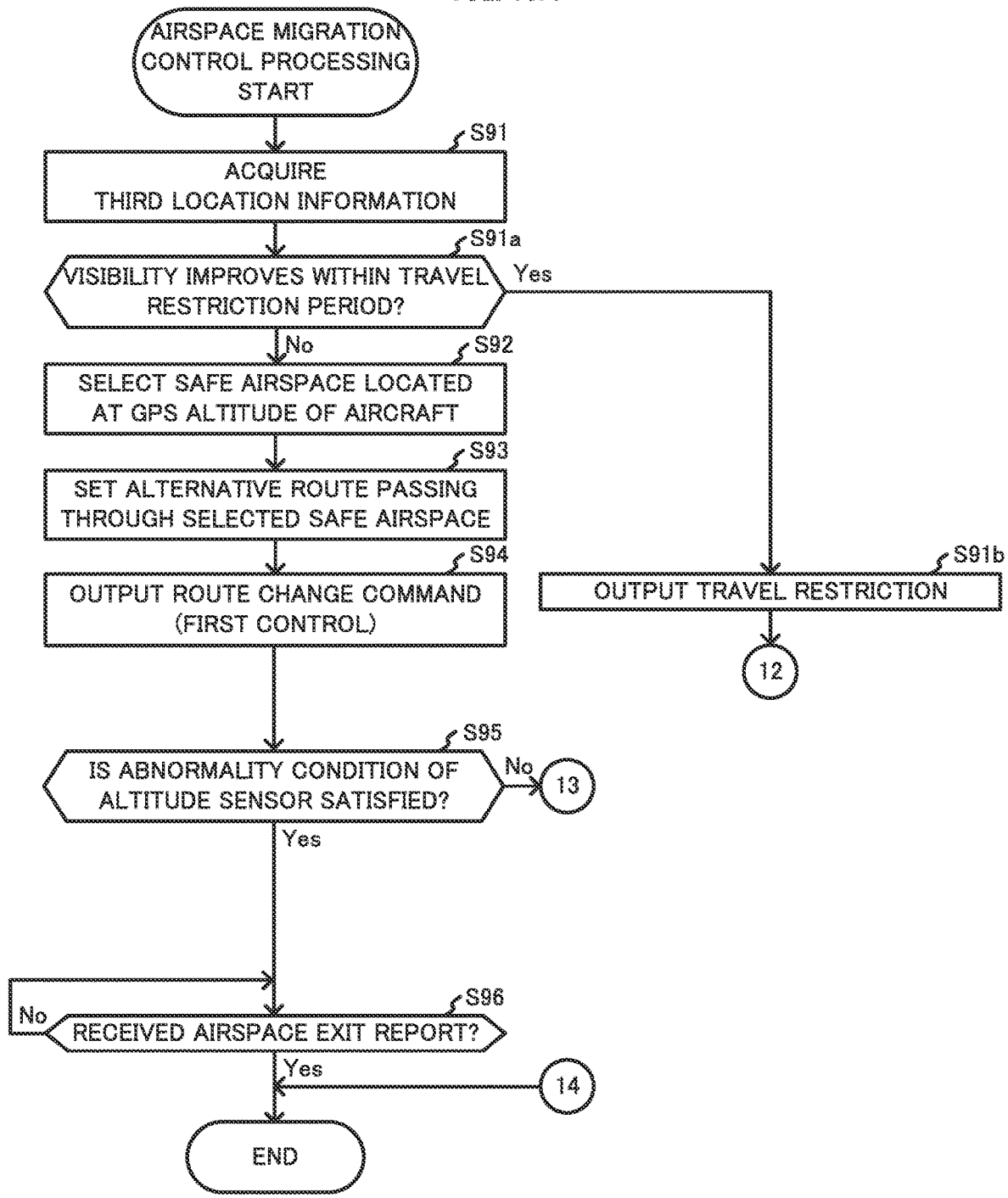

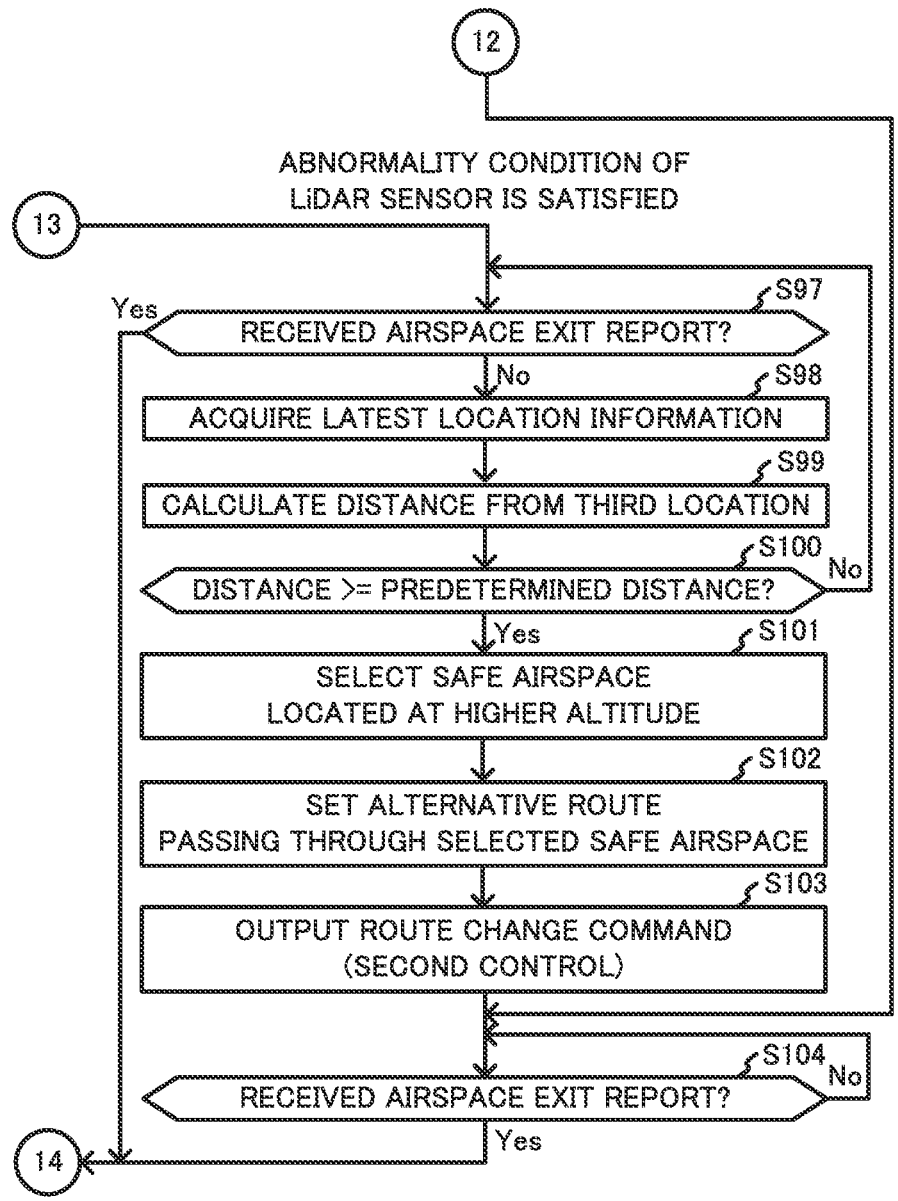

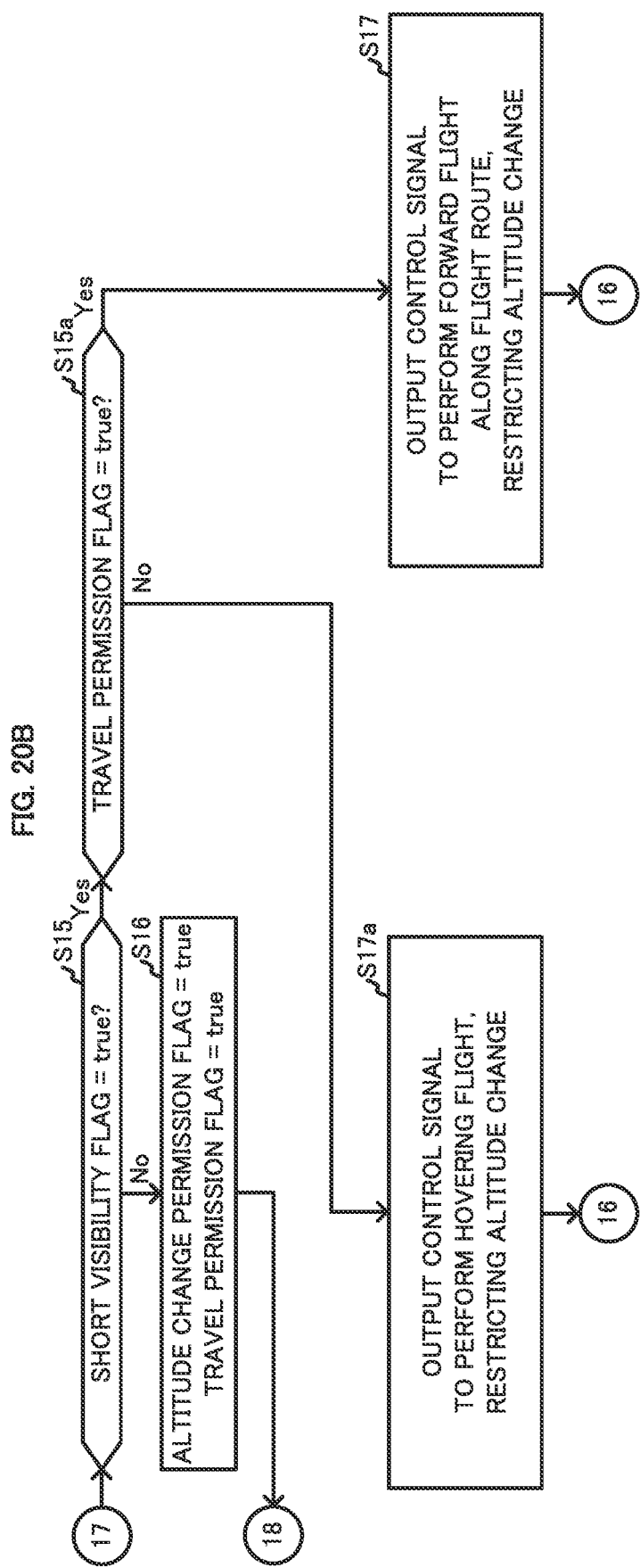

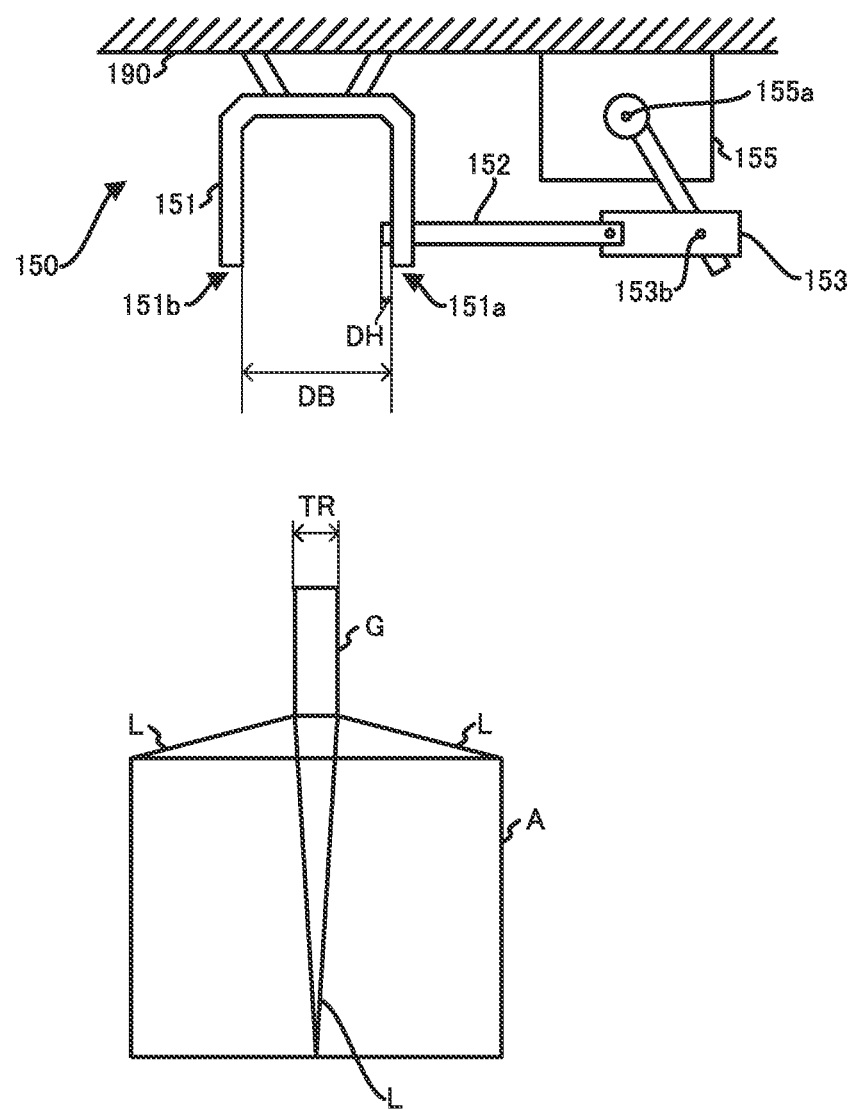

CONTROL SYSTEM, AIRCRAFT, AND METHOD

CROSS-REFERENCE TO RELATED APPLICATION

This application claims the benefit of Japanese Patent Application No. 2020-219576, filed on Dec. 28, 2020, the entire disclosure of which is incorporated by reference herein.

FIELD

This application relates generally to a control system, an aircraft, and a method.

BACKGROUND

Conventionally, a flight control system causes a flying object to fly in a short visibility airspace in which visibility is shorter than a predetermined distance, such as an airspace in which fog has developed, has been known (for example, International Patent Publication No. WO 2018/008388). The flight control system includes a guidance control device that emits pulsed light and an incoming direction detection device that detects a direction in which light comes in based on information output from a sensor detecting pulsed light. The flight control system causes a flying object to fly in a fogged short visibility airspace toward the detected direction.

However, the system described in International Patent Publication No. WO 2018/008388 cannot cause the flying object to fly in a short visibility airspace unless detecting an incoming direction of light by a sensor. Thus, there has been a problem in that, when, for example, based on information output from the sensor, it is determined that a flight along a route indicated by pulsed light is not possible, it is not possible to cause the flying object to move to a safe airspace that has higher safety than the short visibility airspace.

Accordingly, the present disclosure has been made in consideration of the above-described problem, and an objective of the present disclosure is to provide a control system, an aircraft, and a method capable of causing the aircraft to move to a safe airspace that has higher safety than a short visibility airspace even when it is determined that flight continuation along a route passing through the short visibility airspace is impracticable based on information output from a sensor.

SUMMARY

In order to achieve the above-described objective, a control system according to a first aspect of the present disclosure includes:

at least one first memory storing first program code; and
at least one first processor configured to read the first program code and operate in accordance with the first program code, wherein
the first program code includes:
acquisition code configured to cause the at least one first processor to acquire information indicating a location of a first point at which an aircraft, the aircraft configured to fly a predetermined route, detects a short visibility airspace that has shorter visibility than a predetermined distance and information indicating a location of a second point at which the aircraft determines that the aircraft has entered the short visibility airspace;
estimation code configured to cause the at least one first processor to estimate size of the short visibility airspace, based on the location of the first point and the location of the second point indicated by the acquired information and sensing information acquired at the first point by sensing performed by a first sensor that the aircraft mounts;
setting code configured to cause the at least one first processor to set a safe airspace having higher safety than the short visibility airspace, based on the estimated size of the short visibility airspace and the sensing information acquired at the first point; and
control code configured to cause the at least one first processor to perform control to cause the aircraft to move to the set safe airspace when it is determined that flight continuation along the route passing through the short visibility airspace is impracticable, based on information output from a second sensor that is mounted on the aircraft and that is different from the first sensor.

BRIEF DESCRIPTION OF THE DRAWINGS

A more complete understanding of this application can be obtained when the following detailed description is considered in conjunction with the following drawings, in which:

FIGS. 4A and 4B are a flowchart illustrating a first half of an example of flight processing that the aircraft according to the embodiment executes;

FIG. 5 is a flowchart illustrating a second half of the example of the flight processing that the aircraft according to the embodiment executes;

FIGS. 9A and 9B are a flowchart illustrating an example of flight control processing that the control device that the control system includes executes;

FIG. 11 is a diagram illustrating an example of a safe airspace table that the control device that the control system includes stores;

FIG. 12 is a diagram illustrating an example of a confirmation result table that the control device that the control system includes stores;

FIG. 13 is a diagram illustrating an example of a flight location-related table that the control device that the control system includes stores;

FIG. 14 is a flowchart illustrating an example of size estimation processing that the control device that the control system includes executes;

FIG. 15 is a flowchart illustrating an example of safe airspace setting processing that the control device that the control system includes executes;

FIG. 16 is a flowchart illustrating an example of flight continuation possibility determination processing that the control device that the control system includes executes;

FIGS. 17A and 17B are a flowchart illustrating an example of airspace migration control processing that the control device that the control system according to the embodiment includes executes;

FIGS. 19A and 19B are a flowchart illustrating an example of airspace migration control processing that the control device that the control system according to Modified Example 7 of the embodiment includes executes;

FIGS. 20A and 20B are a flowchart illustrating a first half of an example of flight processing that the aircraft according to Modified Example 7 of the embodiment executes;

FIG. 24 is a diagram illustrating an example of the hook in an unlocked state that the aircraft includes.

DETAILED DESCRIPTION

Embodiment

Hereinafter, an embodiment of the present disclosure will be described with reference to the drawings.

Figure 1:
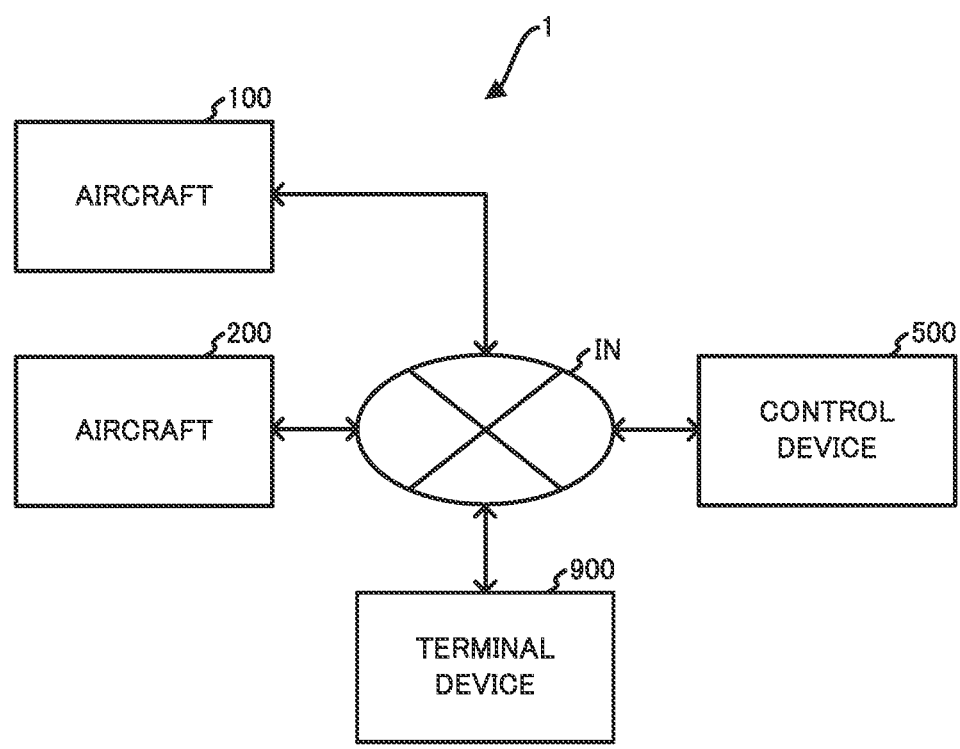
FIG. 1 is a system configuration diagram illustrating a configuration example of a control system according to an embodiment of the present disclosure.

A control system 1 according to the embodiment of the present disclosure includes aircrafts 100 and 200, as illustrated in FIG. 1, that, in order to transport an article, store the article and fly and a control device 500 that controls flight of the aircrafts 100 and 200. The control system 1 also includes a terminal device 900 that is carried by an assistant who assists flight control of the aircrafts 100 and 200 performed by the control device 500.

Figure 2:
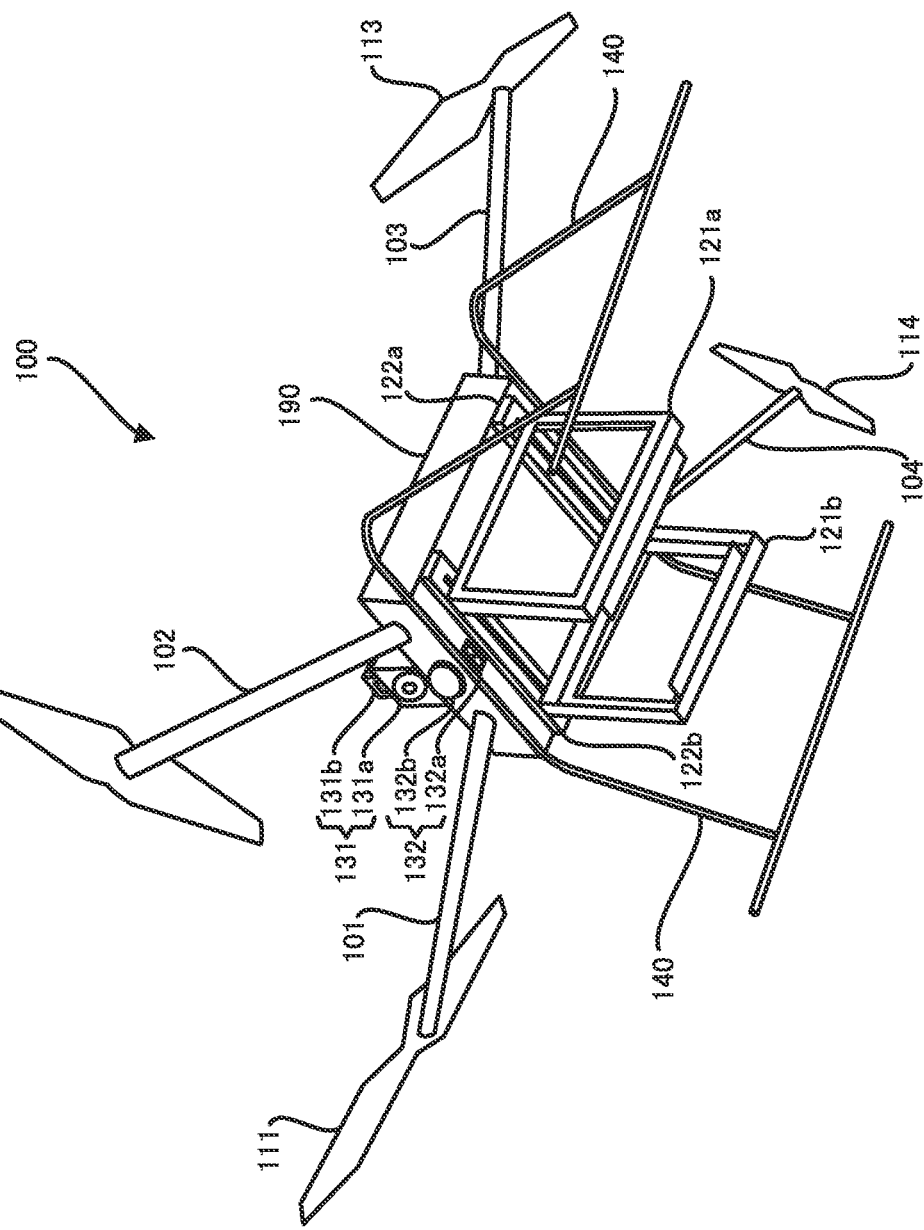
FIG. 2 is an appearance configuration diagram illustrating an appearance example of an aircraft according to the embodiment.

The aircraft 100 is, for example, an unmanned aircraft, such as a drone, and has landed at a business office of a transport company that performs transport of an article. The aircraft 100 includes a control device 190 that has a rectangular parallelepiped shape as illustrated in FIG. 2 and that controls an attitude and flight of the aircraft 100.

In the present embodiment, a surface serving as a reference surface among a plurality of surfaces that the control device 190 has is referred to as a front surface, and a direction parallel to the normal direction of the front surface and pointing to the outside of the control device 190 is referred to as a front direction of the aircraft 100. In addition, one of surfaces that are perpendicular to the front surface among the plurality of surfaces that the control device 190 has is referred to as an upper surface, and a direction parallel to the normal direction of the upper surface and pointing to the outside of the control device 190 is referred to as an upper direction of the aircraft 100. Although, in the present embodiment, the control device 190 controls the attitude and flight of the aircraft 100 in such a way that the upper surface is parallel to the horizontal plane, the present embodiment is not limited thereto.

The aircraft 100 includes propeller arms 101 and 102 and propeller arms 103 and 104 that protrude right forward and left forward from the front surface of the control device 190 and left rearward and right rearward from the back surface of the control device 190, respectively. Further, the aircraft 100 includes propellers 111 to 114 that are installed on the tips of the propeller arms 101 to 104, respectively and not-illustrated motors that rotate the propellers 111 to 114 in accordance with control by the control device 190.

The aircraft 100 includes a first holding frame 121a and a second holding frame 121b that surround and hold an article, on the under surface of the control device 190. The first holding frame 121a of the aircraft 100 surrounds and holds the four sides of one (hereinafter, referred to as a first surrounded face) of the side faces of a rectangular parallelepiped shaped cardboard in which an article is packaged, and the second holding frame 121b surrounds and holds the four sides of another side face (hereinafter, referred to as a second surrounded face) opposite to the first surrounded face surrounded and held by the first holding frame 121a.

In addition, the aircraft 100 includes, on the under surface of the control device 190, guide rails 122a and 122b that extend in the normal direction of the first surrounded face and the second surrounded face of the article. The guide rails 122a and 122b suspend the first holding frame 121a and the second holding frame 121b, and have the movement direction of the first holding frame 121a and the second holding frame 121b as the extending direction.

Further, the aircraft 100 includes a not-illustrated motor that causes the first holding frame 121a and the second holding frame 121b to surround and hold a product by moving, in accordance with control by the control device 190, the first holding frame 121a and the second holding frame 121b in directions in which the first holding frame 121a and the second holding frame 121b come close to each other. The not-illustrated motor causes the first holding frame 121a and the second holding frame 121b to release a surrounded and held product by moving, in accordance with control by the control device 190, the first holding frame 121a and the second holding frame 121b in directions in which the first holding frame 121a and the second holding frame 121b move away from each other.

Furthermore, the aircraft 100 has first sensors 131 mounted on the upper surface of the control device 190, the first sensors 131 being used to estimate a location of an airspace in which dense fog has developed. Although, in the present embodiment, the first sensors 131 include an image sensor 131a and a wind direction/velocity sensor 131b, the present embodiment is not limited thereto.

In the present embodiment, an airspace in which fog has developed includes a space in which water droplets float. In addition, the airspace in which dense fog has developed is an airspace in which fog has developed and is a short visibility airspace that has visibility equal to or longer than "0" meters and shorter than a first visibility distance. Although, in the present embodiment, the first visibility distance is "100" meters, the present embodiment is not limited thereto, and the first visibility distance may be a distance shorter than "100" meters or a distance longer than "100" meters. A person skilled in the art can determine, by experiment, a suitable value for the first visibility distance.

The image sensor 131a outputs sensing information that is acquired by optically sensing a space. In the present embodiment, optically sensing a space includes detecting light transmitted through the space.

Thus, the image sensor 131a includes a not-illustrated lens and a not-illustrated light receiving element group that detects light transmitted through a space and subsequently caused to focus by the lens and that outputs an electrical signal matching the detected light. The image sensor 131a also includes a not-illustrated image generation circuit that generates image information indicating an image acquired by image capturing, based on a signal output from the light receiving element group and that outputs the generated image information as sensing information.

Although, in the present embodiment, the light receiving element group is charge coupled device (CCD) sensors, the present embodiment is not limited thereto, and the light receiving element group may be complementary metal oxide semiconductor (CMOS) sensors.

In addition, in the present embodiment, the shape of a light receiving surface constituted by the light receiving element group is a quadrilateral including square and rectangle. The image sensor 131a is installed on the upper surface of the control device 190 in such a way that the light receiving surface is perpendicular to the bottom surface and the upper surface of the control device 190 and one side of the square-shaped light receiving surface is parallel to the bottom surface and the upper surface of the control device 190. The reason why the image sensor 131a is installed in this manner is to align the main-scan direction and the sub-scan direction of an image with the horizontal direction and the vertical direction, respectively, the image being acquired by the image sensor 131a while the aircraft 100 flies in such a way that the horizontal plane and the bottom surface and upper surface of the control device 190 are parallel to each other.

In addition, a lens of the image sensor 131a is a wide-angle lens, and the focal distance of the lens is adjusted in advance in such a way as to have an angle of view wider than a predetermined angle of view. Further, the optical axis of the lens is adjusted in such a way as to be parallel to the front direction of the control device 190.

The wind direction/velocity sensor 131b senses wind direction and wind velocity and outputs sensing information indicating sensed wind direction and wind velocity to the control device 190. In the present embodiment, sensing wind direction and wind velocity includes detecting wind direction and wind velocity.

Thus, the wind direction/velocity sensor 131b is an ultrasonic three-dimensional sensor and detects wind velocity WVaax of wind relative to the aircraft 100 as a reference (hereinafter, referred to as aircraft-relative velocity), the wind blowing in the direction along an Xa-axis that a three-dimensional coordinate system of the aircraft 100 has. The wind direction/velocity sensor 131b also detects aircraft-relative velocity WVaay of wind blowing in the direction along a Ya-axis and aircraft-relative velocity WVaaz of wind blowing in the direction along a Za-axis. Next, the wind direction/velocity sensor 131b generates wind direction/velocity information indicating detected wind direction and wind velocity by a vector having detected aircraft-relative velocities WVaax, WVaay, and WVaaz as elements. Subsequently, the wind direction/velocity sensor 131b outputs the generated wind direction/velocity information to the control device 190 as sensing information.

The wind direction/velocity sensor 131b includes, for example, not-illustrated senders Sx, Sy, and Sz and receivers Rx, Ry, and Rz, which are piezoelectric ceramics, and a not-illustrated weather measurement circuit, as a configuration to detect the aircraft-relative velocities WVaax, WVaay, and WVaaz. The senders Sx, Sy, and Sz send ultrasonic waves to the space, based on a signal output from the weather measurement circuit. The receivers Rx, Ry, and Rz receive ultrasonic waves propagating in the space and output electrical signals matching the received ultrasonic waves to the weather measurement circuit.

The receiver Rx of the wind direction/velocity sensor 131b is placed at a location at which the receiver Rx can receive ultrasonic waves sent from the sender Sx, that is a predetermined length L away from the sender Sx, and that aligns the direction pointing from the sender Sx to the receiver Rx with the positive direction of the Xa-axis of the three-dimensional coordinate system of the aircraft 100.

The weather measurement circuit includes a timing circuit and, using the timing circuit, measures time Tx from a time at which a signal causing ultrasonic waves to be sent is output to the sender Sx to a time at which the receiver Rx having received the ultrasonic waves outputs a signal. Next, the weather measurement circuit, by dividing the length L from the sender Sx to the receiver Rx by the time Tx, calculates a measured velocity Vx of ultrasonic waves. Subsequently, the weather measurement circuit, by subtracting sound velocity Vs from the measured velocity Vx, calculates an aircraft-relative velocity WVaax of wind relative to the aircraft 100 as a reference, the wind blowing in the direction along the Xa-axis.

The receiver Ry of the wind direction/velocity sensor 131b is placed at a location at which the receiver Ry can receive ultrasonic waves sent from the sender Sy, that is the length L away from the sender Sy, and that aligns the direction pointing from the sender Sy to the receiver Ry with the positive direction of the Ya-axis. The weather measurement circuit calculates an aircraft-relative velocity WVaay, based on time Ty from a time at which a signal is output to the sender Sy to a time at which the receiver Ry outputs a signal, the length L from the sender Sy to the receiver Ry, and the sound velocity Vs.

The receiver Rz of the wind direction/velocity sensor 131b is placed at a location at which the receiver Rz can receive ultrasonic waves sent from the sender Sz, that is the length L away from the sender Sz, and that aligns the direction pointing from the sender Sz to the receiver Rz with the positive direction of the Za-axis, and the weather measurement circuit calculates an aircraft-relative velocity WVaaz.

In the present embodiment, it is assumed that the Xa-axis of the three-dimensional coordinate system of the aircraft 100 is parallel to the front direction of the aircraft 100 and has the front direction of the aircraft 100 as the positive direction. It is also assumed that the Ya-axis and the Za-axis are parallel to the leftward direction and the vertically upward direction of the aircraft 100 and have the leftward direction and the vertically upward direction of the aircraft 100 as the positive directions, respectively. In addition, although the origin of the three-dimensional coordinate system of the aircraft 100 is the central point of the aircraft 100, the present embodiment is not limited thereto.

The aircraft 100 has second sensors 132, which are different from the first sensors 131, mounted thereon. The second sensors 132 are used to determine whether or not flight continuation along a partial route that passes through a short visibility airspace (hereinafter, referred to as a short visibility route) among transport routes of articles predetermined by the control device 500 is possible. Although, in the present embodiment, the second sensors 132 include an altitude sensor 132a and a light detection and ranging (LiDAR) sensor 132b, the present embodiment is not limited thereto.

The altitude sensor 132a is a time of flight (TOF) sensor and, by emitting laser light, measures above-ground altitude of the aircraft 100. The altitude sensor 132a includes a not-illustrated light emitting element, which is, for example, a diode, and is installed on the bottom surface of the control device 190 in such a manner that emission direction in which the light emitting element emits light coincides with the downward direction of the aircraft 100. In the present embodiment, the downward direction of the aircraft 100 is the normal direction of the bottom surface of the control device 190 and a direction pointing to the outside of the control device 190. In addition, in the present embodiment, since the control device 190 controls the attitude and flight of the aircraft 100 in such a way that the bottom surface is parallel to the horizontal plane, the altitude sensor 132a emits laser light vertically downward.

The altitude sensor 132a is, for example, a CCD sensor or a CMOS sensor and further includes a not-illustrated light receiving element that receives reflected light of the emitted laser light and that outputs an electrical signal. The altitude sensor 132a also includes a not-illustrated distance measurement circuit (i) that outputs an electrical signal to the light emitting element in order to cause laser light to be emitted and (ii) to which an electrical signal that the light emitting element has output by receiving reflected light is input. The distance measurement circuit includes a not-illustrated timing circuit that measures a period from the time when an electrical signal is output to the light emitting element until an electrical signal is input from the light receiving element. The distance measurement circuit, based on the measured period, measures distance from the aircraft 100 to the ground surface at which laser light is reflected, as the above-ground altitude of the aircraft 100. Subsequently, the altitude sensor 132a outputs altitude information indicating measured above-ground altitude to the control device 190.

The LiDAR sensor 132b is a collective term for a LiDAR sensor that is installed on the front surface of the control device 190 and a LiDAR sensor that is installed on the back surface of the control device 190. The LiDAR sensor on the front surface emits laser light in a plurality of directions that, when the front direction of the aircraft 100 is used as a reference azimuthal direction, is included in a range of azimuth angle formed with the reference azimuthal direction from −90 degrees to +90 degrees and elevation angle formed with the front direction of the aircraft 100 from −90 degrees to +90 degrees.

For this purpose, the LiDAR sensor on the front surface includes a not-illustrated rotating table that has a rotational axis parallel to the front direction of the aircraft 100, a not-illustrated motor that causes the rotating table to be rotated, and a not-illustrated control circuit that controls drive of the motor. On a surface on the front side of the rotating table, a not-illustrated measurement unit that measures distance to an object is installed. The measurement unit is swingably installed on the surface on the front side of the rotating table by support members that axially support not-illustrated projecting portions projecting from both side surfaces of the measurement unit to the outside. On the surface on the front side of the rotating table, a not-illustrated motor that, by causing a gear formed on a projecting portion of the measurement unit to rotate, causes the measurement unit to swing is further installed.

The measurement unit of the LiDAR sensor on the front surface includes a not-illustrated light emitting element, light receiving element, and distance measurement circuit that have the same configurations and functions as the light emitting element, light receiving element, and distance measurement circuit of the altitude sensor 132a. The direction in which the measurement unit emits laser light is, by the rotation of the rotating table and the swing of the measurement unit, changed within a range of elevation angle formed with the front direction of the aircraft 100 from −90 degrees to +90 degrees and changed within a range of azimuth angle formed with the reference azimuthal direction from −90 degrees to +90 degrees.

The light receiving element of the LiDAR sensor on the front surface receives reflected light of the emitted laser light, and the distance measurement circuit of the LiDAR sensor on the front surface, based on time from the emission of laser light to the reception of reflected light, measures distances to a plurality of reflection points on an obstruction that reflected the laser light. In the present embodiment, examples of such an obstruction include an object that has a possibility to block flight of the aircraft 100, such as a tree, an electric wire, a utility pole, a tower, a house, and a building.

The LiDAR sensor on the front surface includes a calculation circuit that calculates coordinate values of the plurality of reflection points in the three-dimensional coordinate system of the aircraft 100, based on the emission directions of the laser light and the measured distances. The LiDAR sensor on the front surface also includes an output circuit that outputs coordinate information indicating the calculated coordinate values of the plurality of reflection points on the obstruction to the control device 190.

A configurations of the LiDAR sensor on the back surface that aircraft 100 includes is the same as the configuration of the LiDAR sensor on the front surface. The LiDAR sensor on the back surface emits laser light in a plurality of directions that, when the rearward direction of the aircraft 100 is used as a reference azimuthal direction, is included in a range of azimuth angle formed with the reference azimuthal direction from −90 degrees to +90 degrees and elevation angle formed with the rearward direction of the aircraft 100 from −90 degrees to +90 degrees. In addition, the LiDAR sensor on the back surface calculates coordinate values of a plurality of reflection points of the emitted laser light in the three-dimensional coordinate system of the vehicle 100 and outputs the calculated coordinate values of the plurality of reflection points on an obstruction to the control device 190 of the aircraft 100.

In addition, the aircraft 100 includes support legs 140 that protrude downward from the under surface of the control device 190 and that support the control device 190.

Figure 3:
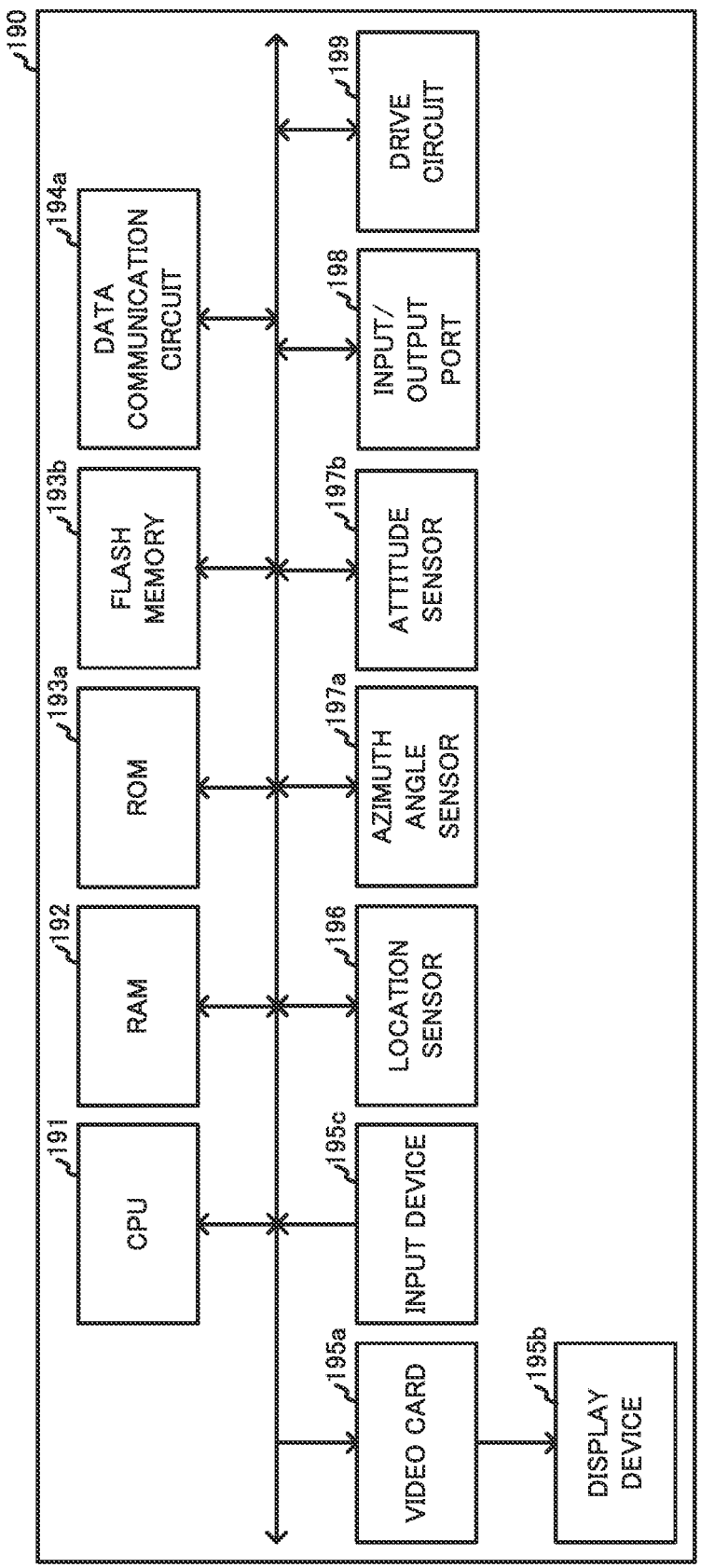
FIG. 3 is a hardware configuration diagram illustrating a configuration example of a control device that the aircraft includes.

The control device 190 of the aircraft 100 includes a central processing unit (CPU) 191, a random access memory (RAM) 192, a read only memory (ROM) 193a, a flash memory 193b, a data communication circuit 194a, a video card 195a, a display device 195b, an input device 195c, a location sensor 196, an azimuth angle sensor 197a, an attitude sensor 197b, an input/output port 198, and a drive circuit 199, which are hardware components as illustrated in FIG. 3. Although, in the present embodiment, the aircraft 100 includes one CPU 191, the aircraft 100 may include a plurality of CPUs. In addition, the aircraft 100 may include a plurality of RAMs and may include a plurality of flash memories.

The CPU 191 of the aircraft 100 performs overall control of the aircraft 100 by executing programs stored in the ROM 193a or the flash memory 193b. The RAM 192 temporarily stores data to be processed at the times of execution of the programs by the CPU 191.

The ROM 193a and the flash memory 193b of the aircraft 100 store various types of programs. The flash memory 193b further stores various types of data that are used in the execution of the programs and tables in which data are stored. The aircraft 100 may include a hard disk in place of the flash memory 193b.

The data communication circuit 194a of the aircraft 100 is a network interface card (NIC) and, in accordance with a communication standard, such as long term evolution (LTE) and 5th generation (5G), performs data communication with a not-illustrated base station that is connected to the Internet IN, using radio waves. In this way, the data communication circuit 194a of the aircraft 100 performs data communication with the control device 500 connected to the Internet IN.

The video card 195a of the aircraft 100 renders images, based on digital signals output from the CPU 191 and also outputs image signals that represent the rendered images. The display device 195b is an electroluminescence (EL) display and displays images in accordance with the image signals output from the video card 195a. The aircraft 100 may include a plasma display panel (PDP) or a liquid crystal display (LCD) in place of the EL display. The input device 195c is one or more of a touch pad and a button and inputs a signal corresponding to an operation by an employee of the transport company or a recipient of an article.

The location sensor 196 of the aircraft 100 includes a global positioning system (GPS) circuit. The location sensor 196 receives GPS signals transmitted from GPS satellites, measures latitude, longitude, and GPS altitude indicating a location of the aircraft 100, based on the received GPS signals, and outputs a location information indicating the measured latitude, longitude, and GPS altitude. The altitude sensor 132a, which is a TOF sensor, and the location sensor 196 are different from each other in that, while the altitude sensor 132a measures above-ground altitude of the aircraft 100 using the ground surface as a reference plane, the location sensor 196 measures GPS altitude of the aircraft 100 using a surface of a spheroid approximating the shape of the ground surface as a reference plane.

Although, in the present embodiment, the location sensor 196 includes a GPS circuit, the present embodiment is not limited thereto. The location sensor 196 may include a quasi-zenith satellite system (QZSS) circuit that receives signals emitted from quasi-zenith satellites and measures latitude, longitude, and altitude indicating a location of the aircraft 100, based on the received signals.

The azimuth angle sensor 197a of the aircraft 100 is, for example, a magnetic sensor, and measures an azimuth angle θ formed by the front direction of the aircraft 100 and the reference azimuthal direction in a counterclockwise manner from the reference azimuthal direction and outputs azimuth angle information indicating the measured azimuth angle θ. Although, in the present embodiment, the reference azimuthal direction is the north, the present embodiment is not limited thereto, and the reference azimuthal direction may be any azimuthal direction including, for example, the south, the east, the west, and the southeast.

The attitude sensor 197b of the aircraft 100 is, for example, a gyroscope and detects a minimum depression angle ϕf formed by the front direction of the aircraft 100 and the horizontal plane and a minimum depression angle ϕr formed by the rightward direction of the aircraft 100 and the horizontal plane and outputs attitude information indicating the detected depression angles ϕf and ϕr.

The input/output port 198 of the aircraft 100 is connected to a not-illustrated cable connected to the image sensor 131a and a not-illustrated cable connected to the wind direction/velocity sensor 131b. The input/output port 198 inputs sensing information that the image sensor 131a and the wind direction/velocity sensor 131b output, to the CPU 191. In addition, the input/output port 198 is connected to a not-illustrated cable connected to the altitude sensor 132a and a not-illustrated cable connected to the LiDAR sensor 132b. The input/output port 198 inputs altitude information that the altitude sensor 132a outputs and coordinate information that the LiDAR sensor 132b outputs, to the CPU 191.

The drive circuit 199 of the aircraft 100 is connected to not-illustrated cables that are respectively connected to the not-illustrated motors that rotate the propellers 111 to 114. The drive circuit 199 drives, in accordance with signals output by the CPU 191, the motors that rotate the propellers 111 to 114. In addition, the drive circuit 199 outputs a signal indicating the numbers of revolutions per unit time of the motors that the drive circuit 199 drives to the CPU 191.

In addition, the drive circuit 199 of the aircraft 100 is connected to a not-illustrated cable that is connected to the not-illustrated motor that causes the first holding frame 121a and the second holding frame 121b to move. The drive circuit 199 drives, in accordance with a signal output by the CPU 191, the motor that causes the first holding frame 121a and the second holding frame 121b to move.

When an article is brought into a business office of the transport company, an employee of the transport company reads the address of a transport destination of the article from a slip attached on the article and subsequently causes the aircraft 100 or 200 to store the article. Although, in the present embodiment, the following description will be made using, as a specific example, a case where the employee causes the aircraft 100 to store the article, the present embodiment is not limited thereto, and the employee may cause the aircraft 200 to store the article.

In order to cause the aircraft 100 to store the article, the employee arranges the article between the first holding frame 121a and the second holding frame 121b of the aircraft 100. Subsequently, the employee performs an operation to cause the first holding frame 121a and the second holding frame 121b to surround and hold the article, on the input device 195c of the aircraft 100. When the input device 195c outputs a signal corresponding to the operation, the CPU 191, by outputting a control signal to cause the first holding frame 121a and the second holding frame 121b to move in the directions in which the first holding frame 121a and the second holding frame 121b come close to each other to the drive circuit 199, causes the aircraft 100 to store the article.

When the employee who has visually recognized that the article is stored in the aircraft 100 performs an operation to input a vehicle identification (ID) "100" identifying the aircraft 100 and the address of the transport destination of the article on the control device 500, the control device 500 determines a transport route that starts from the business office and that reaches the transport destination. Next, the control device 500 sends a flight command that includes route information indicating the determined transport route and that commands a flight along the transport route and altitude change permission that permits changing altitude in order to fly the transport route, to the aircraft 100. The route information includes information indicating locations of a plurality of transit points included in the transport route in latitude, longitude, and GPS altitude and information indicating a visiting sequence of the plurality of transit points.

When the data communication circuit 194a of the aircraft 100 receives a flight command, the CPU 191 of the aircraft 100 starts execution of flight processing as illustrated in FIGS. 4A, 4B, and 5 in order to fly in accordance with the flight command.

When the execution of the flight processing is started, the CPU 191 of the aircraft 100 acquires the flight command and altitude change permission sent along with the flight command, from the data communication circuit 194a (step S01). Next, the CPU 191 acquires route information indicating a transport route from the flight command (step S02) and stores the route information in a predetermined area in the RAM 192, the predetermined area being an area in which a flight route that the aircraft 100 is caused to fly is stored. In this way, the CPU 191 sets the flight route to the transport route.

Subsequently, the CPU 191 of the aircraft 100 initializes the value of an altitude change permission flag indicating whether a change in altitude is permitted or restricted to a value "true" indicating that a change in altitude is permitted, in accordance with the altitude change permission (step S03).

The reason why a change in altitude is restricted is to suppress the aircraft 100 from exiting a flight permitted airspace in which flight by the aircraft 100 is permitted in advance by laws and regulations. That is, the reason is to suppress the aircraft 100 from entering a flight forbidden airspace in which flight by the aircraft 100 is forbidden in advance by laws and regulations. In the present embodiment, the flight permitted airspace includes an airspace the above-ground altitude of which is stipulated to be within a range of "30" meters or more and less than "150" meters by laws and regulations in advance. In addition, the flight forbidden airspace includes an airspace the above-ground altitude of which is stipulated to be within a range of less than "30" meters and an airspace the above-ground altitude of which is stipulated to be a range of "150" meters or more, by laws and regulations in advance. However, the flight permitted airspace and the flight forbidden airspace are not limited to the airspaces.

Next, the CPU 191 of the aircraft 100 generates a control signal to cause the aircraft 100 to take off and outputs the generated control signal to the drive circuit 199 (step S04). The drive circuit 199 drives, in accordance with the control signal, the motors that rotate the propellers 111 to 114. In this way, the aircraft 100 takes off from the business office.

Figure 6A:
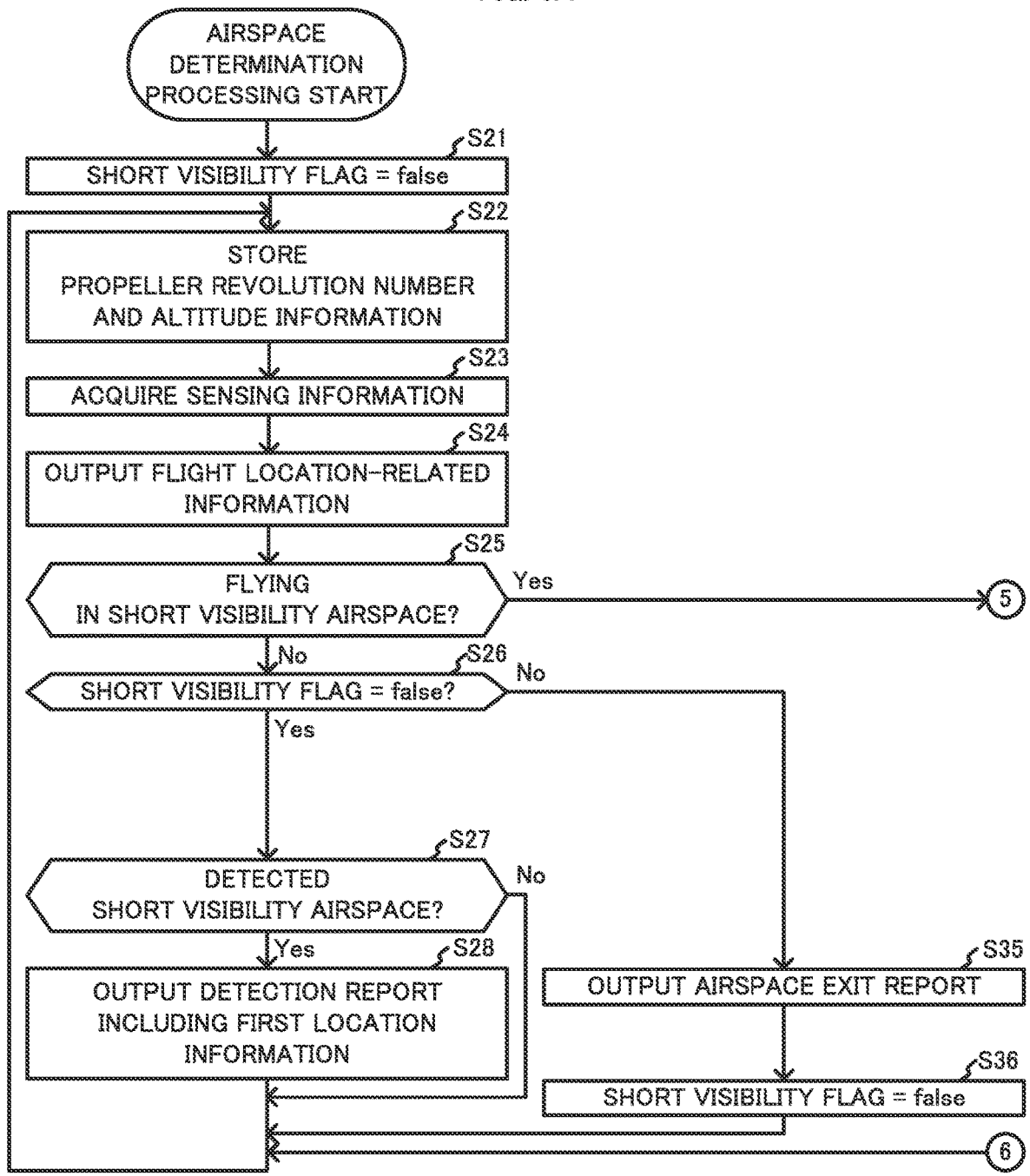
FIGS. 6A and 6B are a flowchart illustrating an example of airspace determination processing that the aircraft executes.
Figure 6B:
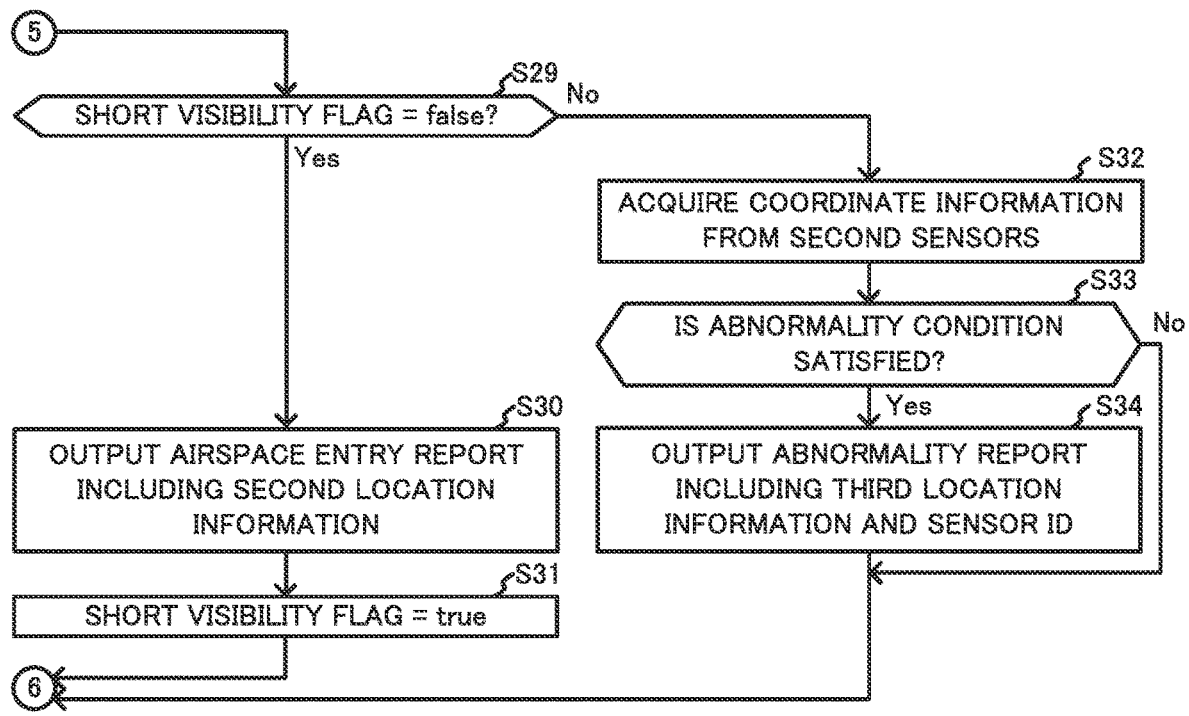

Next, the CPU 191 of the aircraft 100 generates a thread different from a thread executing the flight processing. Subsequently, the CPU 191 begins to execute airspace determination processing of determining whether or not an airspace in which the aircraft 100 flies is a short visibility airspace in which dense fog has developed, as illustrated in FIGS. 6A and 6B, in the generated thread in parallel with the flight processing (step S05). Therefore, a description of the airspace determination processing will be made first, suspending the description of the flight processing.

When the CPU 191 of the aircraft 100 starts execution of the airspace determination processing, the CPU 191 initializes the value of a short visibility flag, the short visibility flag indicating whether the airspace in which the aircraft 100 flies is a short visibility airspace or a non-short visibility airspace in which the visibility is equal to or greater than the predetermined first visibility distance, to a value "false" indicating that the airspace is a non-short visibility airspace (step S21).

Next, the CPU 191 of the aircraft 100 acquires altitude information output from the altitude sensor 132a. The CPU 191 also acquires revolution number information indicating the numbers of revolutions per unit time of the propellers 111 to 114, based on a signal output from the drive circuit 199. Subsequently, CPU 191 acquires a system time from, for example, an operating system (OS). Next, the CPU 191 stores information indicating the system time in the flash memory 193b as time information indicating a time at which the altitude information and the revolution number information are acquired, in association with the altitude information and the revolution number information (step S22).

Next, the CPU 191 of the aircraft 100 acquires image information output from the image sensor 131a and wind direction/velocity information output from the wind direction/velocity sensor 131b as sensing information (step S23). The CPU 191 also acquires location information output from the location sensor 196 as information indicating the location of a point at which the sensing information is acquired. The CPU 191 further acquires a system time from, for example, the OS and sets information indicating the acquired system time as time information indicating a time at which the sensing information and the location information are acquired.

Next, the CPU 191 of the aircraft 100 acquires azimuth angle information output from the azimuth angle sensor 197a. Next, the CPU 191 calculates a transformation matrix that transforms the three-dimensional coordinate system of the aircraft 100 to a world coordinate system, based on the azimuth angle θ indicated by the azimuth angle information and the location indicated by the location information.

The reason why the attitude information output from the attitude sensor 197b is not used in the calculation of a transformation matrix is that, in the present embodiment, the aircraft 100 flies in such a manner that the front-rear direction of the aircraft 100 and the horizontal plane are parallel to each other and the right-left direction of the aircraft 100 and the horizontal plane are parallel to each other. However, the present embodiment is not limited to the above description, and the attitude information may be used in the calculation of a transformation matrix.

In addition, although, in the present embodiment, the world coordinate system has a point located at an east longitude of "0" degrees, a north latitude of "0" degrees, and a GPS altitude of "0" meters as the origin and has an Xw-axis with the east as the positive direction, a Yw-axis with the north, which is the reference azimuthal direction, as the positive direction and a Zw-axis with the vertically upward direction as the positive direction, the present embodiment is not limited thereto.

Subsequently, the CPU 191 of the aircraft 100 transforms the aircraft-relative velocities WVaax, WVaay, and WVaaz, which are velocities indicated by the wind direction/velocity information and are represented in the three-dimensional coordinate system of the aircraft 100, to aircraft-relative velocities WVwax, WVway, and WVwaz in the world coordinate system.

Next, the CPU 191 of the aircraft 100 sleeps for a unit of time and subsequently acquires location information from the location sensor 196 again, in order to calculate a ground-relative velocity of the aircraft 100. Next, the CPU 191 of the aircraft 100 calculates a ground-relative velocity AVwgx in the Xw-axis direction, a ground-relative velocity AVwgy in the Yw-axis direction, and a ground-relative velocity AVwgz in the Zw-axis direction of the aircraft 100 in the world coordinate system, based on the location information acquired before sleep, the location information acquired after sleep, and the unit of time.

Next, the CPU 191 of the aircraft 100 adds the ground-relative velocities AVwgx, AVwgy, and AVwgz of the aircraft 100 in the world coordinate system to the aircraft-relative velocities WVwax, WVway, and WVwaz of wind in the world coordinate system, respectively. Through this calculation, the CPU 191 calculates ground-relative velocities WVwgx, WVwgy, and WVwgz in the world coordinate system of wind blowing at the location of the aircraft 100.

Subsequently, the CPU 191 of the aircraft 100 generates flight location-related information relating to the flight location of the aircraft 100 by associating the location information acquired before sleep, sensing information acquired at a location indicated by the location information, sensing direction information indicating direction in which sensing was performed, and time information indicating a time at which the sensing information was acquired with one another.

The sensing information included in the flight location-related information includes image information acquired by image capturing performed by the image sensor 131a at the location at the time and ground-relative wind direction/velocity information indicating wind direction and wind velocity of wind that was blowing at the location at the time in the ground-relative velocities WVwgx, WVwgy, and WVwgz in the world coordinate system.

In addition, the sensing direction information included in the flight location-related information is information indicating image capturing direction of the image sensor 131a at the time. Since the optical axis of the image sensor 131a is adjusted in such a way as to be parallel to the front direction of the aircraft 100, the image capturing direction of the image sensor 131a is represented by the azimuth angle θ, which is formed by the front direction of the aircraft 100 and the reference azimuthal direction. Thus, the sensing direction information includes the azimuth angle information output from the azimuth angle sensor 197a.

The reason why the sensing direction information does not include the attitude information output from the attitude sensor 197b is that, in the present embodiment, the aircraft 100 flies in such a manner that the front-rear direction of the aircraft 100 and the horizontal plane are parallel to each other and the right-left direction of the aircraft 100 and the horizontal plane are parallel to each other. However, the present embodiment is not limited to the above description, and the sensing direction information may further include the attitude information.

After the flight location-related information has been generated, the CPU 191 of the aircraft 100 acquires a vehicle ID "100" identifying the aircraft 100 from the flash memory 193b and outputs the acquired vehicle ID "100" and the flight location-related information to the data communication circuit 194a with the control device 500 as the destination (step S24). Subsequently, the data communication circuit 194a of the aircraft 100 sends the vehicle ID "100" and the flight location-related information to the control device 500.

Next, the CPU 191 of the aircraft 100 acquires information indicating a range of R values, a range of G values, and a range of B values of pixels corresponding to a densely fogged short visibility airspace from the flash memory 193b. Although, in the present embodiment, since pixels corresponding to a densely fogged short visibility airspace are white pixels, the range of R values, the range of G values, and the range of B values of the pixels are respectively set to a range from "245" to "255", the present embodiment is not limited thereto. A person skilled in the art can determine, by experiment, suitable ranges for the range of R values, the range of G values, and the range of B values of pixels corresponding to a densely fogged short visibility airspace.

Subsequently, the CPU 191 of the aircraft 100 tries detection of a white pixel the R value, G value, and B value of which are included in the range of R values, the range of G values, and the range of B values indicated by the acquired information, respectively, from an image indicated by the sensing information acquired in step S23. When, on this occasion, no white pixel is detected, the CPU 191 determines that the aircraft 100 is flying not in a densely fogged short visibility airspace but in a non-short visibility airspace (step S25; No).

In contrast, when a white pixel is detected, the CPU 191 of the aircraft 100 reads information indicating a predetermined white ratio from the flash memory 193b. Next, the CPU 191 calculates a ratio of the number of white pixels to the total number of pixels in the image indicated by the sensing information and, when the calculated ratio is less than the predetermined white ratio, determines that the aircraft 100 is flying in a non-short visibility airspace (step S25; No).

When it is determined that the aircraft 100 is flying in a non-short visibility airspace, the CPU 191 of the aircraft 100 determines whether or not the value of the short visibility flag is the value "false" indicating a non-short visibility airspace (step S26). When, on this occasion, the CPU 191 determines that the value of the short visibility flag is the value "false" (step S26; Yes), the CPU 191 determines that the aircraft 100 has not exited a short visibility airspace into the non-short visibility airspace but continued flying in the non-short visibility airspace.

Subsequently, when a white pixel is detected in the processing in step S25, the CPU 191 of the aircraft 100 determines whether or not there exists a white image region in which white pixels more than a predetermined number succeed in the image indicated by the sensing information. When, on this occasion, the CPU 191 determines that there exists a white image region, the CPU 191 detects the white image region as a short visibility image region corresponding to a densely fogged short visibility airspace. Next, the CPU 191 determines that a short visibility airspace is detected in an airspace located in the travel direction of the aircraft 100 (step S27; Yes) and generates a detection report announcing that a short visibility airspace is detected.

Figure 7:
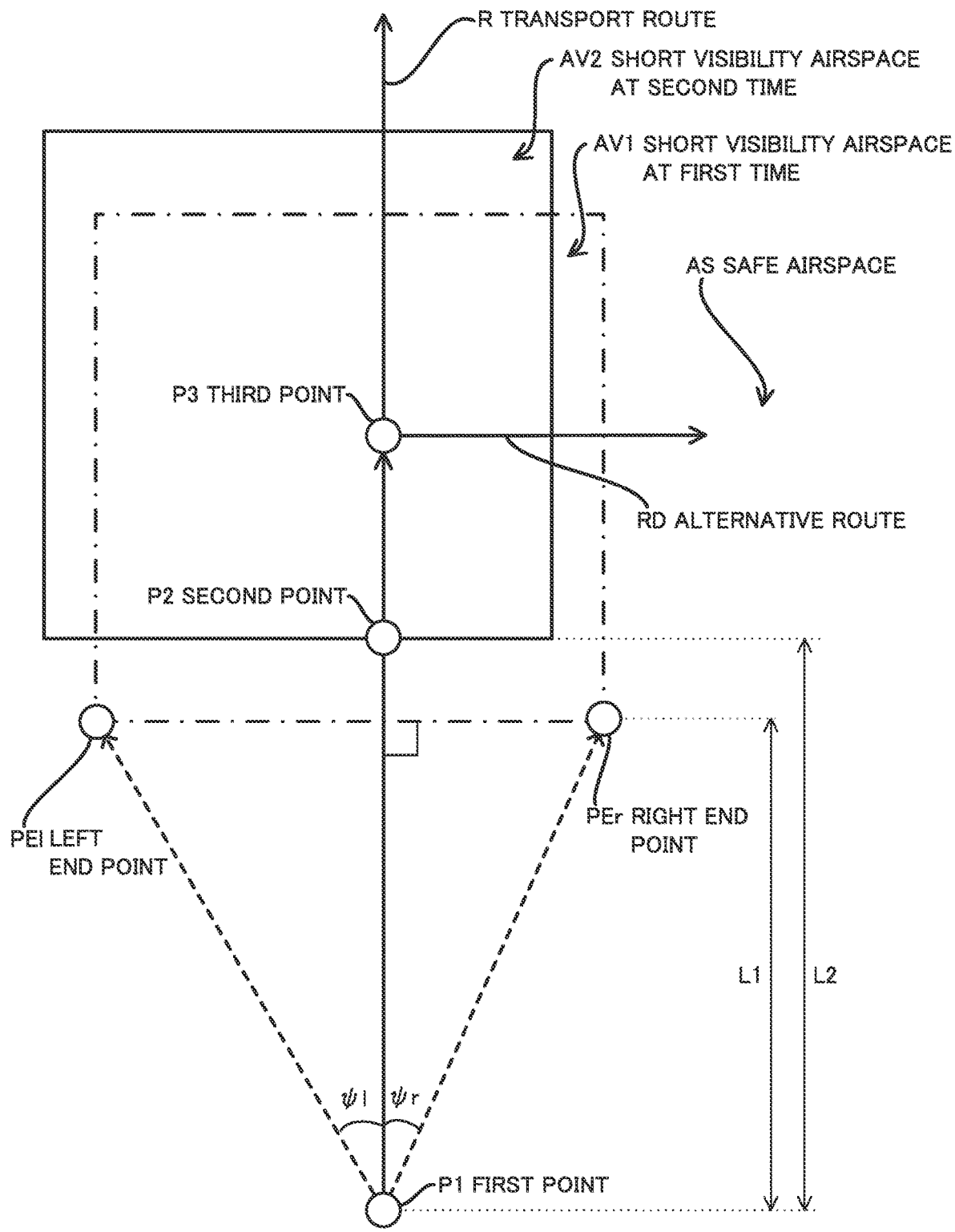
FIG. 7 is a diagram illustrating examples of a first point, a second point, and a third point.

Subsequently, the CPU 191 of the aircraft 100 adds the location information acquired before sleep in step S23 to the detection report as first location information indicating a point (hereinafter, referred to as a first point) P1 at which a short visibility airspace is detected, as illustrated in FIG. 7. Next, the CPU 191 outputs the detection report including the first location information to the data communication circuit 194a with the control device 500 as the destination (step S28) and subsequently repeats the above-described process from step S22.

In contrast, when, in the processing in step S25, no white pixel is detected or it is determined that there exists no white image region, the CPU 191 of the aircraft 100 determines that no short visibility airspace is detected (step S27; No) and repeats the above-described process from step S22.

When, in step S25, the ratio of the number of white pixels is equal to or greater than the predetermined white ratio, the CPU 191 of the aircraft 100 determines that the aircraft 100 is flying in a densely fogged short visibility airspace (step S25; Yes). Next, the CPU 191 determines whether or not the value of the short visibility flag is the value "false" indicating a non-short visibility airspace (step S29). When, on this occasion, the CPU 191 determines that the value of the short visibility flag is the value "false" (step S29; Yes), the CPU 191 determines that the aircraft 100 has entered the short visibility airspace from a non-short visibility airspace and generates an airspace entry report announcing that the aircraft 100 has entered a short visibility airspace.

Subsequently, the CPU 191 of the aircraft 100 adds the location information acquired before sleep in step S23 to the airspace entry report as second location information indicating a point (hereinafter, referred to as a second point) P2 at which entry into a short visibility airspace is determined, as illustrated in FIG. 7. Next, the CPU 191 outputs the airspace entry report including the second location information to the data communication circuit 194a with the control device 500 as the destination (step S30). Next, the CPU 191 changes the value of the short visibility flag to a value "true" indicating a short visibility airspace (step S31) and subsequently repeats the above-described process from step S22.

When, in step S29, the CPU 191 of the aircraft 100 determines that the value of the short visibility flag is not the value "false" but the value "true" (step S29; No), the CPU 191 determines that the aircraft 100 has continued flight in the short visibility airspace. Next, the CPU 191 acquires coordinate information output from the LiDAR sensor 132b (steps S32). The reason why the altitude information is not acquired is that the altitude information has been acquired in step S22.

Next, the CPU 191 of the aircraft 100 determines whether or not the altitude information from the altitude sensor 132a, which is one of the second sensors 132, satisfies an abnormality condition predetermined with respect to the altitude sensor 132a (hereinafter, referred to as an abnormality condition of the altitude sensor 132a).

In the present embodiment, the abnormality condition of the altitude sensor 132a includes a first condition that, during a predetermined period, the numbers of revolutions per unit time of the propellers 111 to 114 are equal to or greater than a predetermined first revolution number and the above-ground altitude indicated by the altitude information changes only less than a predetermined altitude or does not change. In the present embodiment, the first revolution number is set in advance to a value greater than a minimum value of the number of revolutions required for lift generated by the propellers 111 to 114 to cause the aircraft 100 storing an article to climb. However, the first revolution number is not limited thereto, and a person skilled in the art can determine, by experiment, a suitable value for the first revolution number.

In the present embodiment, the abnormality condition of the altitude sensor 132a also includes a second condition that, during a predetermined period, the numbers of revolutions per unit time of the propellers 111 to 114 are equal to or less than a predetermined second revolution number and the above-ground altitude indicated by the altitude information changes only less than the predetermined altitude or does not change. In the present embodiment, the second revolution number is set in advance to a value less than a minimum value of the number of revolutions required for lift generated by the propellers 111 to 114 to maintain the altitude of the aircraft 100 storing an article. However, the second revolution number is not limited thereto, and a person skilled in the art can determine, by experiment, a suitable value for the second revolution number.

In the present embodiment, the abnormality condition of the altitude sensor 132a further includes a third condition that, during a predetermined period, the numbers of revolutions per unit time of the propellers 111 to 114 are greater than the second revolution number and less than the first revolution number and the above-ground altitude indicated by the altitude information changes equal to or more than the predetermined altitude.

The altitude information satisfying the abnormality condition of the altitude sensor 132a is output from the altitude sensor 132a when, for example, the probability that water droplets floating between the aircraft 100 and the ground surface reflect laser light emitted from the altitude sensor 132a is higher than a predetermined first probability. Thus, when the abnormality condition of the altitude sensor 132a is satisfied, the above-ground altitude indicated by the altitude information differs greater than error of the altitude sensor 132a from actual above-ground altitude of the aircraft 100.

In general, the probability that water droplets floating in a short visibility airspace reflect laser light becomes higher as, for example, the visibility of the short visibility airspace becomes shorter. Thus, the altitude information satisfying the abnormality condition of the altitude sensor 132a is output when, for example, the visibility of the short visibility airspace becomes shorter than a second visibility distance that is determined to be shorter than the first visibility distance in advance. In addition, the visibility of the short visibility airspace becomes shorter as, for example, the sizes of water droplets floating in the short visibility airspace becomes larger and becomes shorter as the number of water droplets increases. Thus, the altitude information satisfying the abnormality condition of the altitude sensor 132a is output when, for example, an average value of the sizes of water droplets floating in the short visibility airspace becomes larger than a predetermined first size or the number of water droplets floating in the short visibility airspace becomes more than a predetermined first number.

The CPU 191 of the aircraft 100 acquires a system time from the OS in order to determine whether or not the abnormality condition of the altitude sensor 132a is satisfied. Next, the CPU 191 acquires, from the flash memory 193b, a plurality of pieces of altitude information and a plurality of pieces of revolution number information associated with a plurality of pieces of time information indicating times (i) before or at the acquired system time and (ii) at or after a time earlier than the system time by a predetermined period.

Subsequently, the CPU 191 of the aircraft 100 determines whether above-ground altitudes respectively indicated by the acquired plurality of pieces of altitude information and the numbers of revolutions per unit time of the propellers 111 to 114 respectively indicated by the acquired plurality of pieces of revolution number information satisfy any one of the first condition, the second condition, and the third condition or do not satisfy any of the first condition, the second condition, and the third condition. When, on this occasion, the CPU 191 determines that any one of the first condition, the second condition, and the third condition is satisfied, the CPU 191 determines that the abnormality condition of the altitude sensor 132a is satisfied. In contrast, when the CPU 191 of the aircraft 100 determines that none of the first condition, the second condition, and the third condition is satisfied, the CPU 191 determines that the abnormality condition of the altitude sensor 132a is not satisfied.

Next, the CPU 191 of the aircraft 100 determines whether or not the coordinate information from the LiDAR sensor 132b, which is one of the second sensors 132, satisfies an abnormality condition predetermined with respect to the LiDAR sensor 132b (hereinafter, referred to as an abnormality condition of the LiDAR sensor 132b).

In the present embodiment, the abnormality condition of the LiDAR sensor 132b is a condition that a plurality of reflection points indicated by the coordinate information is located at locations at which the aircraft 100 cannot move away from the current location of the aircraft 100 by a predetermined minimum movement distance unless the aircraft 100 comes into contact with any one or more of the plurality of reflection points. That is, the abnormality condition of the LiDAR sensor 132b is a condition that the aircraft 100 is surrounded by a plurality of reflection points that is away from the current location of the aircraft 100 only by a distance shorter than the minimum movement distance. Although, in the present embodiment, the minimum movement distance is "1" meter, the present embodiment is not limited thereto, and the minimum movement distance may be longer or shorter than "1" meter. In addition, a person skilled in the art can determine, by experiment, a suitable value for the minimum movement distance.

The coordinate information satisfying the abnormality condition of the LiDAR sensor 132b is output from the LiDAR sensor 132b when, for example, the reflection probability of the water droplets is higher than a predetermined second probability. The reflection probability of the water droplets is probability that water droplets away from the aircraft 100 only by a distance shorter than the minimum movement distance reflect laser light emitted from the LiDAR sensor 132b. Since water droplets are not obstructions, it becomes impossible to detect an obstruction, based on the coordinate information output from the LiDAR sensor 132b when the abnormality condition of the LiDAR sensor 132b is satisfied.

The coordinate information satisfying the abnormality condition of the LiDAR sensor 132b is output when, for example, the visibility of the short visibility airspace becomes shorter than a third visibility distance that is determined to be shorter than the first visibility distance in advance. The coordinate information satisfying the abnormality condition of the LiDAR sensor 132b is also output when, for example, an average value of the sizes of water droplets floating in the short visibility airspace becomes larger than a predetermined second size or the number of water droplets floating in the short visibility airspace becomes more than a predetermined second number.

The CPU 191 of the aircraft 100 calculates, for example, an average value and a variance value of distances between a plurality of reflection points that are indicated by the coordinate information output from the LiDAR sensor 132b and the aircraft 100 in order to determine whether or not the abnormality condition of the LiDAR sensor 132b is satisfied. Next, when the calculated average value is equal to or less than the minimum movement distance and the calculated variance value is equal to or less than a predetermined threshold value of the variance value, the CPU 191 determines that the abnormality condition of the LiDAR sensor 132b is satisfied. The reason for such a determination is that, since water droplets generally float in a short visibility airspace at a uniform concentration, the average value and the variance value of distances between reflection points and the aircraft 100 become equal to or less than the minimum movement distance and the predetermined threshold value, respectively, when the reflection probability of water droplets becomes higher than the second probability. The reflection probability of water droplets is probability that water droplets away from the aircraft 100 only by a distance shorter than the minimum movement distance reflect laser light. Note that a person skilled in the art can determine, by experiment, a suitable value for the threshold value of the variance value.

In a first case where it is determined that the abnormality condition of the altitude sensor 132a is satisfied, in a second case where it is determined that the abnormality condition of the LiDAR sensor 132b is satisfied, or in the first case and the second case (step S33; Yes), the CPU 191 of the aircraft 100 generates an abnormality report announcing that an abnormality condition is satisfied.

Next, when it is determined that the abnormality condition of the altitude sensor 132a is satisfied and it is determined that the abnormality condition of the LiDAR sensor 132b is satisfied, the CPU 191 of the aircraft 100 adds a sensor ID identifying the altitude sensor 132a and a sensor ID of the LiDAR sensor 132b to the abnormality report. In contrast, when, although it is determined that the abnormality condition of the altitude sensor 132a is satisfied, it is not determined that the abnormality condition of the LiDAR sensor 132b is satisfied, the CPU 191 adds the sensor ID of the altitude sensor 132a, but does not add the sensor ID of the LiDAR sensor 132b to the abnormality report. In addition, in contrast, when, although it is not determined that the abnormality condition of the altitude sensor 132a is satisfied, it is determined that the abnormality condition of the LiDAR sensor 132b is satisfied, the CPU 191 adds the sensor ID of the LiDAR sensor 132b, but does not add the sensor ID of the altitude sensor 132a to the abnormality report.

Subsequently, the CPU 191 of the aircraft 100 adds the location information acquired in step S23 to the abnormality report as third location information indicating a point (hereinafter, referred to as a third point P3) at which it is determined that an abnormality condition is satisfied, as illustrated in FIG. 7. Next, the CPU 191 outputs the abnormality report including the sensor ID and the third location information to the data communication circuit 194a with the control device 500 as the destination (step S34) and subsequently repeats the above-described process from step S22.

When, in step S33, it is not determined that the abnormality condition of the altitude sensor 132a is satisfied and it is not determined that the abnormality condition of the LiDAR sensor 132b is satisfied (step S33; No), the CPU 191 of the aircraft 100 repeats the above-described process from step S22.

When, after, in step S25, it has been determined that the aircraft 100 is flying in a non-short visibility airspace (step S25; No), the CPU 191 of the aircraft 100 determines that the value of the short visibility flag is not the value "false" indicating a non-short visibility airspace but the value "true" indicating a short visibility airspace (step S26 No), the CPU 191 determines that the aircraft 100 has exited the short visibility airspace into the non-short visibility airspace. Subsequently, the CPU 191 outputs an airspace exit report announcing that the aircraft 100 has exited a short visibility airspace, to the data communication circuit 194a with the control device 500 as the destination (step S35). Next, the CPU 191 changes the value of the short visibility flag to the value "false" indicating a non-short visibility airspace (step S36) and subsequently repeats the above-described process from step S22. In this way, the CPU 191 continues execution of the airspace determination processing in a thread different from the thread executing the flight processing in FIGS. 4A, 4B, and 5.

Next, the description of the flight processing that has been suspended will be resumed. After, in step S05 in FIG. 4A, the CPU 191 of the aircraft 100 has started parallel execution of the airspace determination processing (step S05), the CPU 191 acquires location information indicating the location of the aircraft 100 in latitude, longitude, and GPS altitude from the location sensor 196 (step S06). Subsequently, the CPU 191 of the aircraft 100 identifies latitude, longitude, and GPS altitude of the first transit point in the visiting sequence (hereinafter, referred to as a next transit point) among one or a plurality of unvisited transit points, based on the route information.

Next, the CPU 191 of the aircraft 100 determines whether or not the value of the altitude change permission flag is the value "true" indicating that a change in altitude is permitted (step S07). When, on this occasion, the CPU 191 determines that the value of the altitude change permission flag is the value "true" (step S07; Yes), the CPU 191 generates a control signal to cause the aircraft 100 to make a flight that reduces distance from the aircraft 100 to the next transit point while changing altitude as needed, based on the latitude, longitude, and GPS altitude of the aircraft 100 and the latitude, longitude, and GPS altitude of the next transit point. Subsequently, the CPU 191, by outputting the generated control signal to the drive circuit 199 (step S08), causes the aircraft 100 to fly the flight route in the forward direction while changing above-ground altitude as needed.

The CPU 191 of the aircraft 100 also generates a control signal to cause the numbers of revolutions per unit time of the propellers 111 to 114 to be changed in such a way that the altitude information output from the altitude sensor 132a becomes information indicating an above-ground altitude included in a range of above-ground altitude of the flight permitted airspace. The CPU 191 of the aircraft 100 further generates a control signal to cause the aircraft 100 to fly avoiding an obstruction, based on the coordinate information output from the LiDAR sensor 132b. Subsequently, the CPU 191 outputs the generated control signals to the drive circuit 199.

Furthermore, the CPU 191 of the aircraft 100 calculates an equation representing direction pointing from the location of the aircraft 100 to the next transit point, based on the latitude, longitude, and GPS altitude of the aircraft 100, which are indicated by the location information, and the latitude, longitude, and GPS altitude of the next transit point. Subsequently, the CPU 191 of the aircraft 100 calculates an azimuth angle θ' formed by the direction pointing from the aircraft 100 to the next transit point and the reference azimuthal direction in a counterclockwise manner from the reference azimuthal direction, based on the calculated equation. Next, the CPU 191 of the aircraft 100 generate a control signal to cause the azimuth angle θ indicated by the azimuth angle information output from the azimuth angle sensor 197a and the calculated azimuth angle θ' to coincide with each other. Subsequently, the CPU 191, by outputting the generated control signal to the drive circuit 199, causes the front direction of the aircraft 100 and the image capturing direction of the image sensor 131a to coincide with the travel direction of the aircraft 100.

In addition, the CPU 191 of the aircraft 100 generates a control signal to cause the depression angles φf and φr indicated by the attitude information output from the attitude sensor 197b to coincide with an angle of "0" degrees and outputs the generated control signal to the drive circuit 199. Through this processing, the CPU 191 maintains the upper surface and the bottom surface of the control device 190 of the aircraft 100 parallel to the horizontal plane.

Next, the CPU 191 of the aircraft 100 determines whether or not the aircraft 100 has arrived at the transport destination of the article, which is a movement destination, based on whether or not a transit point at which the aircraft 100 has not arrived exists (step S09). When, on this occasion, the CPU 191 determines that the aircraft 100 has not arrived at the movement destination because a transit point at which the aircraft 100 has not arrived exists (step S09; No), the CPU 191 determines whether or not the data communication circuit 194a has received a route change command from the control device 500 (step S10).

The route change command is a command that commands the aircraft 100 to change the flight route that the aircraft 100 flies to an alternative route indicated by route information included in the route change command. In the present embodiment, the route change command is sent from the control device 500 to the aircraft 100 when, while the aircraft 100 flies in the short visibility airspace, the abnormality condition of one of the second sensors 132 is satisfied and flight continuation along the short visibility route is determined to be impracticable or when an abnormality in the altitude of the aircraft 100 is visually recognized by the assistant.

Although, in the present embodiment, examples of abnormality in the altitude of the aircraft 100 include flight by the aircraft 100 in a flight forbidden airspace located above a flight permitted airspace, the present embodiment is not limited thereto. Examples of abnormality in the altitude of the aircraft 100 may include flight by the aircraft 100 in a flight forbidden airspace located below a flight permitted airspace.

The CPU 191 of the aircraft 100 tries acquisition of a route change command from the data communication circuit 194a and, when no route change command is acquired, determines that no route change command has been received (step S10; No). Subsequently, the CPU 191 repeats the above-described process from step S06 in order to continue flight along the flight route.

In contrast, when a route change command is acquired from the data communication circuit 194a, the CPU 191 of the aircraft 100 determines that a route change command has been received (step S10; Yes). Next, the CPU 191 acquires route information from the route change command (step S11) and changes the flight route to an alternative route RD indicated by the acquired route information.

Subsequently, the CPU 191 of the aircraft 100 tries acquisition of altitude change permission and altitude change restriction that restricts a change in altitude. When, on this occasion, although altitude change permission is acquired, no altitude change restriction is acquired (step S12; Yes), the CPU 191 changes the value of the altitude change permission flag to a value "true" indicating that a change in altitude is permitted (step S13). Subsequently, the CPU 191 repeats the above-described process from step S06 in order to fly a flight route after change, changing altitude as needed.

In contrast, when, although no altitude change permission is acquired, altitude change restriction is acquired (step S12; No), the CPU 191 of the aircraft 100 changes the value of the altitude change permission flag to a value "false" indicating that a change in altitude is restricted (step S14). Subsequently, the CPU 191 repeats the above-described process from step S06 in order to fly the flight route after change, restricting a change in altitude.

When, in step S07, the CPU 191 of the aircraft 100 determines that the value of the altitude change permission flag is the value "false" indicating that a change in altitude is restricted (step S07; No), the CPU 191 determines whether or not the value of the short visibility flag, which has been updated in the airspace determination processing in FIGS. 6A and 6B, is the value "true" indicating that the airspace is a short visibility airspace (step S15).

When, on this occasion, the CPU 191 of the aircraft 100 determines that the value of the short visibility flag is not the value "true" but the value "false" indicating that the airspace is a non-short visibility airspace (step S15; No), the CPU 191 determines that it becomes unnecessary to restrict a change in altitude because the abnormality conditions of the second sensors 132 become unsatisfied. Thus, the CPU 191 changes the value of the altitude change permission flag to the value "true" indicating that a change in altitude is permitted (step S16). Subsequently, the CPU 191 repeats the above-described process from step S08 in order to fly the flight route after change, changing altitude as needed.

In contrast, when the CPU 191 of the aircraft 100 determines that the value of the short visibility flag is the value "true" indicating that the airspace is a short visibility airspace (step S15; Yes), the CPU 191 outputs a control signal to cause the aircraft 100 to fly the flight route in the forward direction while not changing but maintaining the numbers of revolutions per unit time of the propellers 111 to 114, to the drive circuit 199 (step S17). The reason why the numbers of revolutions per unit time of the propellers 111 to 114 are maintained is that, when (i) the ground surface is flat and (ii) the lift of the aircraft 100 maintained by maintenance of the numbers of revolutions and the force of gravity exerted on the aircraft 100 balance with each other, it is possible to maintain the above-ground altitude of the aircraft 100.

On this occasion, the CPU 191 of the aircraft 100, as with the processing in step S08, causes the aircraft 100 to fly with the upper surface and the bottom surface of the control device 190 maintained parallel to the horizontal plane. The CPU 191 also causes the aircraft 100 to fly with (i) the front direction of the aircraft 100 coinciding with the travel direction of the aircraft 100 and (ii) the image capturing direction of the image sensor 131a coinciding with the travel direction of the aircraft 100. Subsequently, the CPU 191 repeats the above-described process from the processing in step S09 in FIG. 5 of determining whether or not the aircraft 100 has arrived at the movement destination.

When, in step S09, the CPU 191 of the aircraft 100 determines that the aircraft 100 has arrived at the movement destination because there exists no transit point at which the aircraft 100 has not arrived (step S09; Yes), the CPU 191 outputs a control signal to cause the aircraft 100 to land to the drive circuit 199 (step S18). Next, the CPU 191 of the aircraft 100 outputs an arrival report announcing that the aircraft 100 has arrived at the movement destination to the data communication circuit 194a with the control device 500 as the destination (step S19), and the data communication circuit 194a sends the arrival report to the control device 500.

Next, the CPU 191 of the aircraft 100 terminates the thread executing the airspace determination processing in FIGS. 6A and 6B (step S20) and subsequently terminates the execution of the flight processing.

The recipient who is present at the transport destination performs an operation to cause the first holding frame 121a and second holding frame 121b of the aircraft 100 to release the article, on the input device 195c of the aircraft 100. When the input device 195c outputs a signal corresponding to the operation, the CPU 191 causes the aircraft 100 to release the article, by outputting a control signal to cause the first holding frame 121a and the second holding frame 121b to move in the directions in which the first holding frame 121a and the second holding frame 121b move away from each other to the drive circuit 199.

When the recipient receives the released article, the recipient performs, on the input device 195c of the aircraft 100, an operation to cause the aircraft 100 to return. When the input device 195c outputs a signal corresponding to the operation, the CPU 191 outputs a delivery report announcing that delivery of the article has been performed to the data communication circuit 194a with the control device 500 as the destination.

When the control device 500 receives the delivery report from the aircraft 100, the control device 500 sets a return route that starts from the transport destination and that reaches the business office and sends a flight command commanding a flight along the set return route to the aircraft 100. When the aircraft 100 receives the flight command, the aircraft 100 performs execution of the flight processing illustrated in FIGS. 4A, 4B, and 5 in order to return to the business office in accordance with the flight command.

A configuration and functions of the aircraft 200 are the same as the configuration and the functions of the aircraft 100.

Figure 8:
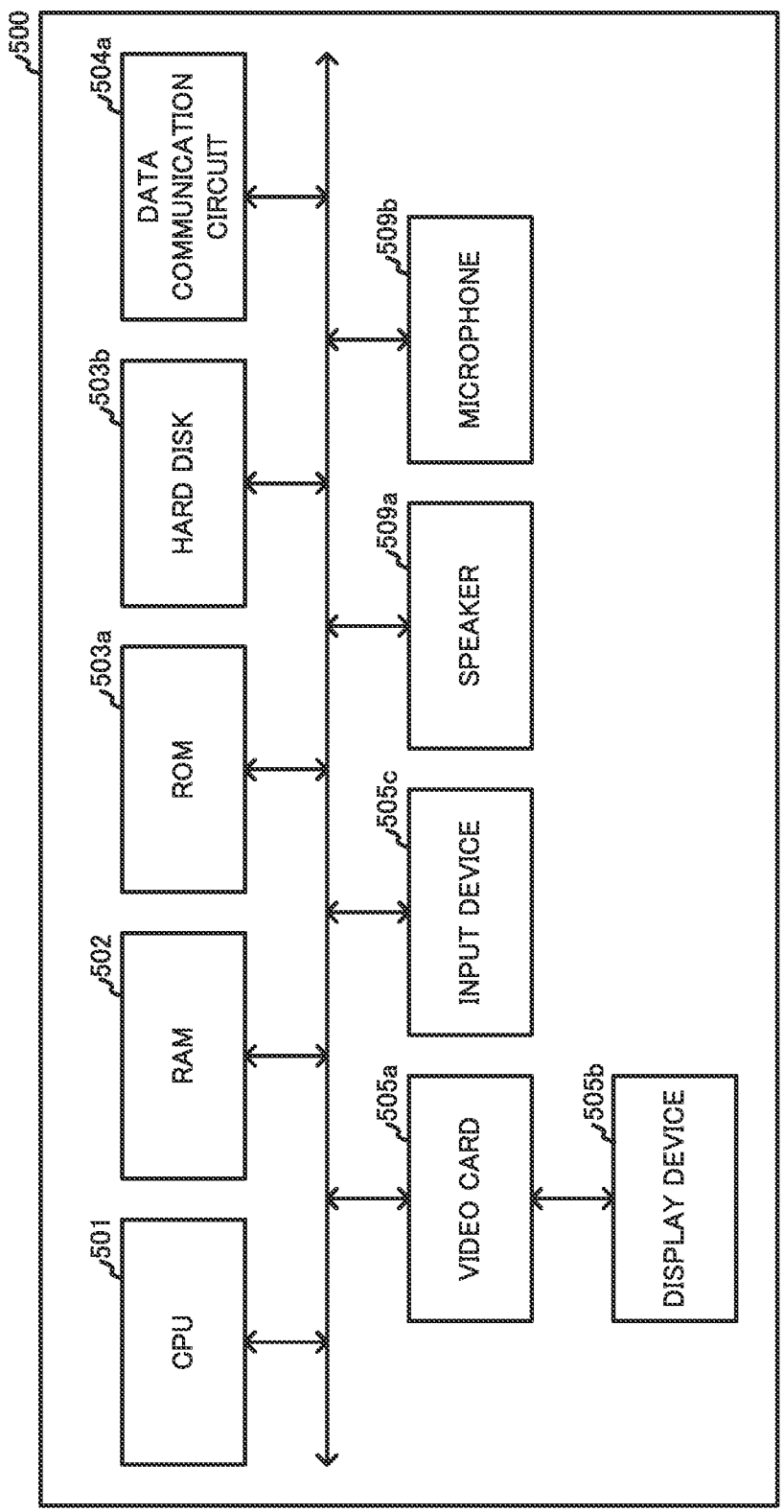
FIG. 8 is a hardware configuration diagram illustrating a configuration example of a control device that the control system includes.

The control device 500 is a server machine and is installed in a business office or an office building of the transport company transporting articles. The control device 500 includes a CPU 501, a RAM 502, a ROM 503a, a hard disk 503b, a data communication circuit 504a, a video card 505a, a display device 505b, an input device 505c, a speaker 509a, and a microphone 509b, which are hardware components, as illustrated in FIG. 8. Although, in the present embodiment, the control device 500 includes one CPU 501, the control device 500 may include a plurality of CPUs. In addition, the control device 500 may include a plurality of RAMs and may include a plurality of flash memories.

Configurations and functions of the CPU 501, the RAM 502, the ROM 503a, the data communication circuit 504a, the video card 505a, and the display device 505b that the control device 500 includes are the same as the configurations and functions of the CPU 191, the RAM 192, the ROM 193a, the data communication circuit 194a, the video card 195a, and the display device 195b, illustrated in FIG. 3, that the aircraft 100 includes, respectively.

The hard disk 503b of the control device 500 stores various types of programs, various types of data used in execution of the various types of programs, and tables in which data are stored. The control device 500 may include a flash memory in place of the hard disk 503b.

A configuration of the data communication circuit 504a of the control device 500 is the same as the configuration of the data communication circuit 194a of the aircraft 100. Functions of the data communication circuit 504a of the control device 500 are the same as the functions of the data communication circuit 194a of the aircraft 100 except a function of performing data communication with the aircrafts 100 and 200 and the terminal device 900.

The input device 505c of the control device 500 is one or more of a keyboard, a mouse, a touch pad, and a button and inputs a signal corresponding to an operation by an employee of the transport company.

The speaker 509a of the control device 500 outputs sound in accordance with a signal output by the CPU 501, and the microphone 509b of the control device 500 inputs a signal representing ambient sound around the control device 500.

When an operation to input the address of a transport destination of an article and the vehicle ID "100" of the aircraft 100 caused to store the article is performed by the employee of the transport company, the input device 505c of the control device 500 outputs a signal corresponding to the operation. When the signal is output, the CPU 501 of the control device 500 executes flight control processing as illustrated in FIGS. 9A and 9B in order to cause the aircraft 100 to fly to the transport destination.

Figure 10:
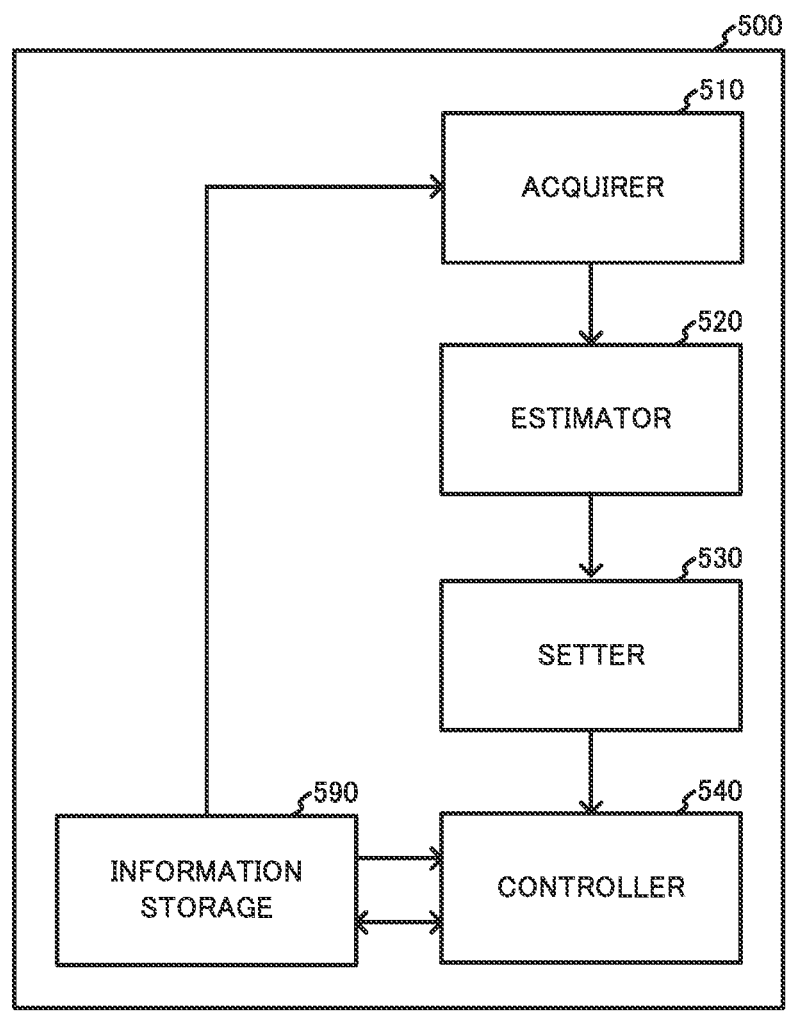
FIG. 10 is a functional block diagram illustrating an example of functions that the control device that the control system includes has.

Through this processing, the CPU 501 of the control device 500 functions as an acquirer 510, as illustrated in FIG. 10, that acquires first location information indicating a first point P1 at which a short visibility airspace is detected and second location information indicating a second point P2 at which it is determined that the aircraft 100 has entered the short visibility airspace. The CPU 501 also functions as an estimator 520 that estimates size of the short visibility airspace, based on the location of the first point P1, the location of the second point P2, and sensing information acquired by the first sensors 131 of the aircraft 100 performing sensing at the first point P1.

The CPU 501 further functions as a setter 530 that sets a safe airspace having higher safety than a short visibility airspace, based on the estimated size of the short visibility airspace and the sensing information acquired at the first point P1. The CPU 501 also functions as a controller 540 that performs control to cause the aircraft 100 to move to the set safe airspace when it is determined that flight continuation along the short visibility route is impracticable, based on information output from the second sensors 132 mounted on the aircraft 100.

The hard disk 503b of the control device 500 functions as an information storage 590 in which information used in the flight control processing is stored. The information storage 590 stores, in advance, a safe airspace table, as illustrated in FIG. 11, in which information relating to safe airspaces is stored. In the safe airspace table, information indicating a priority set for a safe airspace and location information that indicates minimum values and maximum values of latitudes, longitudes, and GPS altitudes indicating the locations of points included in the safe airspace are associated with each other and stored.

The information storage 590 also stores, in advance, a confirmation result table, as illustrated in FIG. 12, in which confirmation result information indicating confirmation results of an obstruction in predetermined airspaces is stored. A plurality of records is stored in the confirmation result table. In addition, in each record, location information indicating the location of one of a plurality of cubic airspaces and confirmation result information indicating a confirmation result of an obstruction in the one of the plurality of cubic airspaces are associated with each other and stored. The plurality of cubic airspaces is generated by dividing an airspace located in the sky over an area in which the transport company transports an article into a plurality of cubic airspaces each of which has a side of a predetermined length.

In the present embodiment, the location information of a cubic airspace is information that indicates minimum values and maximum values of latitudes, longitudes, and GPS altitudes indicating the locations of points included is the cubic airspace. In addition, the confirmation result information includes existence confirmation information indicating that existence of an obstruction in the cubic airspace has been confirmed, nonexistence confirmation information indicating that nonexistence of an obstruction in the cubic airspace has been confirmed, and non-confirmation information indicating that neither existence nor nonexistence of an obstruction in the cubic airspace has been confirmed.

In addition, in the present embodiment, the confirmation result information stored in the confirmation result table is updated by the CPU 501 of the control device 500 executing not-illustrated airspace confirmation processing at a predetermined time, such as 2 am. However, the present embodiment is not limited to the above description, and the confirmation result information may be updated at a predetermined time interval, such as an hour.

When the CPU 501 of the control device 500 starts the execution of the flight control processing in FIGS. 9A and 9B, the CPU 501 generates two threads that are different from a thread executing the flight control processing before executing processing in step S41, which is the first step. Next, the CPU 501 executes not-illustrated information storage processing in one of the generated threads in parallel with the flight control processing. The information storage processing is processing of storing a vehicle ID output in step S24 in FIG. 6A and flight location-related information of the aircraft 100 or 200 identified by the vehicle ID in a flight location-related table, as illustrated in FIG. 13, that the information storage 590 stores in advance.

In addition, in the other thread, the CPU 501 of the control device 500 executes not-illustrated voice communication processing to perform voice communication with the terminal device 900, which is carried by the assistant. Subsequently, the CPU 501 terminates the thread executing the information storage processing and the thread executing the voice communication processing immediately before termination of the flight control processing.

One or a plurality of records is stored in the flight location-related table. In each of the one or plurality of records, the vehicle ID "100" or "200" of the aircraft 100 or 200 and flight location-related information of the aircraft 100 or 200 are stored. The flight location-related information associated with the vehicle ID "100" of the aircraft 100 includes time information, location information, sensing information acquired at a location indicated by the location information at a time indicated by the time information, and sensing direction information indicating sensing direction of the image sensor 131a at the time. In addition, the location information included in the flight location-related information is information indicating a flight location of the aircraft 100 at the time in latitude, longitude, and GPS altitude. Further, the sensing information included in the flight location-related information includes ground-relative wind direction/velocity information indicating wind direction and wind velocity of wind that was blowing at the location at the time in the ground-relative velocities in the directions along the Xw-axis, the Yw-axis, and the Zw-axis that the world coordinate system has. In addition, the sensing information included in the flight location-related information includes image information acquired by the image sensor 131a through image capturing performed at the location at the time. The sensing direction information included in the flight location-related information is information indicating image capturing direction of the image sensor 131a at the time. The flight location-related information associated with the vehicle ID "200" includes the same types of information.

When the not-illustrated information storage processing is started, the acquirer 510 of the control device 500 executes processing of sleeping until the data communication circuit 504a receives a vehicle ID and flight location-related information. When a vehicle ID and flight location-related information are received, the acquirer 510 acquires these information from the data communication circuit 504a, and the controller 540 adds a record in which these acquired information is stored to the flight location-related table. Subsequently, the control device 500 repeats the above-described process from the processing of sleeping until a vehicle ID and flight location-related information are received.

When the execution of the not-illustrated voice communication processing is started, the acquirer 510 of the control device 500 executes processing of acquiring, from the data communication circuit 504a, voice information sent from the terminal device 900 carried by the assistant. Next, the controller 540 outputs a signal indicating a voice of the assistant to the speaker 509a, based on the acquired voice information. The speaker 509a of the control device 500 outputs a voice in accordance with the output signal, and an employee who operates the control device 500 confirms the output voice.

In addition, the acquirer 510 of the control device 500 generates voice information indicating a voice of the employee, based on a signal output from the microphone 509b and outputs the generated voice information to the data communication circuit 504a with the terminal device 900 as the destination. The terminal device 900 receives the voice information from the control device 500 and outputs a voice based on the voice information, and the assistant carrying the terminal device 900 confirms the output voice.

Next, the acquirer 510 of the control device 500 identifies time information indicating the latest time among one or a plurality of pieces of time information associated with the vehicle ID "100" of the aircraft 100 in the flight location-related table in FIG. 13. Next, the acquirer 510 acquires image information associated with the identified time information, and the controller 540 outputs a signal based on the acquired image information to the video card 505a. The video card 505a outputs an image signal, based on the signal output from the controller 540, and the display device 505b displays an image in accordance with the image signal.

When the employee confirms an abnormality in the altitude of the aircraft 100, based on a voice output from the speaker 509a or an image displayed on the display device 505b, the employee performs an operation to reduce or increase the altitude of the aircraft 100 to the input device 505c of the control device 500.

When the input device 505c of the control device 500 inputs a signal corresponding to the operation, the controller 540 of the control device 500 generates information indicating an alternative route that has GPS altitude lower or higher than the GPS altitude of the flight location of the aircraft 100. Next, the controller 540 outputs (i) a route change command that includes the generated information indicating an alternative route and that commands the aircraft 100 to change the flight route thereof to the alternative route and (ii) altitude change permission to the data communication circuit 504a with the aircraft 100 as the destination. Subsequently, the control device 500 repeats the above-described process from the processing of acquiring voice information.

When the aircraft 100 receives the route change command, the aircraft 100 changes the flight route to the alternative route in accordance with the route change command and subsequently autonomously flies the alternative route, reducing or increasing altitude.

In contrast, since, when the employee confirms that there has been occurred no abnormality in the flight altitude of the aircraft 100, the employee does not perform an operation to change the altitude of the aircraft 100, the control device 500 repeats the above-described process from the processing of acquiring voice information, without outputting a route change command. Thus, the aircraft 100 keeps flying the flight route autonomously.

When the execution of the flight control processing illustrated in FIGS. 9A and 9B is started, the controller 540 of the control device 500 outputs a request requesting sending of location information indicating the location of the terminal device 900 to the data communication circuit 504a with terminal device 900 as the destination. When the data communication circuit 504a of the control device 500, after having sent the request to the terminal device 900, receives location information from the terminal device 900, the acquirer 510 of the control device 500 acquires the location information of the terminal device 900 from the data communication circuit 504a. Next, the controller 540 sets, to the location information indicating the location of the terminal device 900, a parameter indicating an assistance point that is a point at which the assistant is present and at which the flight control of the aircraft 100 is assisted (step S41).

Next, the acquirer 510 of the control device 500 acquires information indicating the address of a transport destination of an article, based on a signal that the input device 505c has output in response to the operation performed by the employee. Subsequently, the acquirer 510 acquires information indicating latitude, longitude, and GPS altitude stored in advance in association with the acquired information indicating the address, from the information storage 590.

Next, the controller 540 of the control device 500 outputs a request requesting sending of location information indicating the location of the aircraft 100 to the data communication circuit 504a with the aircraft 100 as the destination. When the data communication circuit 504a of the control device 500, after having sent the request to the aircraft 100, receives location information from the aircraft 100, the acquirer 510 of the control device 500 acquires the location information of the aircraft 100 from the data communication circuit 504a.

Subsequently, the controller 540 of the information processing device 500 reads a not-illustrated partial route table in which information relating to partial routes that the aircraft 100 can fly, such as the sky over a road, a river, or mountains and forests, is stored, from the information storage 590. In the partial route table, a plurality of records is stored in advance, and, in each record, latitude, longitude, and GPS altitude of the start node of an edge that is a partial route, latitude, longitude, and GPS altitude of the end node of the edge, and information representing length of the edge are associated with one another and stored in advance.

Next, the controller 540 of the control device 500 executes a route search algorithm, such as Dijkstra's algorithm, using the latitudes, longitudes, and GPS altitudes of the location of the aircraft 100, the start nodes and end nodes of a plurality of edges, and the transport destination. Through this processing, the controller 540 determines a shortest entire route that starts from the location of the aircraft 100 and that reaches the transport destination by combining partial routes. Next, the controller 540 sets the transport route that the aircraft 100 is caused to fly to the shortest entire route (step S42) and outputs a flight command including information indicating the set transport route to the data communication circuit 504a with the aircraft 100 as the destination (step S43).

Next, the acquirer 510 of the control device 500 determines whether or not a detection report has been received from the aircraft 100 flying in accordance with the flight command (step S44). The detection report is a report announcing detection of a short visibility airspace. When, on this occasion, the acquirer 510 tries acquisition of a detection report from the data communication circuit 504a and no detection report is acquired, the acquirer 510 determines that no detection report has been received (step S44; No). Next, the acquirer 510 determines whether or not an arrival report has been received from the aircraft 100 (step S45). When, on this occasion, the acquirer 510 tries acquisition of an arrival report from the data communication circuit 504a and no arrival report is acquired, the acquirer 510 determines that no arrival report has been received (step S45; No). Subsequently, the control device 500 repeats the above-described process from step S44.

When, in step S44, a detection report is acquired from the data communication circuit 504a, the acquirer 510 of the control device 500 determines that a detection report has been received (step S44; Yes). Next, the acquirer 510 acquires first location information indicating a first point P1 at which a short visibility airspace is detected, from the acquired detection report (step S46).

Next, the acquirer 510 of the control device 500 determines whether or not an airspace entry report announcing entry into a short visibility airspace has been received from the aircraft 100 (step S47). When, on this occasion, the acquirer 510 tries acquisition of an airspace entry report from the data communication circuit 504a and no airspace entry report is acquired, the acquirer 510 determines that no airspace entry report has been received (step S47; No). Next, the control device 500 determines whether or not an arrival report has been received from the aircraft 100 (step S48). When, on this occasion, the control device 500 determines that no arrival report has been received (step S48; No), the control device 500 repeats the above-described process from step S47.

When, in step S47, an airspace entry report is acquired from the data communication circuit 504a, the acquirer 510 of the control device 500 determines that an airspace entry report has been received (step S47; Yes). Next, the acquirer 510 acquires second location information indicating a second point P2 at which it is determined that the aircraft 100 has entered a short visibility airspace, from the acquired airspace entry report (step S49). Subsequently, the control device 500 executes size estimation processing of estimating size of a short visibility airspace, as illustrated in FIG. 14 (step S50).

When the execution of the size estimation processing is started, the acquirer 510 of the control device 500 acquires sensing information acquired at the first point P1 by the first sensors 131 that the aircraft 100 mounts thereon and sensing direction information indicating sensing direction of the first sensors 131 at the first point P1 (step S61). For this purpose, the acquirer 510 acquires sensing information and sensing direction information indicating sensing direction that are associated with the first location information acquired in step S46 in FIG. 9A and the vehicle ID "100" of the aircraft 100 in the flight location-related table in FIG. 13.

Next, the estimator 520 of the control device 500, by executing the same processing as the processing in step S27 in FIG. 6A, detects a short visibility image region from an image indicated by the acquired sensing information. The estimator 520 also detects a region different from the short visibility image region among image regions included in the image as non-short visibility image region corresponding to a non-short visibility airspace. The estimator 520 further detects an image region at a boundary between the short visibility image region and the non-short visibility image region as a boundary image region corresponding to a boundary surface between the short visibility airspace and the non-short visibility airspace (step S62).

Next, although, in the present embodiment, the estimator 520 of the control device 500 assumes that the shape of the short visibility airspace is a rectangular parallelepiped shape and one of the boundary surfaces between the short visibility airspace and the non-short visibility airspace is perpendicular to the image capturing direction of the image sensor 131a as illustrated in FIG. 7, the assumed shape of the short visibility airspace is not limited thereto.

Subsequently, the estimator 520 of the control device 500 sets an image coordinate system that has the central point of an image indicated by image information acquired at the first point P1 as the origin and that has an Xp-axis with the main-scan direction as the positive direction and a Yp-axis with the sub-scan direction as the positive direction. When the image coordinate system is set in this manner, the Xp coordinate value of a pixel corresponding to an image-capturing target point becomes larger as the image-capturing target point is located further on the right side when facing the front direction of the aircraft 100 than the optical axis of the image sensor 131a, which is adjusted in such a way as to be parallel to the front direction of the aircraft 100. In addition, the Yp coordinate value of the pixel corresponding to the image-capturing target point becomes larger as the image-capturing target point is located further on the lower side than the optical axis of the image sensor 131a.

Because of this configuration, the estimator 520 of the control device 500 detects a pixel having a largest Xp coordinate value among the pixels included in the boundary image region as a pixel corresponding to a point (hereafter, referred to as a right end point) PEr that is located on the most right side when facing the travel direction of the aircraft 100 among a plurality of points on the boundary surface between the short visibility airspace and the non-short visibility airspace, as illustrated in FIG. 7. Likewise, the estimator 520 detects a pixel having a smallest Xp coordinate value among the pixels included in the boundary image region as a pixel corresponding to a point (hereafter, referred to as a left end point) PEl that is located on the most left side when facing the travel direction of the aircraft 100 among the plurality of points on the boundary surface, as illustrated in FIG. 7.

Likewise, the estimator 520 of the control device 500 detects a pixel having a largest Yp coordinate value and a pixel having a smallest Yp coordinate value among the pixels included in the boundary image region as pixels corresponding to a not-illustrated point (hereafter, referred to as a bottom end point) PEb that is located on the most bottom side and a not-illustrated point (hereinafter, referred to as a top end point) PEt that is located on the most top side when facing the travel direction of the aircraft 100 among the plurality of points on the boundary surface, respectively.

Subsequently, the acquirer 510 of the control device 500 acquires information indicating focal distance of the image sensor 131a and information indicating size of the light receiving element included in the image sensor 131a that the information storage 590 stores in advance. Next, the estimator 520 calculates an equation using the world coordinate system of a straight line passing the first point P1 and the right end point PEr, based on the focal distance of the image sensor 131a, the size of the light receiving element of the image sensor 131a, the Xp coordinate value and Yp coordinate value of the pixel corresponding to the right end point PEr, the sensing direction of the image sensor 131a at the first point P1, and the location of the first point P1.

Subsequently, the estimator 520 of the control device 500 calculates an angle ψr formed by direction pointing from the first point P1 to the right end point PEr and the front direction of the aircraft 100, which is the sensing direction, using the calculated equation and the sensing direction information. In the present embodiment, the aircraft 100 flies the flight route, causing the front direction of the aircraft 100 and the travel direction of the aircraft 100 to coincide with each other. Thus, the angle ψr is an angle formed by the travel direction of the aircraft 100 and the direction pointing from the first point P1 to the right end point PEr.

The estimator 520 of the control device 500, by executing similar information processing, calculates an angle ψl formed by the travel direction of the aircraft 100 and direction pointing from the first point P1 to the left end point PEl. Likewise, the estimator 520 also calculates a not-illustrated angle ψt formed by the travel direction of the aircraft 100 and direction pointing from the first point P1 to the top end point PEt and a not-illustrated angle ψb formed by the travel direction of the aircraft 100 and direction pointing from the first point P1 to the bottom end point PEb (step S63).

Subsequently, the estimator 520 of the control device 500 calculates a distance in the horizontal direction (hereinafter, referred to as horizontal distance) from the first point P1 to the second point P2, based on the first location information acquired in step S46 and the second location information acquired in step S49 in FIG. 9A. Since the second point P2 is a point at which it is determined that the aircraft 100 has entered a short visibility airspace, the calculated horizontal distance from the first point P1 to the second point P2 is horizontal distance L2 from the first point P1 to the short visibility airspace at a second time at which the aircraft 100 flew the second point P2 (step S64).

Next, the acquirer 510 of the control device 500 acquires time information associated with the first location information acquired in step S46 in FIG. 9A and the vehicle ID "100" of the aircraft 100 in the flight location-related table in FIG. 13 in order to identify a first time at which the aircraft 100 flew the first point P1. Likewise, the acquirer 510 acquires time information associated with the second location information acquired in step S49 and the vehicle ID "100" in the flight location-related table in order to identify the second time at which the aircraft 100 flew the second point P2.

Next, the acquirer 510 of the control device 500 acquires time information indicating a time that is earlier than the second time and that is closest to the second time among one or a plurality of times that is respectively indicated by one or a plurality of pieces of time information associated with the vehicle ID "100" in the flight location-related table. In addition, the acquirer 510 acquires ground-relative wind direction/velocity information associated with the acquired time information in the flight location-related table. Through this processing, the acquirer 510 identifies a time preceding and closest to the second time and ground-relative wind direction and ground-relative wind velocity of wind that was blowing at the location of the aircraft 100 at the time preceding and closest to the second time.

Subsequently, the estimator 520 of the control device 500 assumes that, for a period from the time preceding and closest to the second time to the second time, wind having the same wind direction and wind velocity as the wind direction and wind velocity of wind that was blowing at the location of the aircraft 100 at the time preceding and closest to the second time had also blown uniformly in the short visibility airspace. Thus, in the present embodiment, the estimator 520 estimates that the direction of movement of the short visibility airspace during the period from the time preceding and closest to the second time to the second time was the same direction as the direction in which wind blowing from the wind direction blows toward the leeward side and the movement velocity of the short visibility airspace was the same velocity as the wind velocity.

However, the present embodiment is not limited to the above description, the estimator 520 of the control device 500 may estimate that the direction of movement of the short visibility airspace during the period from the time preceding and closest to the second time to the second time was a direction different from the direction in which wind blowing from the wind direction blew toward the leeward side, based on leeward terrain of the short visibility airspace, such as mountains, hills, a valley, or a bluff, and the wind direction. The estimator 520 of the control device 500 may also estimate that the movement velocity of the short visibility airspace during a period from the time preceding and closest to the second time to the second time was a velocity that was a predetermined velocity slower or a predetermined ratio slower than the wind velocity.

Therefore, the estimator 520 estimates horizontal distance from the first point P1 to the short visibility airspace at the time preceding and closest to the second time, based on the horizontal distance L2 from the first point P1 to the short visibility airspace at the second time and the ground-relative wind direction and the ground-relative wind velocity at the time preceding and closest to the second time.

Subsequently, when the estimator 520 of the control device 500 determines that the time preceding and closest to the second time is the first time, the estimator 520 identifies the estimated horizontal distance to be horizontal distance L1 from the aircraft 100 to the short visibility airspace at the first time (step S65). The reason why such identification is performed is that, at the first time, the aircraft 100 was flying the first point P1.

In contrast, when the estimator 520 of the control device 500 determines that the time preceding and closest to the second time is not the first time, the estimator 520 sets the time preceding and closest to the second time as a target of a check. Subsequently, the estimator 520 executes processing of estimating horizontal distance from the first point P1 to the short visibility airspace at a time preceding and closest to the checked time. Next, when the estimator 520 determines that the time preceding and closest to the checked time is the first time, the estimator 520 identifies the estimated horizontal distance to be the horizontal distance L1.

In contrast, when the estimator 520 of the control device 500 determines that the time preceding and closest to the checked time is not the first time, the estimator 520 sets a time preceding and closest to the checked time as a target of a check. Subsequently, the estimator 520 repeats the above-described process from the processing of estimating horizontal distance from the first point P1 to the short visibility airspace at the time preceding and closest to the checked time.

When the horizontal distance L1 from the aircraft 100 to the short visibility airspace at the first time is identified, the estimator 520 of the control device 500 determines whether two pixels that respectively correspond to the right end point PEr and the left end point PEl are located in such a manner as to sandwich the center of the image or both of the two pixels are located on the right side or the left side of the center of the image, based on the Xp coordinate values of the two pixels. When, on this occasion, the estimator 520 determines that the two pixels that respectively correspond to the right end point PEr and the left end point PEl are located in such a manner as to sandwich the center of the image, the estimator 520 estimates size W in the horizontal direction of the short visibility airspace, using the formula (1) below. In contrast, when the estimator 520 of the control device 500 determines that both of the two pixels are located on the right side or the left side of the center of the image, the estimator 520 estimates the size W in the horizontal direction of the short visibility airspace, using the formula (2) below.

$$\text{Size } W \text{ in the horizontal direction} = L1 \times \tan \psi l + L1 \times \tan \psi r \quad (1)$$

$$\text{Size } W \text{ in the horizontal direction} = |L1 \times \tan \psi l - L1 \times \tan \psi r| \quad (2)$$

In the above formulae, L1 denotes horizontal distance from the aircraft 100 to the short visibility airspace at the first time, ψl denotes an angle formed by the direction pointing from the first point P1 to the left end point PEl and the travel direction of the aircraft 100, and ψr denotes an angle formed by the direction pointing from the first point P1 to the right end point PEr and the travel direction of the aircraft 100.

Likewise, the estimator 520 of the control device 500 estimates size in the vertical direction of the short visibility airspace, based on the horizontal distance L1 from the aircraft 100 to the short visibility airspace, an angle ψt formed by the direction pointing from the first point P1 to the top end point PEt and the travel direction of the aircraft 100, and an angle ψb formed by the direction pointing from the first point P1 to the bottom end point PEb and the travel direction of the aircraft 100 (step S66).

Although, in the present embodiment, the estimator 520 of the control device 500 estimates that size in the depth direction of the short visibility airspace is equal to the size W in the horizontal direction, the present embodiment is not limited thereto, and the estimator 520 may estimate that the size in the depth direction is larger or smaller than the size W in the horizontal direction. Subsequently, the estimator 520 terminates the execution of the size estimation processing.

After the size estimation processing has been executed in step S50 in FIG. 9A, the estimator 520 of the control device 500 executes location estimation processing of estimating location of the short visibility airspace at the first time, based on the estimated size in the horizontal direction and size in the vertical direction of the short visibility airspace and the location of the first point P1 (step S51). Although, in the present embodiment, since the shape of the short visibility airspace is assumed to be a rectangular parallelepiped shape, the location of the short visibility airspace is represented by latitudes, longitudes, and GPS altitudes of the eight vertices that the short visibility airspace has, the present embodiment is not limited thereto.

When the pixel corresponding to the left end point PEl is located on the left side of the center of the image, the lower left front vertex that the short visibility airspace has is located the horizontal distance L1 multiplied by tan ψl on the left side of the location of the first point P1 when facing the travel direction of the aircraft 100 at the first time. In contrast, when the pixel is located on the right side of the center of the image, the lower left front vertex of the short visibility airspace is located the horizontal distance L1 multiplied by tan ψl on the right side of the location of the first point P1. In addition, when the pixel is located on the bottom side of the center of the image, the lower left front vertex of the short visibility airspace is located the horizontal distance L1 multiplied by tan ψb on the bottom side of the location of the first point P1. In contrast, when the pixel is located on the top side of the center of the image, the lower left front vertex of the short visibility airspace is located the horizontal distance L1 multiplied by tan ψb on the top side of the location of the first point P1.

Thus, the estimator 520 of the control device 500 calculates latitude, longitude, and GPS altitude of the lower left front vertex that the short visibility airspace has, based on the latitude, longitude, and GPS altitude of the first point P1 and the horizontal distance L1 multiplied by tan ψl and the horizontal distance L1 multiplied by tan ψb. In a similar manner, the estimator 520 calculates latitudes, longitudes, and GPS altitudes of the upper left front vertex, the upper right front vertex, and the lower right front vertex that the short visibility airspace has.

In addition, the lower left back vertex, the upper left back vertex, the upper right back vertex, and the lower right back vertex that the short visibility airspace has are located a distance equal to the size W in the horizontal direction of the short visibility airspace on the back side of the lower left front vertex, the upper left front vertex, the upper right front vertex, and the lower right front vertex, respectively, when facing the travel direction of the aircraft 100 at the first time. Thus, the estimator 520 of the control device 500 calculates latitudes, longitudes, and GPS altitudes of the lower left back vertex, the upper left back vertex, the upper right back vertex, and the lower right back vertex, based on the latitudes, longitudes, and GPS altitudes of the lower left front vertex, the upper left front vertex, the upper right front vertex, and the lower right front vertex and the size W in the horizontal direction of the short visibility airspace, respectively.

When the location of the short visibility airspace at the first time is estimated in this manner, the estimator 520 of the control device 500 acquires ground-relative wind direction/velocity information associated with the time information indicating the first time and the vehicle ID "100" of the aircraft 100 in the flight location-related table in FIG. 13. Through this processing, the estimator 520 identifies the ground-relative wind direction and the ground-relative wind velocity of wind that was blowing at the location of the aircraft 100 at the first time.

Next, the estimator 520 of the control device 500 acquires time information indicating a time that is later than the first time and that is closest to the first time among one or a plurality of times that is respectively indicated by one or a plurality of pieces of time information associated with the vehicle ID "100" in the flight location-related table and ground-relative wind direction/velocity information associated with the time information. Through this processing, the estimator 520 identifies a time succeeding and closest to the first time and ground-relative wind direction and ground-relative wind velocity of wind that was blowing at the location of the aircraft 100 at the time succeeding and closest to the first time.

Subsequently, the estimator 520 of the control device 500 assumes that, for a period from the first time to the time succeeding and closest to the first time, wind having the same wind direction and wind velocity as the wind direction and wind velocity of wind that was blowing at the location of the aircraft 100 at the first time had also blown uniformly in the short visibility airspace. Thus, in the present embodiment, the estimator 520 estimates that the direction of movement of the short visibility airspace during the period from the first time to the time succeeding and closest to the first time was the same as the direction in which wind blowing from the wind direction blew toward the leeward side and the movement velocity of the short visibility airspace was the same velocity as the wind velocity.

However, the present embodiment is not limited to the above description, the estimator 520 of the control device 500 may estimate that the direction of movement of the short visibility airspace during the period from the first time to the time succeeding and closest to the first time was a direction different from the direction in which wind blowing from the wind direction blew toward the leeward side, based on leeward terrain of the short visibility airspace and the wind direction. The estimator 520 of the control device 500 may also estimate that the movement velocity of the short visibility airspace during the period from the first time to the time succeeding and closest to the first time was a velocity that was a predetermined velocity slower or a predetermined ratio slower than the wind velocity.

Therefore, the estimator 520 of the control device 500 estimates the location of the short visibility airspace at the time succeeding and closest to the first time, based on the estimated location of the short visibility airspace at the first time and the ground-relative wind direction and the ground-relative wind velocity at the first time.

Subsequently, the estimator 520 of the control device 500 sets a time succeeding and closest to the first time as a target of a check and executes processing of determining whether or not a time succeeding and closest to the checked time exists. When, on this occasion, the estimator 520 determines that no time succeeding the checked time exists, the estimator 520 estimates that the location of the short visibility airspace at the checked time is the current location of the short visibility airspace.

In contrast, when the estimator 520 of the control device 500 determines that a time succeeding and closest to the checked time exists, the estimator 520 estimates the location of the short visibility airspace at the time succeeding and closest to the checked time. Subsequently, the estimator 520 sets the time succeeding and closest to the checked time as a target of a check and repeats the above-described process from the processing of determining whether or not a time succeeding and closest to the checked time exists.

When the current location of the short visibility airspace is estimated in this manner, the control device 500 executes safe airspace setting processing of setting a safe airspace, based on the current location of the short visibility airspace, as illustrated in FIG. 15 (step S52).

When the execution of the safe airspace setting processing is started, the acquirer 510 of the control device 500 acquires location information, image information included in sensing information, and sensing direction information associated with the time information indicating the first time and the vehicle ID "100" of the aircraft 100 in the flight location-related table in FIG. 13. Through this processing, the acquirer 510 identifies an image capturing location at which the image sensor 131a of the aircraft 100 captured an image, an image that the image sensor 131a acquired through image capturing, and an image capturing direction of the image sensor 131a at the first time. In addition, the acquirer 510 acquires location information, image information, and sensing direction information associated with time information indicating a time succeeding or preceding and closest to the first time and the vehicle ID "100" in the flight location-related table.

Subsequently, the setter 530 of the control device 500, by performing, for example, template matching on two images that are respectively indicated by the two pieces of image information, detects image regions corresponding to an obstruction and image regions corresponding to a person. Information indicating a template of an obstruction and information indicating a template of a person are only required to be stored by the information storage 590 in advance.

Next, the acquirer 510 of the control device 500 acquires the information indicating the focal distance of the image sensor 131a and the information indicating the size of the light receiving element included in the image sensor 131a from the information storage 590. Subsequently, the setter 530 detects locations of the obstruction and the person, based on parallax between the image regions corresponding to the obstruction and parallax between the image regions corresponding to the person in the two images, the image capturing location and the image capturing direction of the two images, the focal distance, and the size of the light receiving element (step S71).

Subsequently, the setter 530 of the control device 500 sets a safe airspace, based on the detected location of the obstruction and the estimated location of the short visibility airspace (step S72). For this purpose, the setter 530 divides a current non-short visibility airspace, which is an airspace different from the current short visibility airspace, into a plurality of cubic airspaces each of which has a side of a predetermined length and identifies locations of a plurality of non-short visibility airspaces generated by the division. Although, in the present embodiment, the predetermined length is "1" meter, the present embodiment is not limited thereto, and the predetermined length may longer or shorter than "1" meter. A person skilled in the art can determine, by experiment, a suitable value for the predetermined length.

Subsequently, the setter 530 of the control device 500 identifies an obstructive airspace in which the obstruction is present from among a plurality of non-short visibility airspaces, based on the locations of the plurality of non-short visibility airspaces and the location of the obstruction and removes the identified obstructive airspace from the plurality of non-short visibility airspaces.

Next, the setter 530 of the control device 500 identifies an airspace that was a short visibility airspace at the first time among a plurality of non-short visibility airspaces after removal of the obstructive airspace as an indeterminable airspace where it is impossible to determine whether or not an obstruction is present in the airspace based on the sensing information acquired at the first time. Subsequently, the setter 530 removes the indeterminable airspace from the plurality of non-short visibility airspaces after removal of the obstructive airspace.

Next, the setter 530 of the control device 500 determines that there exists no obstruction in a plurality of non-short visibility airspaces after removal of the obstructive airspace and the indeterminable airspace. Subsequently, the setter 530 sets the plurality of non-short visibility airspaces after removal of the obstructive airspace and the indeterminable airspace as safe airspaces that have higher safety than the short visibility airspace. The reason why safe airspaces are set in this manner is that probability of the aircraft 100 coming into contact with an obstruction is lower and the aircraft 100 is thus able to fly more safely in the plurality of non-short visibility airspaces after removal of the obstructive airspace and the indeterminable airspace than a short visibility airspace that has not been determined to include no obstruction.

Subsequently, the setter 530 of the control device 500 sets priorities for a plurality of safe airspaces, based on detected locations of persons (step S73). For this purpose, the setter 530 executes processing of setting one of safe airspaces that have not been checked among the plurality of safe airspaces as a target of a check. Next, the setter 530 counts the number of persons located under the checked safe airspace and subsequently repeats the above-described process from the processing of setting one of safe airspaces that have not been checked as a target of a check until all the safe airspaces that have not been checked are eliminated. Subsequently, the setter 530 sets a higher priority for each of the plurality of safe airspaces as the counted number of persons under the safe airspace is smaller. The reason why priorities are set in this manner is that an airspace over an area where the number of persons is smaller or no person is present is more appropriate as an airspace in which the aircraft 100 flies than an airspace over an area where the number of persons is larger. The reason why an airspace over an area where the number of persons is smaller or no person is present is more appropriate is that, when, for example, the aircraft 100 falls due to contact with an obstruction, a malfunction, or the like or makes an emergency landing, such an airspace has smaller probability or no possibility of the aircraft 100 coming into contact with a person.

Subsequently, the setter 530 of the control device 500 identifies, based on the location of the assistance point indicated by the parameter predetermined in step S41 in FIG. 9A and the current location of a short visibility airspace, a safe airspace between which and the assistance point a short visibility airspace exists and a safe airspace between which and the assistance point no short visibility airspace exists. Since, when the aircraft 100 flies in a safe airspace between which and the assistance point a short visibility airspace exists, the assistant who is present at the assistance point cannot visually recognize the aircraft 100, the assistant cannot inform the employee operating the control device 500 of a result of visual recognition of the aircraft 100, as a result of which the flight control is not assisted. Thus, the setter 530 determines that the identified safe airspace is an unassisted airspace where the flight control is not assisted.

For this purpose, the setter 530 of the control device 500 executes processing of setting one of safe airspaces that have not been checked among the plurality of safe airspaces as a target of a check. Next, the setter 530 calculates an equation representing a line segment that starts from the location of the assistance point and that reaches the location of the checked safe airspace, based on the location of the checked safe airspace and the location of the assistance point. Next, the setter 530 determines whether or not a portion or all of the line segment is included in a short visibility airspace, based on the calculated equation and the location of the short visibility airspace. When, on this occasion, the setter 530 determines that a portion or all of the line segment is included in the short visibility airspace, the setter 530 determines that the checked safe airspace is an unassisted airspace between which and the assistance point the short visibility airspace exists. In contrast, when the setter 530 determines that nothing of the line segment is included in the short visibility airspace, the setter 530 determines that the checked safe airspace is an airspace between which and the assistance point no short visibility airspace exists. Subsequently, the setter 530 repeats the above-described process from the processing of setting one of safe airspaces that have not been checked as a target of a check until all the safe airspaces that have not been checked are eliminated.

Likewise, the setter 530 of the control device 500 identifies, based on the location of the safe airspace between which and the assistance point no short visibility airspace exists, the location of the assistance point, and the detected location of an obstruction, a safe airspace between which and the assistance point an obstruction exists and a safe airspace between which and the assistance point neither a short visibility airspace nor an obstruction exists. Next, the setter 530 determines that the safe airspace between which and the assistance point an obstruction exists is an unassisted airspace and determines that the safe airspace between which and the assistance point neither a short visibility airspace nor an obstruction exists is an assisted airspace where assistance for the flight control is performed.

Subsequently, when there exists a plurality of safe airspaces for which the same priority is set based on the locations of persons, the setter 530 of the control device 500 resets priorities among the plurality of safe airspaces in such a way that the priority of an assisted airspace is higher than the priority of an unassisted airspace (step S74).

Next, the controller 540 of the control device 500 stores, in the safe airspace table in FIG. 11, information indicating priorities set for the safe airspaces and location information indicating minimum values and maximum values of latitudes, longitudes, and GPS altitudes of points included in the safe airspaces in association with each other (step S75) and subsequently terminates the execution of the safe airspace setting processing.

After the safe airspace setting processing has been executed in step S52 in FIG. 9B, the acquirer 510 of the control device 500 determines whether or not an abnormality report announcing that an abnormality condition is satisfied has been received from the aircraft 100 (step S53). When, on this occasion, the acquirer 510 tries acquisition of an abnormality report from the data communication circuit 504a and an abnormality report is acquired, the acquirer 510 determines that an abnormality report has been received (step S53; Yes). Next, the control device 500 executes flight continuation possibility determination processing of determining whether or not flight continuation along a short visibility route by the aircraft 100 is possible, as illustrated in FIG. 16 (step S54).

When the execution of the flight continuation possibility determination processing is started, the acquirer 510 of the control device 500 acquires a sensor ID identifying a second sensor 132 that has output information that caused an abnormality condition to be satisfied, from the abnormality report (step S81).

Next, the controller 540 of the control device 500 determines whether or not the sensor ID of the altitude sensor 132a is included in the acquired sensor ID. When, on this occasion, the controller 540 determines that the sensor ID of the altitude sensor 132a is included, the controller 540 determines that altitude information output from the altitude sensor 132a satisfies the abnormality condition of the altitude sensor 132a (step S82; Yes). Thus, the controller 540 determines that above-ground altitude indicated by the altitude information differs greater than error of the altitude sensor 132a from actual above-ground altitude of the aircraft 100.

Next, the controller 540 of the control device 500 determines that flight continuation by the aircraft 100 along a short visibility route that passes through the short visibility airspace is impracticable regardless of whether or not the sensor ID of the LiDAR sensor 132b is included (step S83) and subsequently terminates the execution of the flight continuation possibility determination processing.

The reason why such determination is made is that, when the above-ground altitude indicated by the altitude information differs greater than the error from the actual above-ground altitude, it becomes impracticable for the aircraft 100 to continue flight along the short visibility route in the flight permitted airspace, in which a range of above-ground altitude is stipulated by laws and regulations.

When, in step S82, the controller 540 of the control device 500 determines that the sensor ID of the altitude sensor 132a is not included, the controller 540 determines that the abnormality condition of the altitude sensor 132*a* is not satisfied (step S82; No). Thus, the controller 540 determines that coordinate information output from the LiDAR sensor 132*b* satisfies the abnormality condition of the LiDAR sensor 132*b*. Therefore, the controller 540 determines that detection of an obstruction based on the coordinate information output from the LiDAR sensor 132*b* is impossible.

Next, the controller 540 of the control device 500 divides the current short visibility airspace, the location of which was estimated in step S51 in FIG. 9B, into a plurality of cubic airspaces each of which has a side of a predetermined length and identifies locations of a plurality of short visibility airspaces generated by the division. Subsequently, the controller 540 identifies, based on the locations of a plurality of transit points indicated by the route information and the locations of the plurality of short visibility airspaces, locations of one or a plurality of airspaces that the flight route passes (hereinafter, referred to as transit short visibility airspaces) among the plurality of short visibility airspaces (step S84).

Next, the acquirer 510 of the information processing device 500 acquires one or a plurality of pieces of confirmation result information that are respectively associated with pieces of location information that respectively indicate the locations of the one or plurality of transit short visibility airspaces in the confirmation result table in FIG. 12 (step S85). Subsequently, the controller 540 of the control device 500 determines whether or not all of the one or plurality of pieces of confirmation result information are nonexistence confirmation information, which indicates that nonexistence of an obstruction has been confirmed (step S86). When, on this occasion, the controller 540 determines that all of the acquired one or plurality of pieces of confirmation result information are nonexistence confirmation information (step S86; Yes), the controller 540 determines that flight continuation by the aircraft 100 along the short visibility route that passes the transit short visibility airspaces is possible even when detection of an obstruction based on the coordinate information output from the LiDAR sensor 132*b* is impossible (step S87) and terminates the execution of the flight continuation possibility determination processing.

When, in step S85, the controller 540 of the control device 500 determines that one or more of the acquired one or plurality of pieces of confirmation result information are not nonexistence confirmation information (step S86; No), the controller 540 determines that one or more of the plurality of pieces of confirmation result information are existence confirmation information, which indicates that existence of an obstruction has been confirmed, or non-confirmation information, which indicates that neither existence nor nonexistence of an obstruction has been confirmed. Next, since detection of an obstruction based on the coordinate information output from the LiDAR sensor 132*b* is impossible, the controller 540 determines that flight continuation along the short visibility route that passes through an airspace for which existence of an obstruction has been confirmed or neither existence nor nonexistence of an obstruction has been confirmed is impracticable (step S83). Subsequently, the controller 540 terminates the execution of the flight continuation possibility determination processing.

When, in the flight continuation possibility determination processing, it is determined that flight continuation along the short visibility route is possible (step S55 in FIG. 9B; Yes), the control device 500 repeats the above-described process from step S51. In contrast, when it is determined that flight continuation along the short visibility route is impracticable (step S55; No), the control device 500 executes airspace migration control processing of causing the aircraft 100 to move to a safe airspace, as illustrated in FIGS. 17A and 17B (step S56).

When the execution of the airspace migration control processing is started, the acquirer 510 of the control device 500 acquires third location information indicating a third point P3 at which it is determined that an abnormality condition is satisfied, from the abnormality report (step S91). Next, the acquirer 510 acquires, from the safe airspace table in FIG. 11, a plurality of location information of a safe airspace that indicates a minimum value of GPS altitude that is equal to or less than the GPS altitude of the third point P3 and a maximum value of GPS altitude that is equal to or greater than the GPS altitude of the third point P3, the GPS altitude of the third point P3 being indicated by the acquired third location information. In addition, the acquirer 510 acquires a plurality of information indicating a priority each of which is associated with each of the acquired plurality of location information, from the safe airspace table. Through this processing, the acquirer 510 identifies a plurality of safe airspaces in which the aircraft 100 can move with a change in GPS altitude restricted.

Next, the controller 540 of the control device 500 selects a predetermined number of safe airspaces from among the identified plurality of safe airspaces in ascending order of distance from the third point P3. Although, in the present embodiment, the distance from the aircraft 100 to a safe airspace means distance between the location of the aircraft 100 and the central point of the safe airspace, the present embodiment is not limited thereto.

Subsequently, the controller 540 of the control device 500 selects a safe airspace from among the selected plurality of safe airspaces, based on the priorities (step S92). Although, in the present embodiment, the controller 540 selects a safe airspace that has the highest priority, the present embodiment is not limited thereto, and the controller 540 may select a safe airspace that has the N-th highest priority (where N is a natural number of 2 or more) or may select a safe airspace, based on software-generated random numbers.

Next, the controller 540 of the control device 500, by executing the same processing as the processing in step S42 in FIG. 9A, sets an alternative route that starts from the location of the aircraft 100, passes through the selected safe airspace, and reaches the movement destination (steps S93). Next, the controller 540 outputs, to the data communication circuit 504*a* with the aircraft 100 as the destination, (i) a route change command that includes route information indicating the alternative route and that commands the aircraft 100 to change the flight route thereof to the alternative route indicated by the route information and (ii) altitude change restriction to restrict a change in altitude while the aircraft 100 flies in the short visibility airspace (step S94). In this way, the controller 540 performs first control to cause the aircraft 100 to move to a safe airspace that is located at the GPS altitude of the aircraft 100 without performing altitude change control to cause the aircraft 100 to change the altitude thereof.

The reason why such first control is performed is that, when the controller 540 performs the altitude change control on the aircraft 100 in the case where the abnormality condition of the altitude sensor 132*a* is satisfied, probability of the aircraft 100 exiting the flight permitted airspace and entering a flight forbidden airspace is higher than a case where the abnormality condition is not satisfied.

In the present embodiment, the following description will be made using, as a specific example, a case where, during a period from the time when an abnormality report is output from the aircraft 100 in step S34 in FIG. 6B until the first control to cause the aircraft 100 to move to a safe airspace is performed in step S94 in FIG. 17A, the aircraft 100 continues flying in a short visibility airspace. Thus, the aircraft 100 that has received the route change command and the altitude change restriction, after having changed the flight route to the alternative route, flies the alternative route, restricting a change in altitude until determining that the aircraft 100 has exited the short visibility airspace. Therefore, the aircraft 100 does not change but maintains the number of revolutions per unit time of the propellers 111 to 114 until exiting the short visibility airspace. Next, when determining that the aircraft 100 has exited the short visibility airspace, the aircraft 100 determines that it has become unnecessary to restrict a change in altitude because the abnormality condition of the altitude sensor 132a becomes unsatisfied. Subsequently, the aircraft 100, changing the altitude as needed, passes through the safe airspace, following the alternative route and flies to the movement destination.

However, the present embodiment is not limited to the above description, and the aircraft 100 may exit the short visibility airspace during a period from output of an abnormality report to the execution of the first control. In this case, the aircraft 100 that has received the route change command and the altitude change restriction, after having changed the flight route to the alternative route, determines that it is unnecessary to restrict a change in altitude and, changing the altitude as needed, passes through the safe airspace, following the alternative route and flies to the movement destination.

Next, the controller 540 of the control device 500, by executing the same processing as the processing in step S82 in FIG. 16, determines whether or not the abnormality condition of the altitude sensor 132a is satisfied (step S95). When, on this occasion, the controller 540 determines that the abnormality condition of the altitude sensor 132a is satisfied (step S95; Yes), the acquirer 510 of the control device 500 determines whether or not an airspace exit report announcing exit from the short visibility airspace is received from the aircraft 100 flying the alternative route in accordance with the route change command (step S96). On this occasion, the acquirer 510 executes processing of trying acquisition of an airspace exit report from the data communication circuit 504a, and, when no airspace exit report is acquired, the acquirer 510 determines that no airspace exit report has been received (step S96; No). Subsequently, the acquirer 510 sleeps for a predetermined amount of time and subsequently repeats the processing in step S96.

In contrast, when an airspace exit report is acquired, the acquirer 510 of the control device 500 determines that an airspace exit report has been acquired (step S96; Yes) and terminates the execution of the airspace migration control processing.

When, in step S95, the controller 540 of the control device 500 determines that the abnormality condition of the altitude sensor 132a is not satisfied (step S95; No), the controller 540 determines that the abnormality condition of the LiDAR sensor 132b is satisfied. Next, the acquirer 510, by executing the same processing as the processing in step S96, determines whether or not an airspace exit report has been received (step S97). When, on this occasion, the acquirer 510 determines that an airspace exit report has been received (step S97; Yes), the acquirer 510 terminates the execution of the airspace migration control processing.

In contrast, when the acquirer 510 of the control device 500 determines that no airspace exit report has been received (step S97; No), the acquirer 510 acquires location information (hereinafter, referred to as latest location information) associated with time information indicating the latest time among pieces of time information that are respectively stored in a plurality of records stored in the flight location-related table in FIG. 13 and the vehicle ID "100" of the aircraft 100 (step S98).

Subsequently, the controller 540 of the control device 500 calculates a distance over which the aircraft 100 has moved since the first control was started in step S94. For this purpose, the controller 540 calculates a distance from the third point P3 indicated by the third location information to the location of the aircraft 100 indicated by the latest location information (step S99).

Next, the acquirer 510 of the control device 500 acquires information indicating a predetermined movement distance from the information storage 590. Although, in the present embodiment, the predetermined movement distance is "100" meters, the present embodiment is not limited thereto, and the predetermined movement distance may be longer or shorter than "100" meters. A person skilled in the art can determine, by experiment, a suitable value for the predetermined movement distance.

Next, the controller 540 of the control device 500 determines whether or not the calculated distance is equal to or greater than the predetermined movement distance (step S100). When, on this occasion, the control device 540 determines that the calculated distance is less than the predetermined movement distance (step S100; No), the controller 540 repeats the above-described process from step S97.

In contrast, when the controller 540 of the control device 500 determines that the calculated distance is equal to or greater than the predetermined movement distance (step S100; Yes), the controller 540 acquires a plurality of location information of a safe airspace indicating a minimum value of GPS altitude that is higher than the GPS altitude of the aircraft 100 indicated by the latest location information. In addition, the controller 540 acquires a plurality of information indicating a priority each of which is associated with each of the acquired plurality of location information. Through this processing, the acquirer 510 identifies a plurality of safe airspaces that is located above the aircraft 100.

Next, the controller 540 of the control device 500 selects a predetermined number of safe airspaces from among the identified plurality of safe airspaces in ascending order of distance from the location of the aircraft 100 indicated by the latest location information. Subsequently, the controller 540 selects a safe airspace from among the selected plurality of safe airspaces, based on the priorities (step S101). Although, in the present embodiment, the controller 540 selects a safe airspace that has the highest priority, the present embodiment is not limited thereto, and the controller 540 may select a safe airspace that has the N-th highest priority (where N is a natural number of 2 or more) or may select a safe airspace, based on software-generated random numbers.

Next, the controller 540 of the control device 500, by executing the same processing as the processing in step S93, sets an alternative route that starts from the location of the aircraft 100, passes through the selected safe airspace located above the aircraft 100, and reaches the movement destination (steps S102). Next, the controller 540 outputs (i) a route change command that includes route information indicating the set alternative route and that commands the aircraft 100 to change the flight route thereof to the alternative route indicated by the route information and (ii) altitude change permission that permits a change in altitude to the data communication circuit 504a with the aircraft 100 as the destination (step S103). In this way, the controller 540 performs the altitude change control to cause the aircraft 100 to change the altitude thereof and also performs second control to cause the aircraft 100 to move to a safe airspace that is located above the aircraft 100.

The aircraft 100 that has received the route change command output in step S103, after having changed the flight route to the alternative route, changes the altitude and flies the alternative route even before determining that the aircraft 100 has exited the short visibility airspace. For this purpose, the aircraft 100 changes the number of revolutions per unit time of the propellers 111 to 114.

Next, the acquirer 510 of the control device 500, by executing the same processing as the processing in step S96, determines whether or not an airspace exit report has been received (step S104). When, on this occasion, the acquirer 510 determines that no airspace exit report has been received (step S104; No), the acquirer 510 repeats the processing in step S104. In contrast, when the acquirer 510 of the control device 500 determines that an airspace exit report has been received (step S104; Yes), the acquirer 510 terminates the execution of the airspace migration control processing.

The control device 500, after having executed the airspace migration control processing in step S56 in FIG. 9B, repeats the above-described process from step S44.

When, in step S53, the acquirer 510 of the control device 500 determines that no abnormality report has been received (step S53; No), the acquirer 510, by executing the same processing as the processing in step S96 in FIG. 17A, determines whether or not an airspace exit report has been received (step S57). When, on this occasion, the acquirer 510 determines that an airspace exit report has been received (step S57; Yes), the acquirer 510 repeats the above-described process from step S44.

In contrast, when the acquirer 510 of the control device 500 determines that no airspace exit report has been received (step S57; No), the acquirer 510, by executing the same processing as the processing in step S45, determines whether or not an arrival report has been received (step S58). When, on this occasion, the acquirer 510 determines that no arrival report has been received (step S58; No), the acquirer 510 repeats the above-described process from step SM.

When, in step S45, S48, or S58, the acquirer 510 of the control device 500 determines that an arrival report has been received (step S45, S48, or S58; Yes), the acquirer 510 terminates the execution of the flight control processing.

Although, in the present embodiment, it was described that the employee of the transport company caused the aircraft 100 to store the article, the present embodiment is not limited thereto, and the employee may cause the aircraft 200 to store the article. In this case, the employee is only required to perform an operation to input the address of the transport destination of the article and the vehicle ID "200" of the aircraft 200 on the input device 505c of the control device 500. In addition, the CPU 501 of the control device 500 is only required to, by executing the flight control processing illustrated in FIGS. 9A and 9B, cause the aircraft 200 to fly to the transport destination in response to a signal output from the input device 505c. In addition, in this case, the CPU 501, by executing the not-illustrated information storage processing in parallel with the flight control processing, stores the vehicle ID "200" of the aircraft 200 and the flight location-related information of the aircraft 200 in the flight location-related table in FIG. 13.

The CPU 501 of the control device 500 executes the not-illustrated airspace confirmation processing of confirming whether or not an obstruction exists in a predetermined cubic airspace, based on the flight location-related information stored in the flight location-related table in FIG. 13 when a predetermined time has been reached.

When the execution of the not-illustrated airspace confirmation processing is started, the acquirer 510 of the control device 500 executes processing of determining whether or not a record that has not been checked exists among a plurality of records stored in the confirmation result table in FIG. 12. When, on this occasion, the acquirer 510 determines that there exists a record that has not been checked, the acquirer 510 sets one of records that have not been checked, as a target of a check. Subsequently, the acquirer 510 acquires location information indicating the location of a cubic airspace (hereinafter, referred to as a checked airspace) stored in the record that is set as a target of a check (hereinafter, referred to as a checked record).

Subsequently, the acquirer 510 of the control device 500 identifies one or a plurality of records in which location information indicating a location included in the checked airspace is stored from among the plurality of records stored in the flight location-related table in FIG. 13. When, on this occasion, no record is identified or only one record is identified, the acquirer 510 determines that the location of an obstruction cannot be detected based on image information because no image information or only one piece of image information acquired in the checked airspace is available. Thus, the acquirer 510 determines that it is not possible to confirm whether or not an obstruction exists in the checked airspace. Next, the acquirer 510 updates confirmation result information stored in the checked record with non-confirmation information indicating that neither existence nor nonexistence of an obstruction has been confirmed in the checked airspace. Subsequently, the acquirer 510 repeats the above-described process from the processing of determining whether or not a record that has not been checked exists.

In contrast, when n records (where n is an integer of 2 or more) are identified, the acquirer 510 of the control device 500 acquires pieces of image information that are respectively stored in the identified n records. In this way, the acquirer 510 acquires two or more pieces of image information that were acquired by the aircraft 100 or 200 at locations included in the checked airspace. The reason why two or more pieces of image information from the aircraft 100 or 200 are identified is that the configuration of the image sensor 131a of the aircraft 100 and the configuration of a not-illustrated image sensor of the aircraft 200 are the same as each other. That is, when any of two pieces of image information from the aircraft 100, two pieces of image information from the aircraft 200, and a piece of image information from the aircraft 100 and a piece of image information from the aircraft 200 are identified, the location of an obstruction can be detected based on parallax between images that are respectively indicated by the identified two pieces of image information. However, the present embodiment is not limited to the above description, and only two or more pieces of image information from the aircraft 100 may be identified or only two or more pieces of image information from the aircraft 200 may be identified.

Next, the controller 540 of the control device 500 generates n×(n−1) combinations of two pieces of image information that are different from each other from the acquired n pieces of image information. Subsequently, the controller 540 tries, with respect to each of the n×(n−1) combinations, detection of image regions corresponding to an obstruction from images that are respectively indicated by the two pieces of image information in the combination.

When, on this occasion, sets of image regions that respectively correspond to one or a plurality of obstructions are detected based on any one or more of the n×(n−1) combinations, the controller 540 of the control device 500, by executing the same processing as the processing in step S71 in FIG. 15, detects the locations of the one or plurality of obstructions, based on respective parallaxes of the detected one or plurality of sets of image regions. Next, the controller 540 of the control device 500 determines whether or not the locations of the detected one or plurality of obstructions are included in the checked airspace. When, on this occasion, the controller 540 determines that the locations of any one or more of the one or plurality of obstructions are included in the checked airspace, the controller 540 determines that existence of an obstruction is confirmed in the checked airspace. Subsequently, the controller 540 updates the confirmation result information stored in the checked record with existence confirmation information indicating that existence of an obstruction has been confirmed in the checked airspace. Subsequently, the control device 500 repeats the above-described process from the processing of determining whether or not a record that has not been checked exists in the confirmation result table in FIG. 12.

In contrast, when no image region corresponding to an obstruction is detected from any of the n×(n−1) combinations or it is determined that all the locations of one or a plurality of obstructions are not included in the checked airspace, the controller 540 of the control device 500 determines that nonexistence of an obstruction is confirmed in the checked airspace. Next, the controller 540 updates the confirmation result information stored in the checked record with nonexistence confirmation information indicating that nonexistence of an obstruction has been confirmed in the checked airspace. Subsequently, the control device 500 repeats the above-described process from the processing of determining whether or not a record that has not been checked exists.

Subsequently, when the acquirer 510 of the control device 500 determines that no record that has not been checked exists in the confirmation result table in FIG. 12, the acquirer 510 terminates the execution of the airspace confirmation processing.

Figure 18:
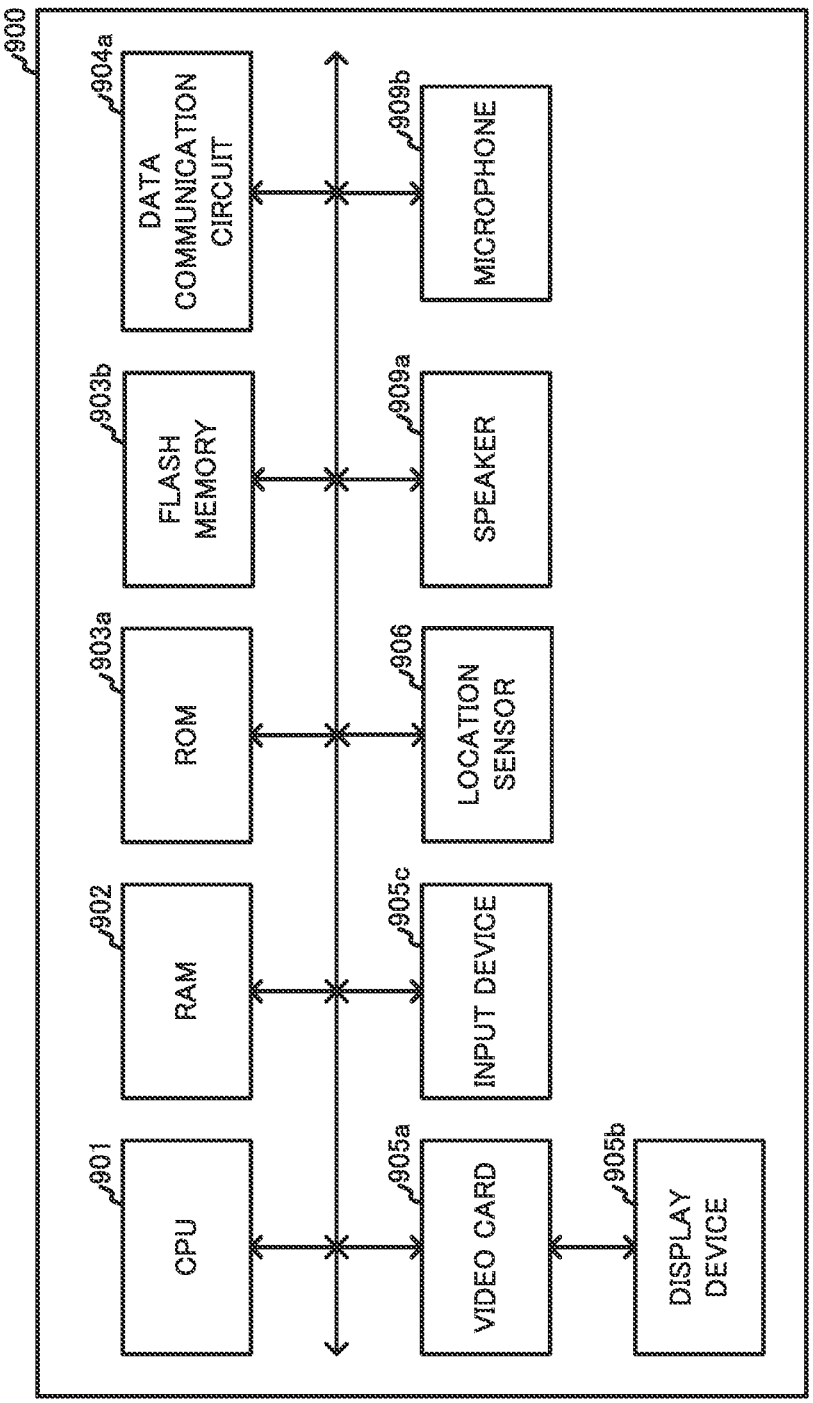
FIG. 18 is a hardware configuration diagram illustrating a configuration example of a terminal device.

The terminal device 900 is a smartphone and includes a CPU 901, a RAM 902, a ROM 903a, a flash memories 903b, a data communication circuit 904a, a video card 905a, a display device 905b, an input device 905c, a location sensor 906, a speaker 909a, and a microphone 909b, which are hardware components, as illustrated in FIG. 18. Although, in the present embodiment, the terminal device 900 includes one CPU 901, the terminal device 900 may include a plurality of CPUs. In addition, the terminal device 900 may include a plurality of RAMs and may include a plurality of flash memories.

Configurations and functions of the CPU 901, the RAM 902, the ROM 903a, the flash memory 903b, the data communication circuit 904a, the video card 905a, the display device 905b, the input device 905c, and the location sensor 906 that the terminal device 900 includes are the same as the configurations and functions of the CPU 191, the RAM 192, the ROM 193a, the flash memory 193b, the data communication circuit 194a, the video card 195a, the display device 195b, input device 195c, and the location sensor 196 that the aircraft 100 illustrated in FIG. 3 includes, respectively. In addition, configurations and functions of the speaker 909a and the microphone 909b that the terminal device 900 includes are the same as the configurations and functions of the speaker 509a and the microphone 509b that the control device 500 illustrated in FIG. 8 includes.

The assistant carrying the terminal device 900 performs an operation to execute an application for voice communication that the flash memory 903b of the terminal device 900 stores in advance on the input device 905c of the terminal device 900. Subsequently, when the assistant visually recognizes the aircraft 100, the assistant orally describes the visual recognition result at a predetermined timing or a random timing.

When the input device 905c of the terminal device 900 outputs a signal corresponding to the operation, the CPU 901 of the terminal device 900 starts execution of the application for voice communication. Next, the CPU 901 executes processing of generating voice information indicating a voice of the assistant, based on a signal output from the microphone 909b and outputs the generated voice information to the data communication circuit 904a with the control device 500 as the destination. Subsequently, the CPU 901 acquires voice information sent from the control device 500 from the data communication circuit 904a and, based on the acquired voice information, outputs a signal indicating a voice of the employee operating the control device 500 to the speaker 909a. Subsequently, the CPU 901 repeats the above-described process from the processing of generating voice information.

According to the above-described configuration, the control system 1 includes the acquirer 510 that acquires location information indicating the location of the first point P1 at which the aircraft 100 that flies a predetermined flight route detects a short visibility airspace that has shorter visibility than the predetermined first visibility distance and location information indicating the location of the second point P2 at which the aircraft 100 determines that the aircraft 100 has entered the short visibility airspace. The control system 1 also includes the estimator 520 that estimates size of a short visibility airspace, based on the location of the first point P1 and the location of the second point P2 that are indicated by the acquired location information and sensing information acquired at the first point by sensing performed by the first sensors 131 that the aircraft 100 mounts thereon. The control system 1 further includes the setter 530 that sets a safe airspace having higher safety than the short visibility airspace, based on the estimated size of the short visibility airspace and the sensing information acquired at the first point P1. The control system 1 furthermore includes the controller 540 that performs control to cause the aircraft 100 to move to the set safe airspace when it is determined that flight continuation along a short visibility route passing through the short visibility airspace is impracticable, based on information output from the second sensors 132 that are mounted on the aircraft 100 and that are different from the first sensors 131. Thus, the control system 1 is capable of causing the aircraft 100 to move to a safe airspace that has higher safety than a short visibility airspace even when it is determined that flight continuation along a short visibility route passing through the short visibility airspace is impracticable, based on the information output from the second sensors 132.

In addition, according to the above-described configuration, the first sensors 131 include the image sensor 131a that outputs image information indicating an image acquired by optically sensing a space. In addition, the sensing information includes the image information that the image sensor 131a outputs. Further, the aircraft 100 detects a short visibility airspace, based on the sensing information output from the image sensor 131*a* and determines entry into the short visibility airspace by the aircraft 100, based on the sensing information output from the image sensor 131*a*. Further, the estimator 520 identifies a direction pointing from the first point P1, at which a short visibility airspace is detected, to a boundary between the short visibility airspace and a non-short visibility airspace different from the short visibility airspace, based on the sensing information serving as a base for detection of the short visibility airspace. Furthermore, the estimator 520 estimates distance from the aircraft 100 to the short visibility airspace at the first time, at which the sensing information serving as the base for the detection of the short visibility airspace was acquired, based on the location of the first point P1, at which the short visibility airspace is detected, and the location of the second point P2, at which the entry into the short visibility airspace is determined. In addition, the estimator 520 estimates the size of the short visibility airspace, based on the estimated distance and the direction pointing from the first point P1 to the boundary of the short visibility airspace. Therefore, the control system 1 is capable of estimating size of a short visibility airspace with high precision even when it is impossible or difficult to estimate the size of the short visibility airspace, based on parallax because it is impossible or difficult to extract characteristic points from a short visibility image region corresponding to the short visibility airspace due to, for example, uniform color of the short visibility airspace.

Further, according to the above-described configuration, the first sensors 131 mounted on the aircraft 100 further include the wind direction/velocity sensor 131*b* that senses wind direction and wind velocity and outputs wind direction/velocity information indicating the sensed wind direction and wind velocity. In addition, the sensing information further includes the wind direction/velocity information that the wind direction/velocity sensor 131*b* outputs. Further, the estimator 520 estimates horizontal distance L1 from the aircraft 100 to the short visibility airspace at the first time, further based on the wind direction and the wind velocity indicated by the sensing information output from the wind direction/velocity sensor 131*b* and estimates the size of the short visibility airspace, based on the estimated horizontal distance L1. Therefore, the control system 1 is capable of estimating size of the short visibility airspace with high precision even when the location of the short visibility airspace has changed due to wind after the aircraft 100 has detected the short visibility airspace.

In addition, according to the above-described configuration, the estimator 520 estimates the location of the short visibility airspace at the first time, based on the location of the first point P1 and the estimated size of the short visibility airspace, estimates movement direction and movement velocity of the short visibility airspace, based on the wind direction and the wind velocity, and estimates the location of the short visibility airspace after the first time, based on the estimated movement direction and the estimated movement velocity. Therefore, the control system 1 is capable of estimating the location of the short visibility airspace after change even when the location of the short visibility airspace has changed due to wind.

Further, according to the above-described configuration, the second sensors 132 mounted on the aircraft 100 further includes the altitude sensor 132*a* that outputs information indicating above-ground altitude from the ground surface to the aircraft 100, the above-ground altitude being acquired by performing optical sensing. In a first case where altitude information output from the altitude sensor 132*a* satisfies an abnormality condition predetermined with respect to the altitude sensor 132*a*, the controller 540 determines that flight continuation along a short visibility route is impracticable and performs the control to cause the aircraft 100 to move to the set safe airspace. In addition, according to the above-described configurations, in the first case where the altitude information output from the altitude sensor 132*a* satisfies the abnormality condition predetermined with respect to the altitude sensor 132*a*, the controller 540 performs first control to cause the aircraft 100 to move to the safe airspace that is located at the altitude of the aircraft 100 without performing altitude change control to cause the aircraft 100 to change the altitude thereof. Therefore, the control system 1 is capable of suppressing the aircraft 100 from exiting a flight permitted airspace the range of which is predetermined based on the above-ground altitude and entering a flight forbidden airspace.

In addition, according to the above-described configuration, the second sensors 132 mounted on the aircraft 100 further include the LiDAR sensor 132*b* that outputs coordinate information indicating coordinate values that are acquired by optically sensing a space and coordinate values of an obstruction having a possibility of obstructing flight of the aircraft 100. In addition, in a second case where the coordinate information output from the LiDAR sensor 132*b* satisfies an abnormality condition predetermined with respect to the LiDAR sensor 132*b*, the acquirer 510 acquires confirmation result information associated with location information indicating the location of a transit short visibility airspace through which the flight route passes, from the confirmation result table in the information storage 590. In the confirmation result table, location information indicating the location of each of predetermined cubic airspaces and confirmation result information indicating a confirmation result of an obstruction in the cubic airspace are associated with each other in advance and stored. In addition, the confirmation result information includes existence confirmation information indicating that existence of an obstruction in each of the predetermined cubic airspaces has been confirmed, nonexistence confirmation information indicating that nonexistence of an obstruction in the cubic airspace has been confirmed, and non-confirmation information indicating that neither existence nor nonexistence of an obstruction in the cubic airspace has been confirmed. In the case of the second case and where the acquired confirmation result information is the existence confirmation information or the non-confirmation information, the controller 540 determines that flight continuation along the short visibility route is impracticable and performs the control to cause the aircraft 100 to move to the set safe airspace. Therefore, the control system 1 is capable of suppressing the aircraft 100 from coming into contact with an obstruction.

Further, according to the above-described configuration, in the case of the second case and where the acquired confirmation result information is the nonexistence confirmation information, the controller 540 determines that flight continuation along the short visibility route is possible and performs control to cause the aircraft 100 to continue flight along the short visibility route. Therefore, the control system 1 is capable of, while suppressing the aircraft 100 from coming into contact with an obstruction, causing the aircraft 100 to continue flight along a short visibility route even in the second case where the abnormality condition of the LiDAR sensor 132*b* is satisfied. In addition, when the aircraft 100 transports articles, the control system 1 is capable of improving transport efficiency of articles. Although, in the present embodiment, the transport efficiency of articles is represented by the number of articles that the aircraft 100 transports per unit time, the present embodiment is not limited thereto, and the transport efficiency of articles may be represented by the number of articles that the aircraft 100 transports per unit flight time or the number of articles that the aircraft 100 transports per unit flight distance.

In addition, the controller 540 of the control device 500 confirms whether or not an obstruction exists in a predetermined cubic airspace, based on image information acquired during flight of the aircraft 100 or 200 and, based on a confirmation result, updates confirmation result information associated with the cubic airspace. Therefore, the control system 1 is capable of, while suppressing the aircraft 100 from coming into contact with an obstruction, causing the aircraft 100 to continue flight along a short visibility route even in the second case where the abnormality condition of the LiDAR sensor 132b of the aircraft 100 is satisfied, provided that the airspace is an airspace where the aircraft 100 has been caused to fly in the past. In addition, the control system 1 is capable of, while suppressing the aircraft 100 from coming into contact with an obstruction, causing the aircraft 100 to continue flight even in the second case, provided that the airspace is an airspace where the aircraft 200 has been caused to fly in the past even when the airspace is an airspace where the aircraft 100 has not been caused to fly.

According to the above-described configurations, in the case of the second case in which coordinate information output from the LiDAR sensor 132b satisfies the abnormality condition predetermined with respect to the LiDAR sensor 132b and where it is determined that flight continuation along the short visibility route is impracticable, the controller 540 of the control device 500 performs first control to cause the aircraft 100 to move to the safe airspace that is located at the altitude of the aircraft 100 without performing the altitude change control. In addition, when, before the aircraft 100 exits a short visibility airspace, the aircraft 100 has moved over a predetermined movement distance since the first control was started, the controller 540 performs second control to cause the aircraft 100 to move to the safe airspace that is located above the aircraft 100 by performing the altitude change control. In general, fog that reduces visibility distance normally extends long in the horizontal direction rather than the vertical direction. Therefore, the control system 1, by causing the aircraft 100 to move to the safe airspace that is located above the aircraft 100, is capable of causing the aircraft 100 to move to the safe airspace with movement of shorter distance than in a case of causing the aircraft 100 to move to a safe airspace without performing the altitude change control at all.

According to the above-described configuration, the setter 530 of the control device 500 detects a location of an obstruction that has a possibility of obstructing flight of the aircraft 100, based on the sensing information output from the image sensor 131a and sets one or a plurality of non-short visibility airspaces as safe airspaces, based on the detected location of the obstruction. Therefore, the control system 1 is capable of suppressing the aircraft 100 from coming into contact with an obstruction.

According to the above-described configuration, the setter 530 of the control device 500 detects a location of a person, based on the sensing information output from the image sensor 131a and sets a priority for each of one or a plurality of safe airspaces, based on the detected location of the person. In addition, the controller 540 performs the control to cause the aircraft 100 to move to an airspace that is selected from among one or a plurality of safe airspaces, based on the set priorities. Therefore, the control system 1 is capable of suppressing the aircraft 100 from coming into contact with a person.

According to the above-described configuration, the acquirer 510 of the control device 500 acquires location information indicating the location of a predetermined assistance point, and the setter 530 sets a higher priority for the safe airspace between which and the assistance point indicated by the acquired location information no short visibility airspace exists than the priority of the safe airspace between which and the assistance point a short visibility airspace exists. Therefore, the control system 1 is capable of causing the aircraft 100 to preferentially move to an airspace in which the aircraft 100 can be visually recognized from the predetermined assistance point.

Modified Example 1 of Embodiment

In the embodiment, it was described that the controller 540 of the control device 500 performed the second control when the aircraft 100 had moved over a predetermined movement distance since the first control was started. However, the embodiment is not limited to the above description, and the controller 540 according to the present modified example may perform the second control when a predetermined period has elapsed since the first control was started.

For this purpose, when the controller 540 of the control device 500 according to the present modified example, by executing the processing in step S94 in FIG. 17A, performs the first control, the acquirer 510 acquires a system time from, for example, the OS as a start time of the first control. Next, when, after the processing in step S95 has been executed (step S95), the acquirer 510 determines that no airspace exit report has been received (step S97; No), the acquirer 510 acquires a system time again. Subsequently, the controller 540 calculates an elapsed time since the first control was started by subtracting the start time of the first control from the reacquired system time.

Next, the acquirer 510 of the control device 500 acquires information indicating a predetermined period from the information storage 590. Although, in the present modified example, the predetermined period is "10" minutes, the present modified example is not limited thereto, and the predetermined period may be longer or shorter than "10" minutes. A person skilled in the art can determine, by experiment, a suitable value for the predetermined period.

Next, the controller 540 of the control device 500 determines whether or not the calculated elapsed time is equal to or greater than the predetermined period. When, on this occasion, the controller 540 determines that the calculated elapsed time is less than the predetermined period, the controller 540 repeats the above-described process from step S97. In contrast, when the control device 500 determines that the calculated elapsed time is equal to or greater than the predetermined period, the control device 500, by executing the processing in steps S101 to S104, performs the second control.

Modified Example 2 of Embodiment

In the embodiment, it was described that the setter 530 of the control device 500 detected a location of a person, based on sensing information output from the image sensor 131a, in step S71 in FIG. 15 and set a priority for each of a plurality of safe airspaces, based on the detected location of the person, in step S73.

However, the embodiment is not limited to the above description, and the setter 530 of the control device 500 may detect a location of a house, based on sensing information output from the image sensor 131*a*, in step S71 and set a priority for each of a plurality of safe airspaces, based on the detected location of the house, in step S73.

In addition, the present modified example is not limited to the above description, and the setter 530 of the control device 500 may detect locations of a person and a house, based on sensing information output from the image sensor 131*a*, in step S71 and set a priority for each of a plurality of safe airspaces, based on the detected locations of the person and the house, in step S73.

Modified Example 3 of Embodiment

Although, in the embodiment, it was described that the aircraft 100 detected a short visibility airspace in which fog had developed, the embodiment is not limited thereto. The aircraft 100 according to the present modified example detects a short visibility airspace in which smoke generated by, for example, field burning or a forest fire is floating.

The CPU 191 of the aircraft 100 according to the present modified example tries detection of a gray pixel, based on pixel values from an image indicated by sensing information, in step S25 in FIG. 6A. A person skilled in the art can determine, by experiment, suitable ranges for the range of R values, the range of G values, and the range of B values of gray pixels corresponding to a short visibility airspace in which smoke floats.

When, on this occasion, a gray pixel is detected, the CPU 191 of the aircraft 100 calculates a ratio of the number of gray pixels to the total number of pixels in the image indicated by the sensing information and determines that the aircraft 100 is flying in a short visibility airspace when the calculated ratio is equal to or greater than a predetermined gray ratio (step S25; Yes).

In contrast, when no gray pixel is detected or the ratio of the number of gray pixels is equal to or less than the predetermined gray ratio, the CPU 191 of the aircraft 100 determines that the aircraft 100 is not flying in a short visibility airspace but flying in a non-short visibility airspace (step S25; No).

In addition, in step S27, in the case where a gray pixel is detected and where there exists a gray image region in which gray pixels more than a predetermined number succeed in the image indicated by the sensing information, the CPU 191 of the aircraft 100 detects the gray image region as a short visibility image region corresponding to a short visibility airspace in which smoke floats. Next, the CPU 191 determines that a short visibility airspace is detected in an airspace located in the travel direction of the aircraft 100 (step S27; Yes). In contrast, when no gray pixel is detected or there exists no gray image region, the CPU 191 determines that no short visibility airspace is detected (step S27; No).

Although it was described that the aircraft 100 according to the present modified example detected a short visibility airspace in which smoke was floating and the smoke is generated by, for example, field burning or a forest fire, the present modified example is not limited thereto. The aircraft 100 may detect a short visibility airspace in which black smoke or black soot is floating. In addition, the aircraft 100 may detect a short visibility airspace in which smoke of a preidentified color that is exhausted, for example, from a factory or from a smoke ball or a smoking device.

In addition, the aircraft 100 may detect a short visibility airspace in which a dust storm or a sandstorm has occurred from the image indicated by the sensing information by detecting, for example, a brown pixel. Further, the aircraft 100 may detect a short visibility airspace in which, for example, gray smoke from a volcano or volcanic ash that has developed due to volcanic eruption is floating.

Although, in the embodiment, it was described that the aircraft 100 detected a short visibility airspace in which fog had developed, the embodiment is not limited thereto, and the aircraft 100 may detect a short visibility airspace in which haze has developed. In addition, the aircraft 100 may detect a short visibility airspace in which precipitation has occurred including an airspace in which rain, snow, graupel, hail, or sleet falls or an airspace in which a virga has developed. Further, the aircraft 100 may detect a short visibility airspace in which drifting snow has occurred.

Further, although, in the embodiment, it was described that an airspace in which fog had developed was a space in which water droplets were floating, the embodiment is not limited thereto, and the airspace may be a space in which ice droplets are floating.

Modified Example 4 of Embodiment

In the embodiment, it was described that a flight forbidden airspace was (i) an airspace in which flight by the aircraft 100 was forbidden in advance by laws and regulations and (ii) an airspace the range of above-ground altitude of which was predetermined by laws and regulations. In addition, it was described that a flight permitted airspace was (i) an airspace in which flight by the aircraft 100 is permitted in advance by laws and regulations and (ii) an airspace the range of above-ground altitude of which was predetermined by laws and regulations. However, the embodiment is not limited to the above description.

The flight forbidden airspace may be (i) an airspace in which one or a plurality of transport companies voluntarily forbids flight by the aircraft 100 in advance and (ii) an airspace for which one or a plurality of transport companies voluntarily determines a range of above-ground altitude in advance. In addition, the flight permitted airspace may be an airspace that is different from the flight forbidden airspace that one or a plurality of transport companies voluntarily determines.

Modified Example 5 of Embodiment

In the embodiment, it was described that the control device 500 performed the first control in the case of the second case in which the abnormality condition of the LiDAR sensor 132*b* is satisfied and where it was determined that flight continuation along a short visibility route was impracticable. In addition, it was described that the control device 500 performed the second control when, before the aircraft 100 exited a short visibility airspace, the aircraft 100 had moved over a predetermined movement distance since the first control was started. However, the embodiment is not limited to the above description.

The control device 500 may perform the second control without performing the first control when the abnormality condition of the altitude sensor 132*a* is not satisfied in the case of the second case in which the abnormality condition of the LiDAR sensor 132*b* is satisfied and where it is determined that flight continuation along a short visibility route is impracticable. In this case, the second control may be control to cause the aircraft 100 to move to a safe airspace located above the short visibility route by performing the altitude change control.

Modified Example 6 of Embodiment

In the embodiment, it was described that the first control was performed in the case of the second case in which the abnormality condition of the LiDAR sensor 132b is satisfied and where it was determined that flight continuation along a short visibility route was impracticable and the first control was control to cause the aircraft 100 to move to a safe airspace located at the altitude of the aircraft 100.

Although the first control according to the present modified example is the same as that in the embodiment in that the first control is control to cause the aircraft 100 to move to a safe airspace located at the altitude of the aircraft 100, the first control according to the present modified example is different from that in the embodiment in that the first control causes the aircraft 100 to pass through the current short visibility airspace in which it is determined that there exists no obstruction, based on image information acquired at the first time and move to the safe airspace.

For this purpose, the setter 530 of the control device 500 divides the current short visibility airspace into a plurality of cubic airspaces each of which has a side of a predetermined length and identifies locations of a plurality of short visibility airspaces generated by the division, in step S93 in FIG. 17A. Next, the setter 530 identifies an airspace that was a short visibility airspace at the first time among the plurality of short visibility airspaces as an indeterminable airspace where it is impossible to determine whether or not an obstruction exists in the airspace based on image information acquired at the first time, based on the location of the short visibility airspace at the first time that is estimated in step S51 in FIG. 9B. Subsequently, the setter 530 removes the indeterminable airspace from the plurality of short visibility airspaces.

Next, the estimator 530 of the control device 500, by executing the same processing as the processing in step S71 in FIG. 15, detects a location of an obstruction, based on the image information acquired at the first time. Next, the setter 530 determines, based on the detected location of the obstruction, whether or not the obstruction exists with respect to each of a plurality of short visibility airspaces after removal of the indeterminable airspace. Subsequently, the setter 530 identifies an obstructive airspace in which it is determined that the obstruction exists from among the plurality of short visibility airspaces after removal of the indeterminable airspace. Subsequently, the setter 530 removes the obstructive airspace from the plurality of short visibility airspaces after removal of the indeterminable airspace and identifies a plurality of short visibility airspaces after removal of the indeterminable airspace and the obstructive airspace as obstruction-less airspaces in which there exists no obstruction. Next, the setter 530, by executing the same processing as the processing in step S42 in FIG. 9A, sets an alternative route that starts from the location of the aircraft 100, passes through the obstruction-less airspaces, enters the safe airspace selected in step S92, and subsequently reaches the movement destination (steps S93).

According to the above-described configuration, in the case of the second case in which the abnormality condition of the LiDAR sensor 132b is satisfied, the control system 1 causes the aircraft 100 to pass through the current short visibility airspace in which it is determined that there exists no obstruction, based on the image information acquired at the first time and move to a safe airspace. Therefore, even when the abnormality condition of the LiDAR sensor 132b, which outputs coordinate information indicating coordinate values of an obstruction, is satisfied, the control system 1 is capable of suppressing the aircraft 100 from coming into contact with the obstruction while causing the aircraft 100 to move to a safe airspace.

In the present modified example, it was described that the first control was control to cause the aircraft 100 to pass through the current short visibility airspace in which it was determined that there existed no obstruction, based on the image information acquired at the first time and move to a safe airspace located at the altitude of the aircraft 100. The second control according to the present modified example may be control to cause the aircraft 100 to, as with the first control, pass through the current short visibility airspace in which it is determined that there exists no obstruction, based on the image information acquired at the first time and move to a safe airspace located above the aircraft 100.

Modified Example 7 of Embodiment

Although, in the embodiment, it was described that the controller 540 of the control device 500 performed control to cause the aircraft 100 to move to a safe airspace when it was determined that flight continuation along a short visibility route was impracticable, the embodiment is not limited thereto.

When it is determined that flight continuation along a short visibility route is impracticable and it is estimated that visibility of a space in which the aircraft 100 is located improves within a predetermined travel restriction period, the controller 540 of the control device 500 according to the present modified example performs third control to restrict the aircraft 100 from traveling and changing altitude until the visibility of the space improves. In contrast, when it is estimated that the visibility of the space in which the aircraft 100 flies does not improve within the predetermined travel restriction period, the controller 540 performs the first control.

In the present modified example, the statement that visibility of a space improves means that visibility of the space becomes equal to or greater than the predetermined first visibility distance. Although, in the present modified example, the predetermined travel restriction period is "10" minutes, the present modified example is not limited thereto, and the predetermined travel restriction period may be longer or shorter than "10" minutes. A person skilled in the art can determine, by experiment, a suitable value for the travel restriction period.

For this purpose, when it is determined that flight continuation along the short visibility route is impracticable in step S55 in FIG. 9B (step S55; No), the controller 540 of the control device 500 executes airspace migration control processing as illustrated in FIGS. 19A and 19B (step S56).

When the execution of the airspace migration control processing in FIGS. 19A and 19B is started, the acquirer 510 of the control device 500 acquires third location information (step S91). Next, the acquirer 510 acquires information indicating a travel restriction period that the information storage 590 stores in advance. Subsequently, the acquirer 510 of the control device 500 acquires ground-relative wind direction/velocity information associated with the third location information and the vehicle ID "100" of the aircraft 100 in the flight location-related table in FIG. 13. Next, the estimator 520 assumes that wind continues blowing at the third point P3 from a ground-relative wind direction indicated by the acquired ground-relative wind direction/velocity information at a ground-relative wind velocity indicated by the ground-relative wind direction/velocity information. Based on the assumption and the current location of the short visibility airspace estimated in step S51 in FIG. 9B, the estimator 520 estimates whether or not an airspace including the third point P3 at which the aircraft 100 is located changes from a short visibility airspace to a non-short visibility airspace and the visibility of the airspace improves within the travel restriction period (step S91a).

When, on this occasion, it is estimated that the visibility does not improve within the travel restriction period (step S91a; No), the control device 500, by executing processing in steps S92 to S94 (steps S92 to S94), performs the first control to cause the aircraft 100 to move to a safe airspace. Subsequently, the control device 500 executes processing in steps S95 to S104 and subsequently terminates the airspace migration control processing.

In contrast, when it is estimated that the visibility improves within the travel restriction period (step S91a; Yes), the controller 540 of the control device 500 outputs travel restriction to restrict travel along the flight route to the data communication circuit 194a with the aircraft 100 as the destination (step S91b). In addition, the controller 540 of the control device 500 outputs altitude change restriction to restrict a change in altitude to the data communication circuit 194a with the aircraft 100 as the destination. In this way, the control device 500 performs the third control to restrict travel and altitude change by the aircraft 100 until the visibility of a space in which the aircraft 100 flies improves. Subsequently, the control device 500 executes the processing in step S104 and subsequently terminates the execution of the airspace migration control processing.

The reason why the altitude change restriction is output is to suppress the aircraft 100 from, by changing altitude, flying in a flight forbidden airspace in which flight by the aircraft 100 is forbidden.

Figure 20A:
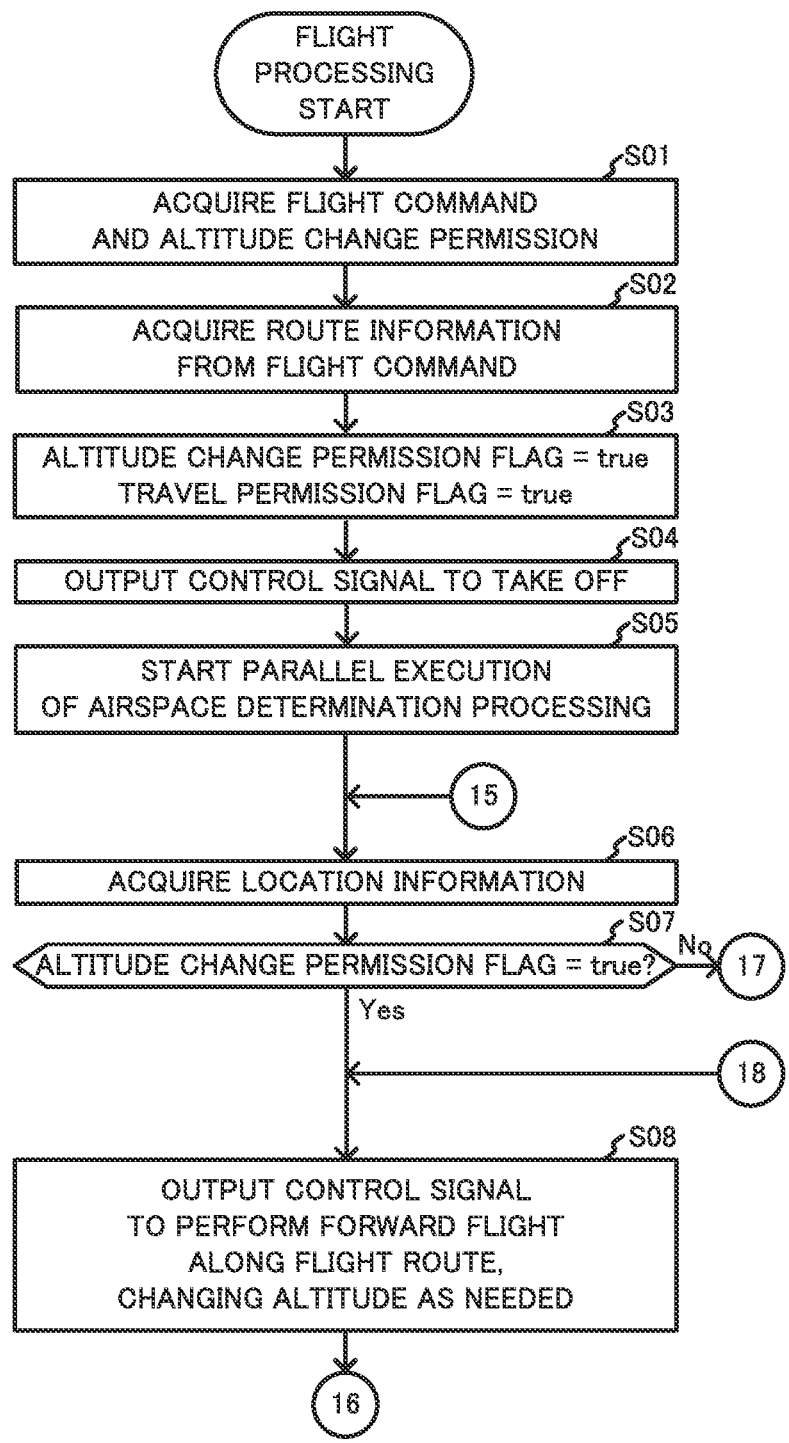
Figure 21:
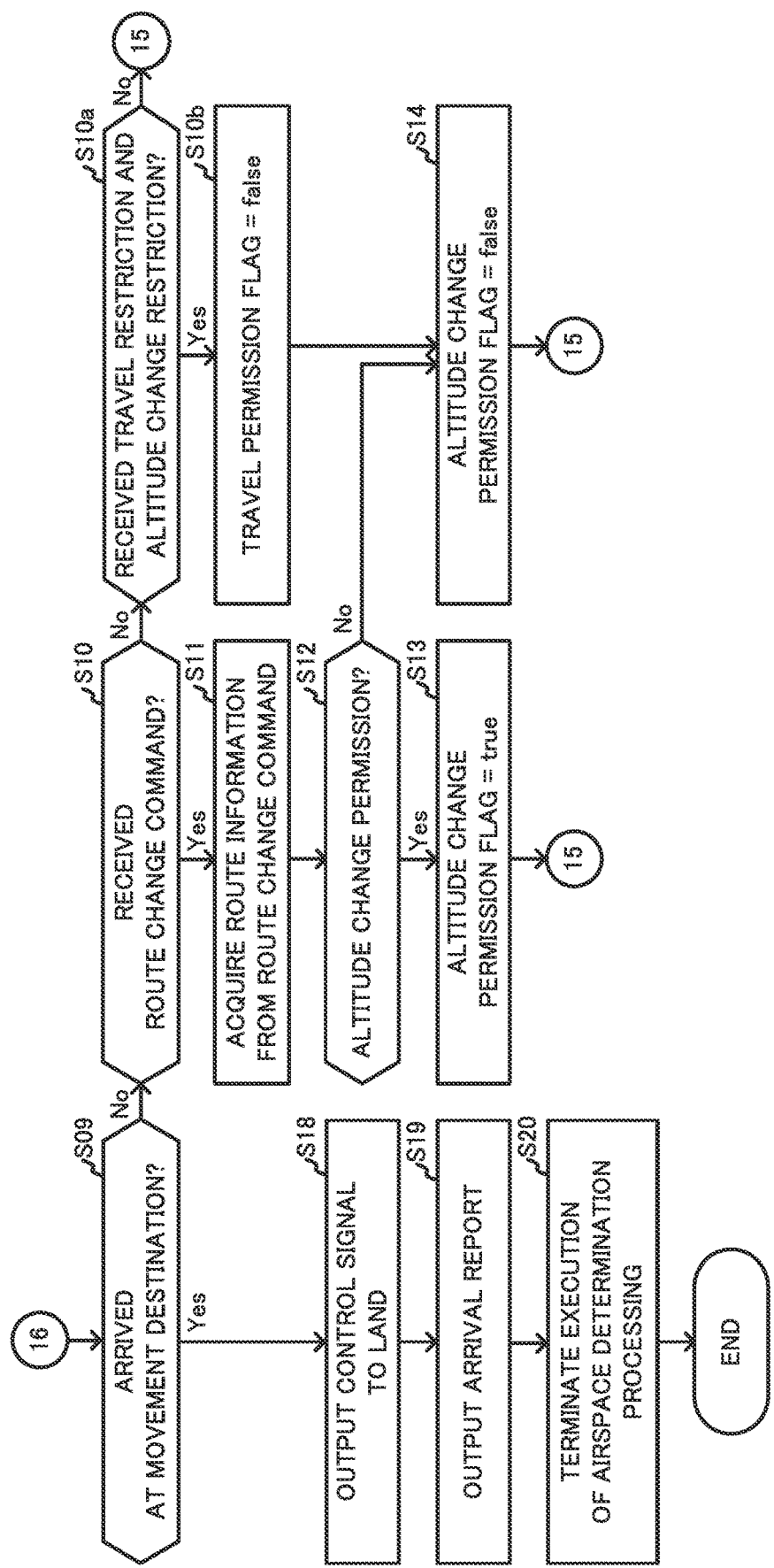
FIG. 21 is a flowchart illustrating a second half of the example of the flight processing that the aircraft according to Modified Example 7 of the embodiment executes.

The CPU 191 of the aircraft 100 according to the present modified example executes flight processing as illustrated in FIGS. 20A, 20B, and 21. When the CPU 191 of the aircraft 100 starts the execution of the flight processing, the CPU 191 executes processing in steps S01 and S02 (steps S01 and S02). Subsequently, the CPU 191 initializes the value of the altitude change permission flag to the value "true" indicating that a change in altitude is permitted. In addition, the CPU 191 initializes the value of a travel permission flag indicating whether travel along the flight route is permitted or restricted to a value "true" indicating that the travel is permitted (step S03).

Subsequently, the CPU 191 of the aircraft 100 executes processing in steps S04 to S10 (steps S04 to S10). When, in step S10, the CPU 191 determines that no route change command has been received (step S10; No), the CPU 191 determines whether or not the data communication circuit 194a has received travel restriction and altitude change restriction from the control device 500 (step S10a). For this purpose, the CPU 191 tries acquisition of travel restriction and altitude change restriction from the data communication circuit 194a and, when neither travel restriction nor altitude change restriction is acquired, determines that neither travel restriction nor altitude change restriction has been received (step S10a; No). Subsequently, the CPU 191 repeats the above-described process from step S06 in order to cause the aircraft 100 to perform travel along the flight route.

In contrast, when the CPU 191 of the aircraft 100 determines that travel restriction and altitude change restriction have been received (step S10a; Yes), the CPU 191 changes the value of the travel permission flag to a value "false" indicating that travel along the flight route is restricted (step S10b). Next, the CPU 191 changes the value of the altitude change permission flag to the value "false" indicating that a change in altitude is restricted (step S14). Subsequently, the CPU 191 repeats the above-described process from step S06 in order to cause the aircraft 100 to fly, restricting the aircraft 100 from changing location and altitude.

When, after the processing in steps S06 and S07 has been executed, the CPU 191 of the aircraft 100 determines that the value of the short visibility flag is the value "false" indicating that the airspace is a non-short visibility airspace (step S15; No), the CPU 191 determines that it becomes unnecessary to restrict a change in altitude and travel along the flight route because the abnormality conditions of the second sensors 132 become unsatisfied. Thus, the CPU 191 changes the values of the altitude change permission flag and the travel permission flag to the value "true" (step S16). Subsequently, the CPU 191 repeats the above-described process from step S08 in order to travel the flight route, changing altitude as needed.

When, in step S15, the CPU 191 of the aircraft 100 determines that the value of the short visibility flag is the value "true" indicating that the airspace is a short visibility airspace (step S15; Yes), the CPU 191 determines whether or not the value of the travel permission flag is the value "true" indicating that travel is permitted (step S15a). When, on this occasion, the CPU 191 determines that the value of the travel permission flag is the value "true" (step S15a; Yes), the CPU 191, by executing the above-described process from step S17, causes the aircraft 100 to travel the flight route, restricting the aircraft 100 from changing altitude.

In contrast, when the CPU 191 determines that the value of the travel permission flag is not the value "true" but the value "false" indicating that travel along the flight route is restricted (step S15a; No), the CPU 191 outputs a control signal to cause the aircraft 100 not to change but to maintain the numbers of revolutions per unit time of the propellers 111 to 114 and a control signal to perform a hovering flight or a circling flight or to perform a circular flight, to the drive circuit 199. Through this processing, the aircraft 100 continues flight, restricting a change in altitude and location (step S17a). Subsequently, the CPU 191 of the aircraft 100 executes the above-described process from the processing in step S09.

According to the above-described configuration, when it is determined that flight continuation along the short visibility route is impracticable and it is estimated that the visibility of a space in which the aircraft 100 flies improves within the predetermined travel restriction period, the controller 540 of the control device 500 performs the third control to restrict the aircraft 100 from traveling until the visibility of the space improves. Therefore, the control system 1 is capable of, while suppressing the aircraft 100 from being late for an arrival time at which the aircraft 100 is to arrive at the movement destination, suppressing the aircraft 100 from coming into contact with an obstruction.

In addition, according to the above-described configuration, the controller 540 of the control device 500 restricts a change in altitude by the aircraft 100 until the visibility of a space in which the aircraft 100 flies improves. Therefore, the control system 1 is capable of suppressing the aircraft 100 from entering a flight forbidden airspace.

Although it was described that the third control according to the present modified example was control to restrict travel and a change in altitude by the aircraft 100 until the visibility of a space in which the aircraft 100 flied improved, the present modified example is not limited thereto. The third control may be control to restrict travel, but not to restrict a change in altitude by the aircraft 100 until the visibility of the space in which the aircraft 100 flies improves.

Modified Example 8 of Embodiment

Although, in Modified Example 7 of the embodiment, it was described that the estimator 520 of the control device 500 estimated whether or not the visibility of an airspace in which the aircraft 100 flied improved within the travel restriction period, based on ground-relative wind direction and ground-relative wind velocity indicated by the ground-relative wind direction/velocity information, the embodiment is not limited thereto. The estimator 520 of the control device 500 according to the present modified example may estimate whether or not the visibility of an airspace in which the aircraft 100 flies improves within the travel restriction period, based on image information.

The acquirer 510 of the control device 500 according to the present modified example acquires image information and time information indicating a third time, the third time being a time at which the image information is acquired at the third point P3, that are associated with the vehicle ID "100" of the aircraft 100 and the third location information in the flight location-related table in FIG. 13.

Next, the acquirer 510 of the control device 500 acquires time information indicating a time that is earlier than the third time and that is closest to the third time among one or a plurality of times that is respectively indicated by one or a plurality of pieces of time information stored in the flight location-related table. In addition, the acquirer 510 acquires image information associated with the acquired time information and the vehicle ID "100" of the aircraft 100. Through this processing, the acquirer 510 identifies a time preceding and closest to the third time and image information that was acquired by the aircraft 100 at the time preceding and closest to the third time.

Subsequently, the estimator 520 of the control device 500, by executing the same processing as the processing in step S25 in FIG. 6A, calculate a ratio of the number of white pixels to the number of pixels in an image indicated by the image information acquired at the time preceding and closest to the third time (hereinafter, referred to as a white ratio at the time preceding and closest to the third time). Likewise, the estimator 520 calculate a ratio of the number of white pixels to the number of pixels in an image indicated by the image information acquired at the third time (hereinafter, referred to as a white ratio at the third time). Subsequently, the estimator 520, by subtracting the white ratio at the third time from the white ratio at the time preceding and closest to the third time, calculates a ratio of the number of white pixels that had been reduced from the time preceding and closest to the third time to the third time to the number of pixels in the images (hereinafter, referred to as a white reduction rate).

Next, the estimator 520 of the control device 500 reads information indicating a predetermined positive white reduction rate from the flash memory 193b. Subsequently, since, when the calculated white reduction rate is higher than the predetermined white reduction rate, the estimator 520 determines that fog clears within the predetermined travel restriction period and the visibility of a space including the third point P3 improves. In contrast, when the calculated white reduction rate is equal to or less than the predetermined white reduction rate, the estimator 520 determines that the visibility of the space including the third point P3 does not improves within the predetermined travel restriction period.

Modified Example 9 of Embodiment

Although, in the embodiment, it was described that an obstructive airspace was a non-short visibility airspace in which there existed an obstruction, the embodiment is not limited thereto. An obstructive airspace may be a non-short visibility airspace in which there exists an obstruction and a space in which a ratio of volume of the obstruction to volume of the non-short visibility airspace is larger than a predetermined obstruction ratio. The volume of an obstruction is only required to be, as with the processing in step S71 in FIG. 15, calculated, based on parallax between an image acquired by the aircraft 100 at the first time and an image acquired by the aircraft 100 at the time succeeding or preceding and closest to the first time, by the controller 540 of the control device 500

In addition, in the embodiment, it was described that, in the not-illustrated airspace confirmation processing, the controller 540 of the control device 500 detected locations of one or a plurality of obstructions, based on parallax between two or more images acquired at locations included in the checked airspace and, when the locations of one or more of the detected one or plurality of obstructions were included in the checked airspace, determined that existence of an obstruction was confirmed in the checked airspace. In addition, it was described that, when all the locations of the detected one or plurality of obstructions were not included in the checked airspace, the controller 540 determined that nonexistence of an obstruction was confirmed in the checked airspace. However, the embodiment is not limited to the above description, and the controller 540 may calculate volumes of one or a plurality of obstructions, based on parallax among the two or more images. In this case, the controller 540 may determine that existence of an obstruction is confirmed in the checked airspace when a ratio of volume of an obstruction to volume of the checked airspace is greater than the predetermined obstruction ratio. In addition, the controller 540 may determine that nonexistence of an obstruction is confirmed in the checked airspace when a ratio of the volume of an obstruction to the volume of the checked airspace is equal to or less than the predetermined obstruction ratio.

Further, although, in the embodiment, it was described that, in the not-illustrated airspace confirmation processing, the controller 540 of the control device 500 detected locations of one or a plurality of obstructions, based on two or more pieces of image information output from the image sensor 131a of the aircraft 100 at locations included in the checked airspace, the embodiment is not limited thereto. The controller 540 may detect locations of one or a plurality of obstructions, based on coordinate information output from the LiDAR sensor 132b of the aircraft 100 at locations included in the checked airspace. In this case, the aircraft 100 is only required to send the coordinate information output from the LiDAR sensor 132b to the control device 500 in conjunction with the flight location-related information including image information, in step S24 in FIG. 6A, and the control device 500 is only required to store the coordinate information in the information storage 290 in conjunction with the received flight location-related information in the not-illustrated information storage processing.

Further, in the embodiment, it was described that, in step S71 in FIG. 15, the controller 540 of the control device 500 detected a location of an obstruction, based on parallax between an image acquired by the aircraft 100 at the first time and an image acquired by the aircraft 100 at the time succeeding or preceding and closest to the first time, the embodiment is not limited thereto. The controller 540 may detect a location of an obstruction, based on parallax between any images, provided that the parallax is parallax between two images acquired by the aircraft 100 during a period from the first time to the second time.

Modified Example 10 of Embodiment

Although, in the embodiment, it was described that the aircraft 100 was an unmanned aircraft, the embodiment is not limited thereto, and the aircraft 100 may be an unmanned flying object. Further, although, in the embodiment, it was described that the aircraft 100 was a drone that gains lift and thrust from the propeller 111 to 114, the embodiment is not limited thereto. The aircraft 100 may include wings and gain lift from the wings or may include a gasbag filled with gas the specific gravity of which is lower than air and gain lift from the gasbag. In addition, the aircraft 100 may include a jet engine or a rocket engine and gain thrust from the jet engine or the rocket engine. Likewise, the aircraft 200 may be an unmanned flying object, include wings and gain lift from the wings, gain lift from a gasbag, or gain thrust from a jet engine or a rocket engine.

Modified Example 11 of Embodiment

Figure 22:
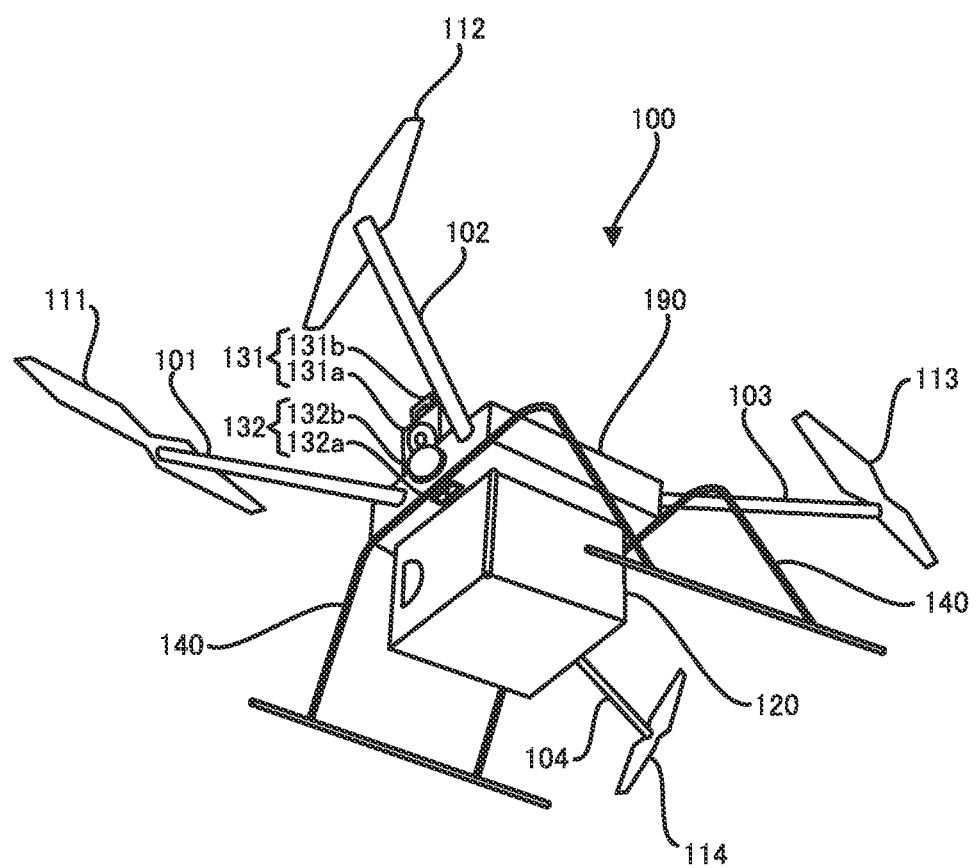
FIG. 22 is an appearance configuration diagram illustrating an appearance example of the aircraft according to Modified Example 11 of the embodiment.

Although, in the embodiment, it was described that, in order to store and load an article, the aircraft 100 included, on the under surface of the control device 190, the first holding frame 121a and the second holding frame 121b that surround and hold an article and the guide rails 122a and 122b that have the movement direction of the first holding frame 121a and the second holding frame 121b as the extending direction, the embodiment is not limited thereto. The aircraft 100 according to the present modified example includes a storage cabinet 120, as illustrated in FIG. 22, that stores an article, on the under surface of the control device 190 in order to store and load an article.

The storage cabinet 120 of the aircraft 100 according to the present modified example includes a not-illustrated box body that includes a not-illustrated bottom plate, ceiling plate, and back plate and not-illustrated two side plates and that is closed by the plates and forms a space the front of which is opened. A not-illustrated door frame that receives a door is installed on an opening of the box body. The door includes a not-illustrated deadbolt that is a bolt, and the door frame includes a not-illustrated strike that is a strike plate for the deadbolt.

The door further includes a not-illustrated motor that locks the door by inserting the deadbolt into the strike in accordance with a signal output from the control device 190. The motor unlocks the door by pulling out the deadbolt from the strike in accordance with a signal output from the control device 190.

The drive circuit 199 of the control device 190 is connected to a cable that is connected to the not-illustrated motor that the door includes and drives the motor in accordance with a signal output by the CPU 191. Because of this configuration, the drive circuit 199, by causing the deadbolt to be pulled out from or inserted into the strike, performs unlocking or locking of the door.

Modified Example 12 of Embodiment

Figure 23:
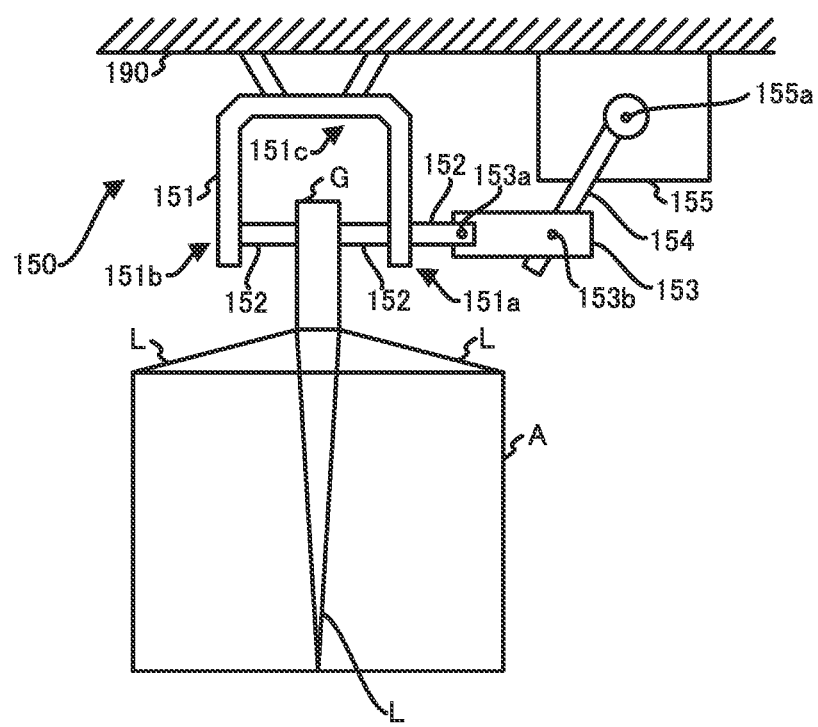
FIG. 23 is a diagram illustrating an example of a hook in a locked state that the aircraft includes.

In the embodiment, it was described that, in order to sore and load an article, the aircraft 100 included the first holding frame 121a and the second holding frame 121b that surround and hold an article and the guide rails 122a and 122b that have the movement direction of the first holding frame 121a and the second holding frame 121b as the extending direction. However, the embodiment is not limited to the above description. The aircraft 100 according to the present modified example includes a hook 150, as illustrated in FIG. 23, that is used to hang and load an article, in place of the first holding frame 121a and the second holding frame 121b and the guide rails 122a and 122b, which were described in the embodiment.

The hook 150 is, for example, a shackle and includes a body 151 that is, for example, a U-shaped fitting. The body 151 includes ends 151a and 151b that face each other and a crown 151c that is located on the side opposed to the ends 151a and 151b and that curves or bends. The crown 151c of the body 151 is fixed to the under surface of the control device 190 of the aircraft 100 by, for example, a fixing fitting in such a way as to be located on the upper side of the ends 151a and 151b.

In the end 151a of the body 151, a not-illustrated through-hole is formed, a pin 152, which is, for example, a rod-shaped fitting, is inserted through the through-hole, and, on a face that is a surface of the end 151b and that faces the through-hole, a not-illustrated stopping hole that stops the tip of the pin 152 at the bottom thereof is formed.

Thus, in a state in which the tip of the pin 152 inserted through the through-hole of the body 151 is stopped by the stopping hole of the body 151 (hereinafter, referred to as a locked state), the body 151 and the pin 152 of the hook 150 form a ring shape. On this occasion, when, for example, the pin 152 is inserted through a ring G, which is a ring-shaped fitting, and the ring G is coupled, by, for example, a string L, to an article A packaged with packaging material, the hook 150 is capable of hanging the article A coupled to the ring G.

Among two ends that the pin 152 has, the end on the opposite side to the end stopped by the body 151 is connected to a coupling member 153, which is, for example, a plate-shaped fitting or a rod-shaped fitting. The coupling member 153 is coupled to a swing member 154, which is fixed to a shaft 155a that a motor 155 has, at the end on the opposite side to a coupling point 153a to the pin 152. The coupling member 153 is swingably coupled about the coupling point 153a to the pin 152 and is swingably coupled about a coupling point 153b to the swing member 154.

The swing member 154 is, for example, a plate-shaped fitting or a rod-shaped fitting and is fixed to the shaft 155a of the motor 155 at a fixing point different from the coupling point 153b to the coupling member 153. The motor 155 is, for example, a stepping motor, is connected to the drive circuit 199 of the control device 190 via a not-illustrated cable, and causes the shaft 155a to rotate in a predetermined direction (hereinafter, referred to as an unlocking direction) by a predetermined angle in accordance with a signal output from the drive circuit 199. Because of this configuration, when the swing member 154 is swung about the fixing point to the shaft 155a in a predetermined direction, the coupling point 153b to the coupling member 153 is moved in a direction in which the pin 152 is pulled out, as illustrated in FIG. 24. Since this motion causes the pin 152 coupled to the coupling member 153 to be moved in the pulled-out direction, the tip of the pin 152 is separated away from the stopping hole, which is formed on the end 151b of the body 151, and brought close to the end 151a.

In the present modified example, since the pin 152 is moved in the pulled-out direction by a distance equal to distance DB between the end 151a and end 151b of the body 151, the pin 152 is moved in the pulled-out direction to a location to which the tip of the pin 152 projects from the through-hole formed in the end 151a by a distance equal to depth DH of the stopping hole. In the present modified example, the depth DH of the stopping hole is designed to be sufficiently smaller than width TR in the pulled-out direction of the ring G, which is coupled to the article A. Thus, when the pin 152 is moved in the pulled-out direction by the distance DB, the pin 152 is pulled out from the ring G.

As described above, in a state in which the tip of the pin 152 is separated away from the stopping hole of the body 151 (hereinafter, referred to as an unlocked state), the body 151 and pin 152 of the hook 150 do not form a ring shape. Further, the crown 151c of the body 151 is fixed to the under surface of the control device 190 of the aircraft 100 in such a way that the ends 151a and 151b are located on the lower side of the crown 151c. Because of this configuration, when the hook 150 is brought from the locked state to the unlocked state and the pin 152 is pulled out from the ring G, the ring G falls freely in conjunction with the article A from an opening of the U-shaped body 151.

When the aircraft 100 has landed, distance over which the article A falls freely is equal to a distance obtained by subtracting length in the vertical direction of the packaged article A from length in the vertical direction of each of the support legs 140, which the aircraft 100 includes. Thus, the length of each of the support legs 140 is designed, in advance, to be longer than the length in the vertical direction of the packaged article A by a length that enables damage to the article A due to free fall to be suppressed.

Note that the motor 155, by rotating the shaft 155a in the locking direction, which is the opposite direction to the unlocking direction, by an angle indicated by a signal output from the control device 190, changes the state of the hook 150 from the unlocked state to the locked state.

Although, in the present modified example, it was described that the hook 150 was a shackle, the present modified example is not limited thereto. The hook 150 may be any type of hook, provided that the hook is capable of hooking the ring G coupled to the article A, and may be, for example, a carabiner or an eyehook. In addition, the shape of the body of the hook 150 is not limited to a U-shape, and may be, for example, a V-shape, a C-shape, an S-shape, or a J-shape. Further, the body 151, pin 152, coupling member 153, and swing member 154 of the hook 150 are not limited to metal fittings, and may be, for example, fittings made of fiber reinforced plastic or wood.

In addition, although, in the present modified example, it was described that the pin 152 was moved in the pulled-out direction and the insertion direction by a distance equal to the distance DB between the end 151a and end 151b of the body 151, the present modified example is not limited thereto, and the pin 152 may be moved in the pulled-out direction and the insertion direction by a distance shorter or longer than the distance DB.

Further, although, in the present modified example, it was described that the packaging material was a cardboard box, the present modified example is not limited thereto, and the packaging material may be any material, provided that it is possible to package an article with the material, and the packaging material may be a plastic bag or a cloth bag.

Modified Example 13 of Embodiment

In the embodiment, it was described that aircrafts 100 and 200 were unmanned aircrafts. However, the aircrafts 100 and 200 are not necessarily unmanned, and provided that, with the exception of control by the control device 500, the aircrafts are objects that autonomously move, a person may be on board the aircrafts.

Modified Example 14 of Embodiment

In addition, although, in the embodiment, it was described that the terminal device 900 was carried by the assistant who assisted the flight control of the aircraft 100, the embodiment is not limited thereto. The terminal device 900 may be carried by an observer who observes the aircraft 100 or a monitor who monitors the aircraft 100.

In this case, the observer or monitor may orally describe an observation result or a monitoring result of the aircraft 100 and the terminal device 900 may send voice information indicating the orally described observation result or monitoring result to the control device 500. The control device 500 may output a voice indicating the observation result or the monitoring result based on the received voice information, and the employee of the transport company may confirm the output voice. When the employee confirms an abnormality in the altitude of the aircraft 100, based on the output voice, the employee may perform an operation to cause the aircraft 100 to change the altitude on the control device 500.

Modified Example 15 of Embodiment

Although, in the embodiment, it was described that the assistant visually recognized an abnormality in the altitude of the aircraft 100, the embodiment is not limited thereto. The assistant may visually recognize an abnormality, such as smoking from the aircraft 100.

In this case, when the employee confirms an abnormality of the aircraft 100, based on a voice of the assistant that the control device 500 outputs, the employee may perform an operation to cause the aircraft 100 to land on a closest landing place that is closest to the location of the aircraft 100 and at which the landing by the aircraft 100 is not forbidden, on the input device 505c of the control device 500.

In addition, when the input device 505c of the control device 500 inputs a signal corresponding to the operation, the controller 540 of the control device 500 may output a route change command that includes information indicating an alternative route reaching the closest landing place and that commands the aircraft 100 to change the flight route thereof to the alternative route and altitude change permission to the data communication circuit 504a with the aircraft 100 as the destination.

Although places at which landing by the aircraft 100 is not forbidden include, for example, a road, a river beach, or a park, the places are not limited thereto, and the place may be any place, provided that the place is different from a place at which landing is forbidden. Places at which landing by the aircraft 100 is not forbidden may include, for example, the assistance point or may be, for example, a mountainous region, hilly land, a schoolyard, or a port at which landing by the aircraft 100 is permitted.

The port may be an entrance of an apartment complex, an office building, a hotel, a commercial facility, or a public facility or an entranceway of a house. In addition, the port may be a lobby of an apartment complex, an office building, a hotel, a commercial facility, or a public facility. Further, the port may be a yard, a rooftop, a veranda, or a parking lot of an apartment complex, an office building, a hotel, a commercial facility, or a public facility.

Modified Example 16 of Embodiment

Although, in the embodiment, it was described that the wind direction/velocity sensor 131b was an ultrasonic sensor, the embodiment is not limited thereto. The wind direction/velocity sensor 131b may be a combination of a windmill anemometer and a vane type anemoscope.

Modified Example 17 of Embodiment

Although, in the embodiment, it was described that the terminal device 900 was a smartphone, the embodiment is not limited thereto, and the terminal device 900 may be a tablet-type personal computer or a laptop-type personal computer.

Modified Example 18 of Embodiment

Although, in the embodiment, it was described that the control device 500 included the information storage 590, the embodiment is not limited thereto. The control device 500 according to the present modified example does not include the information storage 590. The control device 500 according to the present modified example is connected to a not-illustrated information storage device that is, for example, a network attached storage (NAS) and that has the same functions as the functions of the information storage 590, via the Internet IN and, using information stored in the information storage device, performs the flight control processing illustrated in FIGS. 9A and 9B, the size estimation processing illustrated in FIG. 14, the safe airspace setting processing illustrated in FIG. 15, the flight continuation possibility determination processing illustrated in FIG. 16, the airspace migration control processing illustrated in FIGS. 17A and 17B, and the not-illustrated information storage processing, voice communication processing, and airspace confirmation processing. The control system 1 according to the present modified example may include an information storage device or does not have to include an information storage device.

Modified Example 19 of Embodiment

Although, in the embodiment, it was described that the CPU 191 that the aircraft 100 included executed the airspace determination processing illustrated in FIGS. 6A and 6B, the embodiment is not limited thereto. The CPU 501 of the control device 500 may, by executing the airspace determination processing, perform detection of a short visibility airspace, determination of entry into the short visibility airspace, and determination of exit from the short visibility airspace.

In addition, the embodiment is not limited to the above description, and the airspace determination processing illustrated in FIGS. 6A and 6B, the flight control processing illustrated in FIGS. 9A and 9B, the size estimation processing illustrated in FIG. 14, the safe airspace setting processing illustrated in FIG. 15, the flight continuation possibility determination processing illustrated in FIG. 16, the airspace migration control processing illustrated in FIGS. 17A and 17B, and the not-illustrated airspace confirmation processing may be executed by the CPU 191 of the aircraft 100 and the CPU 501 of the control device 500 in a distributed manner.

Modified Example 20 of Embodiment

In the embodiment, it was described that the control system 1 included the control device 500. In addition, in the embodiment, it was described that the CPU 501 of the control device 500, by executing the flight control processing illustrated in FIGS. 9A and 9B, the size estimation processing illustrated in FIG. 14, the safe airspace setting processing illustrated in FIG. 15, the flight continuation possibility determination processing illustrated in FIG. 16, the airspace migration control processing illustrated in FIGS. 17A and 17B, and the not-illustrated airspace confirmation processing, functioned as the acquirer 510, the estimator 520, the setter 530, and the controller 540 illustrated in FIG. 10. In addition, it was described that the hard disk 503b of the control device 500 functioned as the information storage 590.

However, the embodiment is not limited to the configuration, and the control system 1 does not have to include the control device 500. In this case, the flight control processing illustrated in FIGS. 9A and 9B, the size estimation processing illustrated in FIG. 14, the safe airspace setting processing illustrated in FIG. 15, the flight continuation possibility determination processing illustrated in FIG. 16, the airspace migration control processing illustrated in FIGS. 17A and 17B, and the not-illustrated airspace confirmation processing may be executed by the CPU 191 of the control device 190 that the aircraft 100 includes. Therefore, the CPU 191 of the aircraft 100 may function as not-illustrated functional unit equivalent to the acquirer 510, estimate 520, setter 530, and controller 540 of the control device 500. In addition, the flash memory 193b of the aircraft 100 may function as a not-illustrated functional unit equivalent to the information storage 590 of the control device 500.

In addition, the embodiment is not limited to the above description, the control system 1 may include the control device 500 and the CPU 191 of the aircraft 100 may execute the flight control processing illustrated in FIGS. 9A and 9B, the size estimation processing illustrated in FIG. 14, the safe airspace setting processing illustrated in FIG. 15, the flight continuation possibility determination processing illustrated in FIG. 16, and the airspace migration control processing illustrated in FIGS. 17A and 17B. In this case, the control device 500 may store the confirmation result table in FIG. 12, which is used in the flight continuation possibility determination processing in FIG. 16, and the aircraft 100 may receive confirmation result information from the control device 500 in step S85 in FIG. 16.

For this purpose, the CPU 191 of the aircraft 100 generates a confirmation result send request that includes one or plurality of pieces of location information that indicate the locations of one or a plurality of transit short visibility airspaces and that requests sending of confirmation result information of the one or plurality of transit short visibility airspaces. Subsequently, the CPU 191 outputs the generated confirmation result send request to the data communication circuit 194a with the control device 500 as the destination.

Next, when the data communication circuit 504a of the control device 500 receives the confirmation result send request, the acquirer 510 of the control device 500 acquires the one or plurality of pieces of location information that indicate the locations of the one or plurality of transit short visibility airspaces from the confirmation result send request. Next, the acquirer 510 acquires one or a plurality of pieces of confirmation result information that are respectively associated with the acquired one or plurality of pieces of location information, from the confirmation result table in FIG. 12. Subsequently, the acquirer 510 outputs the acquired one or plurality of pieces of confirmation result information to the data communication circuit 504a with the aircraft 100 as the destination.

When the data communication circuit 194a of the aircraft 100 receives the one or plurality of pieces of confirmation result information from the control device 500, the CPU 191 of the aircraft 100 acquires the one or plurality of pieces of confirmation result information from the data communication circuit 194a (step S85). Subsequently, the CPU 191 continues execution of the flight continuation possibility determination processing from the processing in step S86.

The embodiment and Modified Examples 1 to 20 of the embodiment of the present disclosure can be combined with one another.

It is possible to provide the present disclosure as not only the control device 500 that includes a configuration for achieving the functions according to any one of the embodiment and Modified Examples 1 to 19 of the embodiment and the control device 190 that includes a configuration for achieving the functions according to Modified Example 20 of the embodiment but also a system that is constituted by a plurality of devices and that includes, as a whole system, a configuration for achieving the functions according to any one of the embodiment and Modified Examples 1 to 20 of the embodiment of the present disclosure.

It is possible to provide the present disclosure as the control device 500 that includes, in advance, a configuration for achieving the functions according to any one of the embodiment and Modified Examples 1 to 19 of the embodiment. It is also possible to, by applying a program, cause an existing control device to function as the control device 500 according to any one of the embodiment and Modified Examples 1 to 19 of the embodiment. That is, it is possible to, by a computer (CPU or the like) that controls an existing control device executing a program for achieving various functional configurations of the control device 500 exemplified in any one of the embodiment and Modified Examples 1 to 19 of the embodiment, cause the existing control device to function as the control device 500 according any one of the embodiment and Modified Examples 1 to 19 of the embodiment.

It is possible to provide the present disclosure as the control device 190 that includes, in advance, a configuration for achieving the functions according to Modified Example 20 of the embodiment of the present disclosure. It is also possible to, by applying a program, cause an existing control device to function as the control device 190 according to Modified Example 20 of the embodiment. That is, it is possible to, by a computer (CPU or the like) that controls an existing control device executing a program for achieving various functional configurations of the control device 190 exemplified in Modified Example 20 of the embodiment, cause the existing control device to function as the control device 190 according Modified Example 20 of the embodiment.

Any distribution method of such programs can be used, and the programs can be stored and distributed in a recording medium, such as a memory card, a compact disc (CD)-ROM, and a digital versatile disc (DVD)-ROM, or can be distributed via a communication medium, such as the Internet.

A method according to the present disclosure can be implemented using the control device 500 according to any one of the embodiment and Modified Examples 1 to 19 of the embodiment and the control device 190 according to Modified Example 20 of the embodiment. In addition, the method according to the present disclosure can be implemented using the control system 1 according to any one of the embodiment and Modified Examples 1 to 20 of the embodiment.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

APPENDICES

Appendix 1

A control system including:
at least one first memory storing first program code; and
at least one first processor configured to read the first program code and operate in accordance with the first program code, wherein
the first program code includes:
acquisition code configured to cause the at least one first processor to acquire information indicating a location of a first point at which an aircraft, the aircraft configured to fly a predetermined route, detects a short visibility airspace that has shorter visibility than a predetermined distance and information indicating a location of a second point at which the aircraft determines that the aircraft has entered the short visibility airspace;
estimation code configured to cause the at least one first processor to estimate size of the short visibility airspace, based on the location of the first point and the location of the second point indicated by the acquired information and sensing information acquired at the first point by sensing performed by a first sensor that the aircraft mounts;
setting code configured to cause the at least one first processor to set a safe airspace having higher safety than the short visibility airspace, based on the estimated size of the short visibility airspace and the sensing information acquired at the first point; and
control code configured to cause the at least one first processor to perform control to cause the aircraft to move to the set safe airspace when it is determined that flight continuation along the route passing through the short visibility airspace is impracticable, based on information output from a second sensor that is mounted on the aircraft and that is different from the first sensor.

Appendix 2

The control system according to Appendix 1, wherein
the first sensor includes an image sensor configured to output information indicating an image that is acquired by optically sensing a space,
the sensing information includes the information that the image sensor outputs,
the aircraft includes:
at least one second memory storing second program code, the second program code being different from the first program code, and that is different from the at least one first memory; and at least one second processor configured to read the second program code and operate in accordance with the second program code and that is different from the at least one first processor, the second program code is configured to cause the at least one second processor of the aircraft to detect the short visibility airspace, based on the sensing information output from the image sensor and determine entry into the short visibility airspace by the aircraft, based on the sensing information output from the image sensor, and the estimation code of the first program code is configured to cause the at least one first processor to identify a direction pointing from the first point, at which the short visibility airspace is detected, to a boundary between the short visibility airspace and a non-short visibility airspace different from the short visibility airspace, based on the sensing information serving as a base for detection of the short visibility airspace, estimate distance from the aircraft to the short visibility airspace at a time at which the sensing information serving as the base for the detection of the short visibility airspace is acquired, based on the location of the first point, at which the short visibility airspace is detected, and the location of the second point, at which the entry into the short visibility airspace is determined, and estimate the size of the short visibility airspace, based on the estimated distance and the direction pointing from the first point to the boundary of the short visibility airspace.

Appendix 3

The control system according to Appendix 2, wherein the first sensor mounted on the aircraft further includes a wind direction/velocity sensor configured to sense wind direction and wind velocity and output information indicating the sensed wind direction and wind velocity, the sensing information further includes the information that the wind direction/velocity sensor outputs, and the estimation code is configured to cause the at least one first processor to estimate the distance from the aircraft to the short visibility airspace at the time, further based on the wind direction and the wind velocity indicated by the sensing information output from the wind direction/velocity sensor.

Appendix 4

The control system according to Appendix 3, wherein the estimation code is configured to cause the at least one first processor to estimate a location of the short visibility airspace at the time, based on the location of the first point and the estimated size of the short visibility airspace, estimate movement direction and movement velocity of the short visibility airspace, based on the wind direction and the wind velocity, and estimate a location of the short visibility airspace after the time, based on the estimated movement direction and the estimated movement velocity.

Appendix 5

The control system according to Appendix 4, wherein the second sensor mounted on the aircraft further includes an altitude sensor configured to output information indicating altitude from a ground surface to the aircraft, the altitude being acquired by performing optical sensing, and the control code is configured to cause the at least one first processor to, in a first case where the information output from the altitude sensor satisfies an abnormality condition predetermined with respect to the altitude sensor, determine that flight continuation along the route is impracticable and perform the control to cause the aircraft to move to the set safe airspace.

Appendix 6

The control system according to Appendix 5, wherein the control code is configured to cause the at least one first processor to, in the first case where the information output from the altitude sensor satisfies the abnormality condition predetermined with respect to the altitude sensor, perform first control to cause the aircraft to move to the safe airspace located at an altitude of the aircraft without performing altitude change control to cause the aircraft to change altitude of the aircraft.

Appendix 7

The control system according to Appendix 6, wherein the second sensor mounted on the aircraft further includes a light detection and ranging (LiDAR) sensor configured to output information indicating coordinate values that are acquired by optically sensing a space and that are coordinate values of an obstruction having a possibility of obstructing flight of the aircraft, and the control code is configured to cause the at least one first processor to, in the first case, in a second case where the information output from the LiDAR sensor satisfies an abnormality condition predetermined with respect to the LiDAR sensor, or in the first case and the second case, determine that flight continuation along the route is impracticable.

Appendix 8

The control system according to Appendix 7, wherein the acquisition code is configured to cause the at least one first processor to, in the second case where the information that is output from the LiDAR sensor and that indicates the coordinate values of the obstruction satisfies the abnormality condition predetermined with respect to the LiDAR sensor, acquire, from a storage that is configured to store, in advance, information indicating a predetermined airspace and confirmation result information indicating a confirmation result of an obstruction in the predetermined airspace in association with each other, the confirmation result information associated with information indicating the short visibility airspace through which the route passes, the confirmation result information includes existence confirmation information indicating that existence of an obstruction in the predetermined airspace has been confirmed, nonexistence confirmation information indicating that nonexistence of an obstruction in the predetermined airspace has been confirmed, and non-confirmation information indicating that neither existence nor nonexistence of an obstruction in the predetermined airspace has been confirmed, and the control code is configured to cause the at least one first processor to in a case of the second case and where the acquired confirmation result information is the existence confirmation information or the non-confirmation information, determine that flight continuation along the route is impracticable and perform the control to cause the aircraft to move to the set safe airspace and in a case of the second case and where the acquired confirmation result information is the nonexistence confirmation information, determine that flight continuation along the route is possible and perform control to cause the aircraft to continue flight along the route.

Appendix 9

The control system according to Appendix 8, wherein the control code is configured to cause, in a case of the second case and where it is determined that flight continuation along the route is impracticable, the at least one first processor to perform the first control to cause the aircraft to move to the safe airspace located at the altitude of the aircraft without performing the altitude change control and when, before the aircraft exits the short visibility airspace, the aircraft has moved over a predetermined movement distance since the first control was started or a predetermined period has elapsed, perform second control to cause the aircraft to move to the safe airspace located above the aircraft by performing the altitude change control.

Appendix 10

The control system according to any one of Appendices 2 to 9, wherein the setting code is configured to cause the at least one first processor to detect a location of an obstruction having a possibility of obstructing flight of the aircraft, based on the sensing information output from the image sensor and set a plurality of non-short visibility airspaces as the safe airspaces, based on the detected location of the obstruction.

Appendix 11

The control system according to Appendix 10, wherein the setting code is configured to cause the at least one first processor to detect one or more of a location of a person and a location of a house, based on the sensing information output from the image sensor and set a priority for each of the plurality of safe airspaces, based on one or more of the detected location of the person and the detected location of the house, and the control code is configured to cause the at least one first processor to perform the control to cause the aircraft to move to an airspace that is selected from among the plurality of safe airspaces, based on set priorities.

Appendix 12

The control system according to Appendix 11, wherein the acquisition code is configured to cause the at least one first processor to acquire information indicating a location of a predetermined point, and the setting code is configured to cause the at least one first processor to set a higher priority for the safe airspace between which and the point indicated by the acquired information the short visibility airspace does not exist than the priority of the safe airspace between which and the point the short visibility airspace exists.

Appendix 13

An aircraft configured to fly a predetermined route, including:

at least one memory storing program code; and at least one processor configured to read the program code and operate in accordance with the program code, wherein the program code includes:

acquisition code configured to cause the at least one processor to acquire information indicating a location of a first point at which the aircraft detects a short visibility airspace that has shorter visibility than a predetermined distance and information indicating a location of a second point at which the aircraft determines that the aircraft has entered the short visibility airspace;

estimation code configured to cause the at least one processor to estimate size of the short visibility airspace, based on the location of the first point and the location of the second point indicated by the acquired information and sensing information acquired at the first point by sensing performed by a first sensor that the aircraft mounts;

setting code configured to cause the at least one processor to set a safe airspace having higher safety than the short visibility airspace, based on the estimated size of the short visibility airspace and the sensing information acquired at the first point; and control code configured to cause the at least one processor to perform control to cause the aircraft to move to the set safe airspace when it is determined that flight continuation along the route passing through the short visibility airspace is impracticable, based on information output from a second sensor that is mounted on the aircraft and that is different from the first sensor.

Appendix 14

A method that an aircraft configured to fly a predetermined route or a control system configured to control the aircraft executes, the method including:

acquiring, by the aircraft or the control system, information indicating a location of a first point at which the aircraft detects a short visibility airspace that has shorter visibility than a predetermined distance and information indicating a location of a second point at which the aircraft determines that the aircraft has entered the short visibility airspace;

estimating, by the aircraft or the control system, size of the short visibility airspace, based on the location of the first point and the location of the second point indicated by the acquired information and sensing information acquired at the first point by sensing performed by a first sensor that the aircraft mounts;

setting, by the aircraft or the control system, a safe airspace having higher safety than the short visibility airspace, based on the estimated size of the short visibility airspace and the sensing information acquired at the first point; and performing, by the aircraft or the control system, control to cause the aircraft to move to the set safe airspace when it is determined that flight continuation along the route passing through the short visibility airspace is impracticable, based on information output from a second sensor that is mounted on the aircraft and that is different from the first sensor.

What is claimed is:

1. A control system comprising:

at least one first memory storing first program code; and at least one first processor configured to read the first program code and operate in accordance with the first program code, wherein the first program code includes:

acquisition code configured to cause the at least one first processor to acquire information indicating a location of a first point at which an aircraft, the aircraft configured to fly a predetermined route, detects a short visibility airspace that has shorter visibility than a predetermined distance and information indicating a location of a second point at which the aircraft determines that the aircraft has entered the short visibility airspace;

estimation code configured to cause the at least one first processor to estimate size of the short visibility airspace, based on the location of the first point and the location of the second point indicated by the acquired information and sensing information acquired at the first point by sensing performed by a first sensor that the aircraft mounts;

setting code configured to cause the at least one first processor to set a safe airspace having higher safety than the short visibility airspace, based on the estimated size of the short visibility airspace and the sensing information acquired at the first point; and control code configured to cause the at least one first processor to perform control to cause the aircraft to move to the set safe airspace when it is determined that flight continuation along the route passing through the short visibility airspace is impracticable, based on information output from a second sensor that is mounted on the aircraft and that is different from the first sensor.

2. The control system according to claim 1, wherein the first sensor includes an image sensor configured to output information indicating an image that is acquired by optically sensing a space, the sensing information includes the information that the image sensor outputs, the aircraft includes:

at least one second memory storing second program code, the second program code being different from the first program code, and that is different from the at least one first memory; and at least one second processor configured to read the second program code and operate in accordance with the second program code and that is different from the at least one first processor, the second program code is configured to cause the at least one second processor of the aircraft to detect the short visibility airspace, based on the sensing information output from the image sensor and determine entry into the short visibility airspace by the aircraft, based on the sensing information output from the image sensor, and the estimation code of the first program code is configured to cause the at least one first processor to identify a direction pointing from the first point, at which the short visibility airspace is detected, to a boundary between the short visibility airspace and a non-short visibility airspace different from the short visibility airspace, based on the sensing information serving as a base for detection of the short visibility airspace, estimate distance from the aircraft to the short visibility airspace at a time at which the sensing information serving as the base for the detection of the short visibility airspace is acquired, based on the location of the first point, at which the short visibility airspace is detected, and the location of the second point, at which the entry into the short visibility airspace is determined, and estimate the size of the short visibility airspace, based on the estimated distance and the direction pointing from the first point to the boundary of the short visibility airspace.

3. The control system according to claim 2, wherein the first sensor mounted on the aircraft further includes a wind direction/velocity sensor configured to sense wind direction and wind velocity and output information indicating the sensed wind direction and wind velocity, the sensing information further includes the information that the wind direction/velocity sensor outputs, and the estimation code is configured to cause the at least one first processor to estimate the distance from the aircraft to the short visibility airspace at the time, further based on the wind direction and the wind velocity indicated by the sensing information output from the wind direction/velocity sensor.

4. The control system according to claim 3, wherein the estimation code is configured to cause the at least one first processor to estimate a location of the short visibility airspace at the time, based on the location of the first point and the estimated size of the short visibility airspace, estimate movement direction and movement velocity of the short visibility airspace, based on the wind direction and the wind velocity, and estimate a location of the short visibility airspace after the time, based on the estimated movement direction and the estimated movement velocity.

5. The control system according to claim 4, wherein the second sensor mounted on the aircraft further includes an altitude sensor configured to output information indicating altitude from a ground surface to the aircraft, the altitude being acquired by performing optical sensing, and the control code is configured to cause the at least one first processor to, in a first case where the information output from the altitude sensor satisfies an abnormality condition predetermined with respect to the altitude sensor, determine that flight continuation along the route is impracticable and perform the control to cause the aircraft to move to the set safe airspace.

6. The control system according to claim 5, wherein the control code is configured to cause the at least one first processor to, in the first case where the information output from the altitude sensor satisfies the abnormality condition predetermined with respect to the altitude sensor, perform first control to cause the aircraft to move to the safe airspace located at an altitude of the aircraft without performing altitude change control to cause the aircraft to change altitude of the aircraft.

7. The control system according to claim 6, wherein
the second sensor mounted on the aircraft further includes a light detection and ranging (LiDAR) sensor configured to output information indicating coordinate values that are acquired by optically sensing a space and that are coordinate values of an obstruction having a possibility of obstructing flight of the aircraft, and
the control code is configured to cause the at least one first processor to, in the first case, in a second case where the information output from the LiDAR sensor satisfies an abnormality condition predetermined with respect to the LiDAR sensor, or in the first case and the second case, determine that flight continuation along the route is impracticable.

8. The control system according to claim 7, wherein
the acquisition code is configured to cause the at least one first processor to, in the second case where the information that is output from the LiDAR sensor and that indicates the coordinate values of the obstruction satisfies the abnormality condition predetermined with respect to the LiDAR sensor, acquire, from a storage that is configured to store, in advance, information indicating a predetermined airspace and confirmation result information indicating a confirmation result of an obstruction in the predetermined airspace in association with each other, the confirmation result information associated with information indicating the short visibility airspace through which the route passes,
the confirmation result information includes existence confirmation information indicating that existence of an obstruction in the predetermined airspace has been confirmed, nonexistence confirmation information indicating that nonexistence of an obstruction in the predetermined airspace has been confirmed, and non-confirmation information indicating that neither existence nor nonexistence of an obstruction in the predetermined airspace has been confirmed, and
the control code is configured to cause the at least one first processor to
in a case of the second case and where the acquired confirmation result information is the existence confirmation information or the non-confirmation information, determine that flight continuation along the route is impracticable and perform the control to cause the aircraft to move to the set safe airspace and
in a case of the second case and where the acquired confirmation result information is the nonexistence confirmation information, determine that flight continuation along the route is possible and perform control to cause the aircraft to continue flight along the route.

9. The control system according to claim 8, wherein
the control code is configured to cause, in a case of the second case and where it is determined that flight continuation along the route is impracticable, the at least one first processor to
perform the first control to cause the aircraft to move to the safe airspace located at the altitude of the aircraft without performing the altitude change control and
when, before the aircraft exits the short visibility airspace, the aircraft has moved over a predetermined movement distance since the first control was started or a predetermined period has elapsed, perform second control to cause the aircraft to move to the safe airspace located above the aircraft by performing the altitude change control.

10. The control system according to claim 2, wherein
the setting code is configured to cause the at least one first processor to
detect a location of an obstruction having a possibility of obstructing flight of the aircraft, based on the sensing information output from the image sensor, and
set a plurality of non-short visibility airspaces as the safe airspaces, based on the detected location of the obstruction.

11. The control system according to claim 10, wherein
the setting code is configured to cause the at least one first processor to
detect one or more of a location of a person and a location of a house, based on the sensing information output from the image sensor and
set a priority for each of the plurality of safe airspaces, based on one or more of the detected location of the person and the detected location of the house, and
the control code is configured to cause the at least one first processor to perform the control to cause the aircraft to move to an airspace that is selected from among the plurality of safe airspaces, based on set priorities.

12. The control system according to claim 11, wherein
the acquisition code is configured to cause the at least one first processor to acquire information indicating a location of a predetermined point, and
the setting code is configured to cause the at least one first processor to set a higher priority for the safe airspace between which and the point indicated by the acquired information the short visibility airspace does not exist than the priority of the safe airspace between which and the point the short visibility airspace exists.

13. The control system according to claim 3, wherein
the setting code is configured to cause the at least one first processor to
detect a location of an obstruction having a possibility of obstructing flight of the aircraft, based on the sensing information output from the image sensor, and
set a plurality of non-short visibility airspaces as the safe airspaces, based on the detected location of the obstruction.

14. The control system according to claim 4, wherein
the setting code is configured to cause the at least one first processor to
detect a location of an obstruction having a possibility of obstructing flight of the aircraft, based on the sensing information output from the image sensor, and
set a plurality of non-short visibility airspaces as the safe airspaces, based on the detected location of the obstruction.

15. The control system according to claim 5, wherein
the setting code is configured to cause the at least one first processor to
detect a location of an obstruction having a possibility of obstructing flight of the aircraft, based on the sensing information output from the image sensor, and
set a plurality of non-short visibility airspaces as the safe airspaces, based on the detected location of the obstruction.

16. The control system according to claim 6, wherein
the setting code is configured to cause the at least one first processor to
detect a location of an obstruction having a possibility of obstructing flight of the aircraft, based on the sensing information output from the image sensor, and
set a plurality of non-short visibility airspaces as the safe airspaces, based on the detected location of the obstruction.

17. The control system according to claim 7, wherein
the setting code is configured to cause the at least one first processor to
detect a location of an obstruction having a possibility of obstructing flight of the aircraft, based on the sensing information output from the image sensor, and
set a plurality of non-short visibility airspaces as the safe airspaces, based on the detected location of the obstruction.

18. The control system according to claim 8, wherein
the setting code is configured to cause the at least one first processor to
detect a location of an obstruction having a possibility of obstructing flight of the aircraft, based on the sensing information output from the image sensor, and
set a plurality of non-short visibility airspaces as the safe airspaces, based on the detected location of the obstruction.

19. An aircraft configured to fly a predetermined route, comprising:
at least one memory storing program code; and
at least one processor configured to read the program code and operate in accordance with the program code, wherein
the program code includes:
acquisition code configured to cause the at least one processor to acquire information indicating a location of a first point at which the aircraft detects a short visibility airspace that has shorter visibility than a predetermined distance and information indicating a location of a second point at which the aircraft determines that the aircraft has entered the short visibility airspace;
estimation code configured to cause the at least one processor to estimate size of the short visibility airspace, based on the location of the first point and the location of the second point indicated by the acquired information and sensing information acquired at the first point by sensing performed by a first sensor that the aircraft mounts;
setting code configured to cause the at least one processor to set a safe airspace having higher safety than the short visibility airspace, based on the estimated size of the short visibility airspace and the sensing information acquired at the first point; and
control code configured to cause the at least one processor to perform control to cause the aircraft to move to the set safe airspace when it is determined that flight continuation along the route passing through the short visibility airspace is impracticable, based on information output from a second sensor that is mounted on the aircraft and that is different from the first sensor.

20. A method that an aircraft configured to fly a predetermined route or a control system configured to control the aircraft executes, the method comprising:
acquiring, by the aircraft or the control system, information indicating a location of a first point at which the aircraft detects a short visibility airspace that has shorter visibility than a predetermined distance and information indicating a location of a second point at which the aircraft determines that the aircraft has entered the short visibility airspace;
estimating, by the aircraft or the control system, size of the short visibility airspace, based on the location of the first point and the location of the second point indicated by the acquired information and sensing information acquired at the first point by sensing performed by a first sensor that the aircraft mounts;
setting, by the aircraft or the control system, a safe airspace having higher safety than the short visibility airspace, based on the estimated size of the short visibility airspace and the sensing information acquired at the first point; and
performing, by the aircraft or the control system, control to cause the aircraft to move to the set safe airspace when it is determined that flight continuation along the route passing through the short visibility airspace is impracticable, based on information output from a second sensor that is mounted on the aircraft and that is different from the first sensor.

* * * * *